United States Patent
Goda et al.

(10) Patent No.: US 12,148,988 B2
(45) Date of Patent: Nov. 19, 2024

(54) RADAR DEVICE

(71) Applicant: Mitsubishi Electric Corporation, Tokyo (JP)

(72) Inventors: Yuichi Goda, Tokyo (JP); Katsuyoshi Maeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 122 days.

(21) Appl. No.: 18/017,554

(22) PCT Filed: Aug. 21, 2020

(86) PCT No.: PCT/JP2020/031552
§ 371 (c)(1),
(2) Date: Jan. 23, 2023

(87) PCT Pub. No.: WO2022/038759
PCT Pub. Date: Feb. 24, 2022

(65) Prior Publication Data
US 2023/0268644 A1    Aug. 24, 2023

(51) Int. Cl.
*H01Q 1/52* (2006.01)
*G01S 7/03* (2006.01)
(Continued)

(52) U.S. Cl.
CPC ............. *H01Q 1/525* (2013.01); *G01S 7/03* (2013.01)

(58) Field of Classification Search
CPC .......... H01Q 1/52; H01Q 1/525; H01Q 1/32; H01Q 1/3233; H01Q 21/061
See application file for complete search history.

(56) References Cited

U.S. PATENT DOCUMENTS

| 6,288,672 B1 * | 9/2001 | Asano ..................... G01S 13/02 |
| | | 342/368 |
| 11,061,109 B2 * | 7/2021 | Goda ..................... G01S 7/023 |
| (Continued) | | |

FOREIGN PATENT DOCUMENTS

| JP | 2011-526373 A | 10/2011 |
| JP | 2016-3873 A | 1/2016 |

OTHER PUBLICATIONS

International Search Report for PCT/JP2020/031552 dated Oct. 13, 2020.

*Primary Examiner* — Hoang V Nguyen
(74) *Attorney, Agent, or Firm* — Sughrue Mion, PLLC; Richard C. Turner

(57) ABSTRACT

A radar device includes a plurality of transmission antennas, a plurality of reception antennas, and a processing circuitry which processes reception signals. An antenna group including first antennas which are either the plurality of transmission antennas or reception antennas such that an antenna interval between adjacent ones of the first antennas is a basic distance, is defined as a first antenna group, and an antenna group including a plurality of second antennas, different from the first antennas, such that an antenna interval between adjacent ones of the second antennas is 2 times the basic distance, is defined as a second antenna group. In a virtual reception antenna group composed of a plurality of virtual reception antennas formed by the plurality of antennas in the first antenna group and the second antenna group, an interval between adjacent ones of the virtual reception antennas is the basic distance.

20 Claims, 24 Drawing Sheets

(51) Int. Cl.
*H01Q 1/32* (2006.01)
*H01Q 21/06* (2006.01)

(56) References Cited

U.S. PATENT DOCUMENTS

| | | | |
|---|---|---|---|
| 2004/0246168 A1* | 12/2004 | Isaji | G01S 7/03 |
| | | | 342/146 |
| 2011/0074620 A1 | 3/2011 | Wintermantel | |
| 2011/0074621 A1 | 3/2011 | Wintermantel | |
| 2011/0080313 A1 | 4/2011 | Wintermantel et al. | |
| 2011/0080314 A1 | 4/2011 | Wintermantel | |
| 2017/0115386 A1 | 4/2017 | Morinaga et al. | |

* cited by examiner

RADAR DEVICE

This Application is a National Stage of International Application No. PCT/JP2020/031552 filed Aug. 21, 2020.

TECHNICAL FIELD

The present disclosure relates to a radar device.

BACKGROUND ART

As a conventional radar device, there is, for example, a radar system described in Patent Document 1. A configuration and operation of the conventional radar device described in Patent Document 1 are as follows.

The conventional radar device described in Patent Document 1 detects an object that is located near an automobile and that is to be detected, i.e., a target object. Transmission means composed of one or more transmission antennas emits a transmission signal to the object. In addition, reception means composed of one or more reception antennas receives reflection signals resulting from reflection of the transmission signal by the object. Signal processing means processes the reception signals received by the reception means.

The reception signals are acquired by using different combinations of the transmission antennas and reception antennas. For each combination, a relative phase center defined as the sum of a vector from a reference point to a phase center of the corresponding transmission antenna and a vector from the reference point to a phase center of the corresponding reception antenna, is obtained.

At this time, the transmission antennas have emission characteristics that are at least approximately the same as one another. Likewise, the reception antennas have emission characteristics that are at least approximately the same as one another. Meanwhile, the emission characteristics of the transmission antennas and the emission characteristics of the reception antennas may be different from each other.

In this case, a certain spatial direction S is defined as a direction perpendicular to a spatial direction R. The spatial direction S is, for example, the vertical direction, and the spatial direction R is, for example, the horizontal direction. Here, a combination of a transmission antenna and a reception antenna that are defined in the spatial direction R will be contemplated regarding the position of the relative phase center of the combination. In this case, the position of the relative phase center of the combination of the transmission antenna and the reception antenna cyclically changes with a cycle length P.

In addition, a phase component of a reception signal from the object alternates with the cycle length P according to the angular position of the reception signal with respect to the spatial direction S. Therefore, if this phase component is used, the position of the object in the spatial direction S can be expressed.

CITATION LIST

Patent Document

Patent Document 1: Japanese Laid-Open Patent Publication (translation of PCT application) No. 2011-526373
Patent Document 2: Japanese Laid-Open Patent Publication No. 2016-3873

SUMMARY OF THE INVENTION

Problems to be Solved by the Invention

In the conventional radar device in Patent Document 1, if an average wavelength used in the radar device is defined as $\lambda$, the reception antennas each having a plurality of element antennas are arranged at a phase center interval of $\lambda/2$, and a power supply circuit that supplies power to each element antenna is formed as a power supply circuit in a skewered shape so as not to be located between the reception antennas. In the conventional radar device in Patent Document 1, the power supply circuit does not have equal wire lengths to the respective element antennas of each reception antenna. Thus, an equiphase distribution cannot be realized, and antenna frequency characteristics with a wide band, i.e., wide-band antenna frequency characteristics, cannot be realized. For example, a band from 76 to 81 GHz is used in a radar for automobiles, and, in the conventional radar device in Patent Document 1, limits exist for realizing a wide-band antenna in which the fractional bandwidth is higher than 2%. Meanwhile, another power supply type is suitable for realizing a wide-band antenna having a bandwidth, the fractional bandwidth based on which is equal to or higher than 2%. Here, the fractional bandwidth is expressed as A % of the frequency of a transmission signal. If the frequency of the transmission signal is 77 GHz and the fractional bandwidth is 2%, the bandwidth of a relevant antenna is about 1.5 GHz. It is noted that the bandwidth of the antenna is defined as: a bandwidth at which, for example, a value regarding reflection is equal to or smaller than a predetermined value; or the like. In the example of setting the value regarding reflection to be equal to or smaller than a predetermined value, the bandwidth of the antenna is defined such that, for example, the value regarding reflection becomes equal to or smaller than −10 dB. The upper limit of the fractional bandwidth is limited not only by a power supply method but also by the bandwidths of the element antennas composing the antenna. The upper limit of the fractional bandwidth is, for example, about 10%.

As a power supply circuit capable of realizing an equiphase distribution and capable of realizing wide-band antenna frequency characteristics, there is a power supply circuit of a parallel power supply type (tournament-tree type) formed so as to have equal wire lengths to respective element antennas. In the power supply circuit of the parallel power supply type, a larger number of the element antennas composing one reception antenna or transmission antenna leads to further spreading in a lateral direction (the direction in which the antennas are adjacent), and the antennas can be arranged only at a longer interval. For example, if the frequency is 77 GHz, the wavelength $\lambda$ is about 3.9 mm. In the case where the conventional radar device in Patent Document 1 employs the power supply circuit of the parallel power supply type, if the power supply circuit is disposed in a larger space, the reception antennas need to be arranged at a phase center interval longer than $\lambda/2$. Thus, the reception antennas cannot be arranged at the phase center interval of $\lambda/2$. If the reception antennas cannot be arranged at the phase center interval of $\lambda/2$, for example, a high side lobe or/and a high grating lobe are generated within a desired coverage (field-of-view range). Consequently, an object to be detected might be erroneously detected. An object to be detected might be erroneously detected also if power is supplied to each element antenna in the lateral direction (the direction in which the antennas are adjacent) in the case where the power supply circuit is not of the parallel power supply type. The desired field-of-view range is a field-of-view range having been set in designing, i.e., a designed field-of-view range.

If a distance that is the phase center interval between the reception antennas is defined as d, the distance d is determined according to setting of the field-of-view range, i.e., a range of an angle θ within which angle measurement can be performed. For example, if the angle θ is not smaller than −90° and not larger than 90°, the distance d needs to be set to fall within a range of longer than 0 and not longer than λ/2. If the conventional radar device in Patent Document 1 employs a power supply circuit of a type that allows power supply in the lateral direction such as the parallel power supply type, three or more channels of reception antennas cannot be arranged at an interval which is the predetermined distance d while the angle θ is kept being not smaller than −90° and not larger than 90°.

An object of the present disclosure is to provide a radar device capable of reducing side lobe and inhibiting erroneous detection even if three or more channels of reception antennas or transmission antennas cannot be physically arranged at an interval which is a predetermined distance.

Solution to the Problems

A radar device according to one aspect of the present disclosure includes: a plurality of transmission antennas each of which emits a transmission signal toward a target object; a plurality of reception antennas which receive reflection signals resulting from reflection of the transmission signal by the target object and output the reflection signals as reception signals; and a processing unit which processes the reception signals outputted from the plurality of respective reception antennas. An antenna interval, between adjacent ones of the antennas, that is determined on the basis of a field-of-view range required for the radar device is defined as a basic distance. An antenna group that includes either the plurality of transmission antennas or the plurality of reception antennas and that includes a first antenna set having a plurality of first antennas such that an antenna interval between adjacent ones of the first antennas is the basic distance, is defined as a first antenna group. An antenna group that includes others, out of the plurality of antennas, different from the first antennas in the first antenna group and that includes a second antenna set having a plurality of second antennas such that an antenna interval between adjacent ones of the second antennas is 2 times the basic distance, is defined as a second antenna group. Each of the first antennas and the second antennas includes a plurality of element antennas and a power supply circuit which supplies power to the element antennas. The plurality of first antennas are arranged side by side in a first array direction perpendicular to a transmission direction of the transmission signal, and each first antenna has the power supply circuit on a positive side or a negative side thereof in the first array direction. The plurality of second antennas are arranged side by side in a second array direction that is perpendicular to the transmission direction of the transmission signal and that is parallel to the first array direction, and each second antenna has the power supply circuit on a positive side or a negative side thereof in the second array direction. None of the power supply circuits is located between adjacent ones of the antennas in the first antenna set. In a virtual reception antenna group composed of a plurality of virtual reception antennas formed by the plurality of first antennas in the first antenna group and the plurality of second antennas in the second antenna group, the virtual reception antennas are arranged side by side in a third array direction that is perpendicular to the transmission direction of the transmission signal and that is parallel to the first array direction and the second array direction, and an interval in the third array direction between adjacent ones of the virtual reception antennas is the basic distance.

Effect of the Invention

In the radar device according to the one aspect of the present disclosure, the first antenna group includes the first antenna set having the plurality of first antennas such that the antenna interval between adjacent ones of the first antennas is the basic distance, the second antenna group includes the second antenna set having the plurality of second antennas such that the antenna interval between adjacent ones of the second antennas is 2 times the basic distance, and the interval between adjacent virtual reception antennas among the plurality of virtual reception antennas formed through transmission and reception by the plurality of first antennas and the plurality of second antennas is the basic distance. Consequently, the radar device can reduce side lobe and inhibit erroneous detection even if three or more channels of reception antennas or transmission antennas cannot be physically arranged at an interval which is the predetermined distance.

DESCRIPTION OF EMBODIMENTS

Embodiment 1

Figure 1:
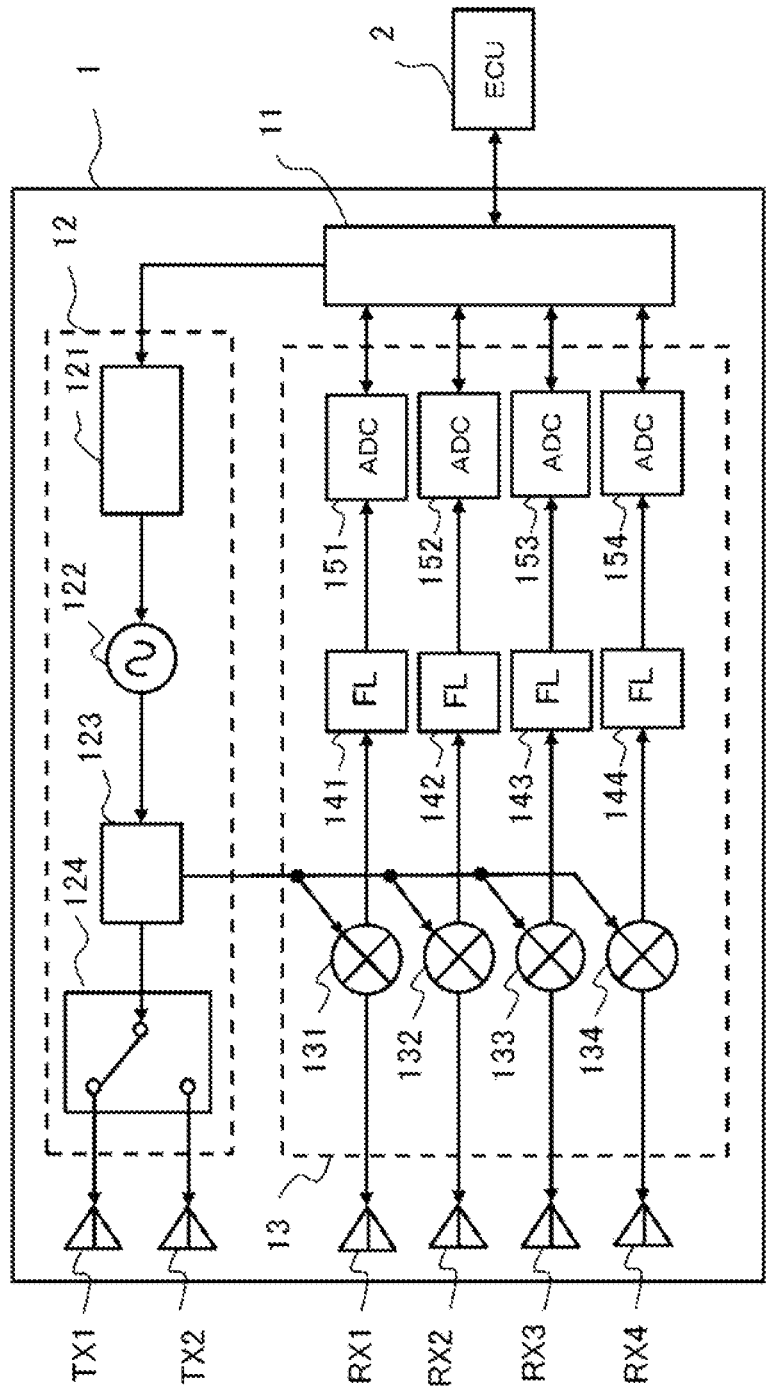
FIG. 1 illustrates a configuration of a radar device according to embodiment 1.
Figure 2:
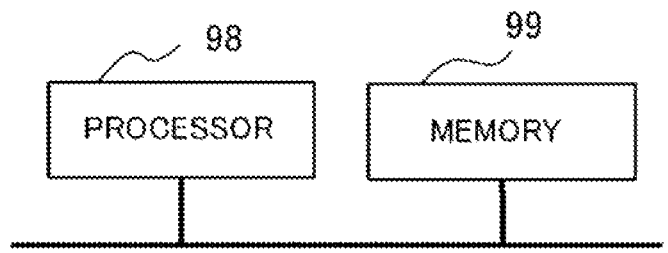
FIG. 2 illustrates an example of a hardware configuration for realizing functions of a processing unit in FIG. 1.
Figure 3:
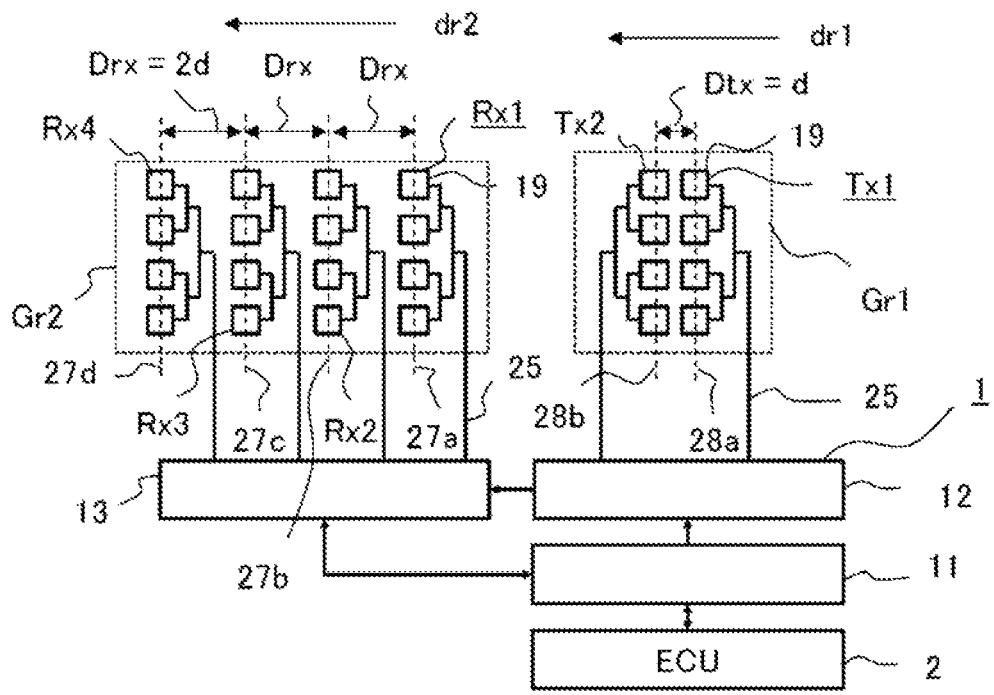
FIG. 3 illustrates a first example of an antenna arrangement in the radar device according to embodiment 1.
Figure 4:
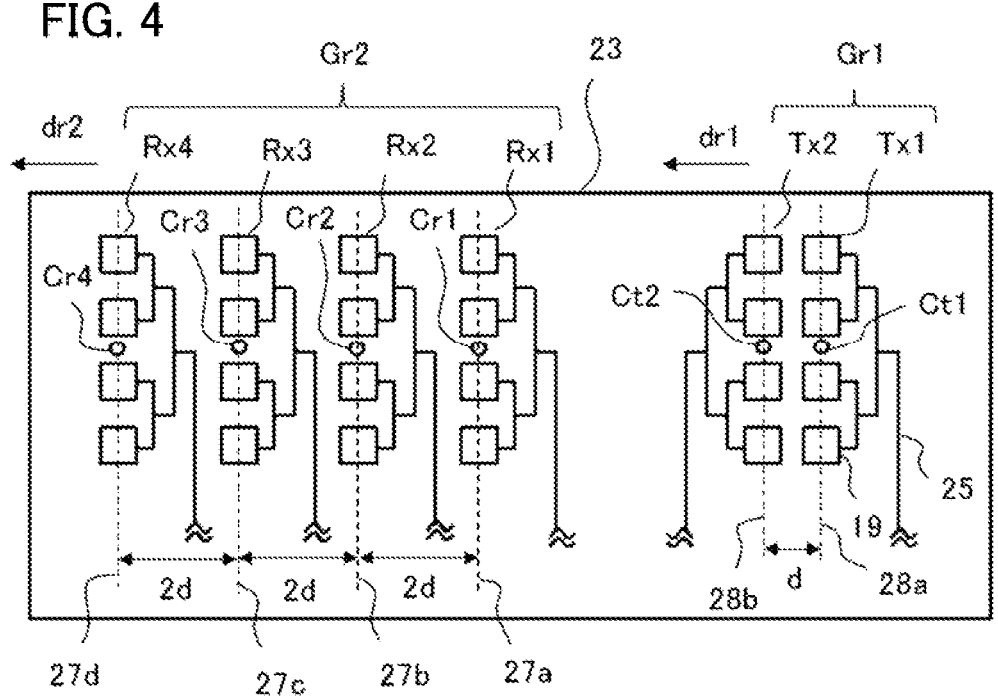
FIG. 4 illustrates details of the antenna arrangement in FIG. 3.
Figure 5:
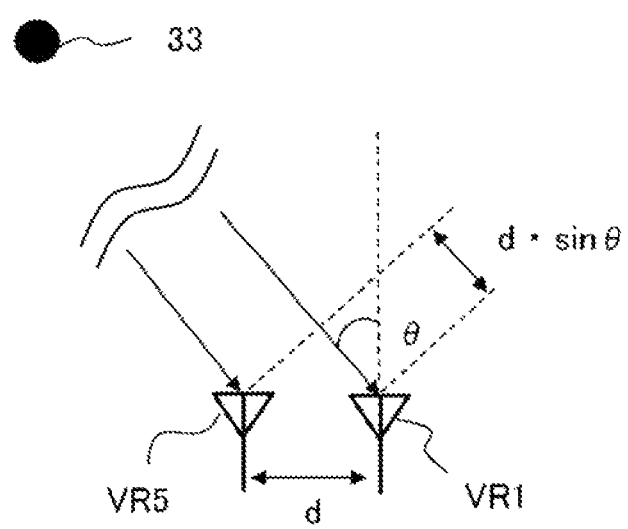
FIG. 5 illustrates an angle measurement method performed by the radar device according to embodiment 1.
Figure 6:
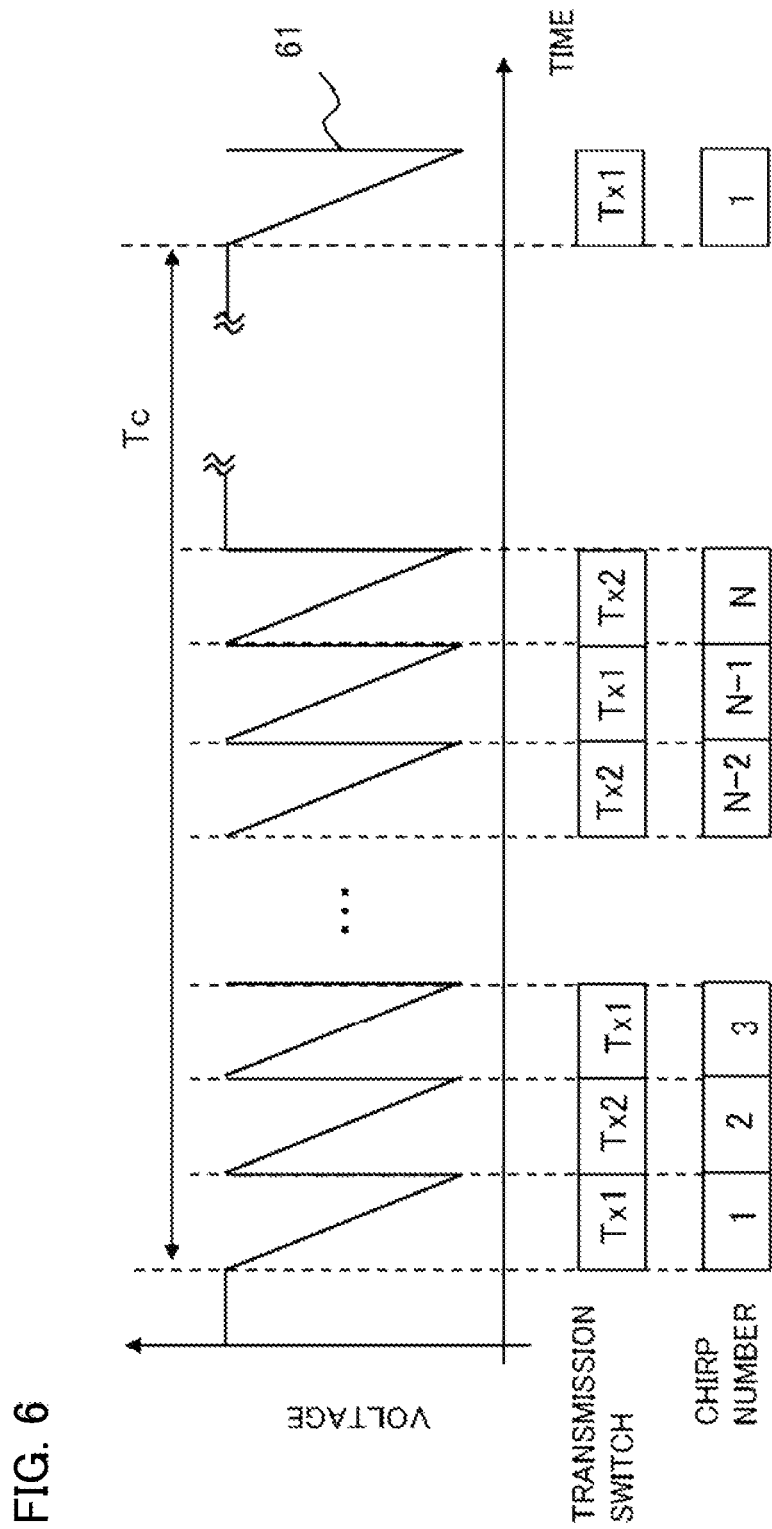
FIG. 6 illustrates an example of a modulation pattern in the radar device according to embodiment 1.
Figure 7:
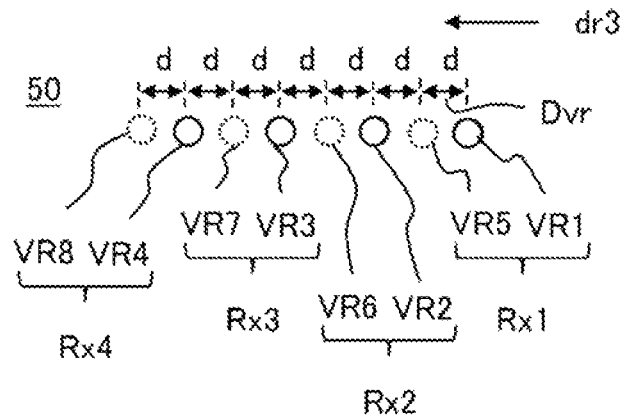
FIG. 7 illustrates a virtual reception antenna group corresponding to the antenna arrangement in FIG. 3.
Figure 8:
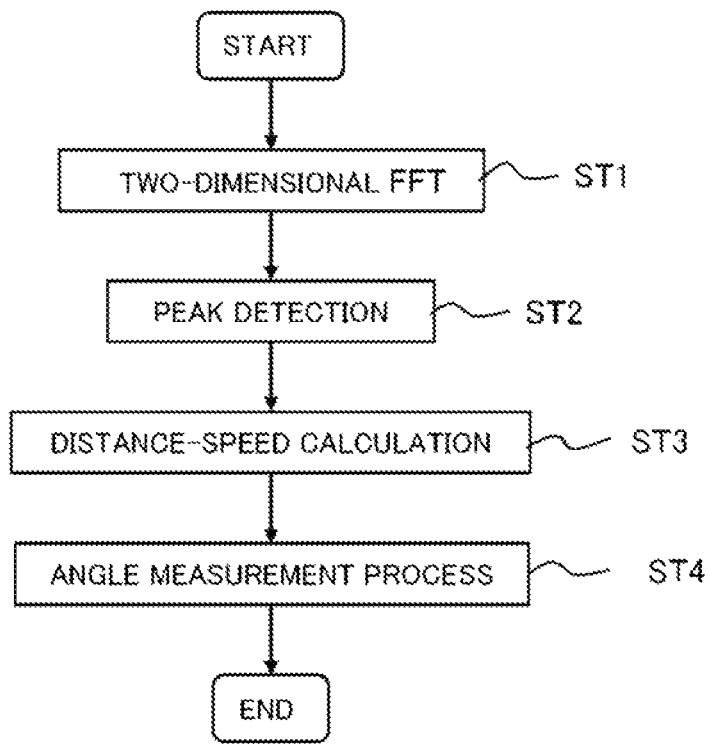
FIG. 8 is a flowchart showing a process performed by the radar device according to embodiment 1.
Figure 9:
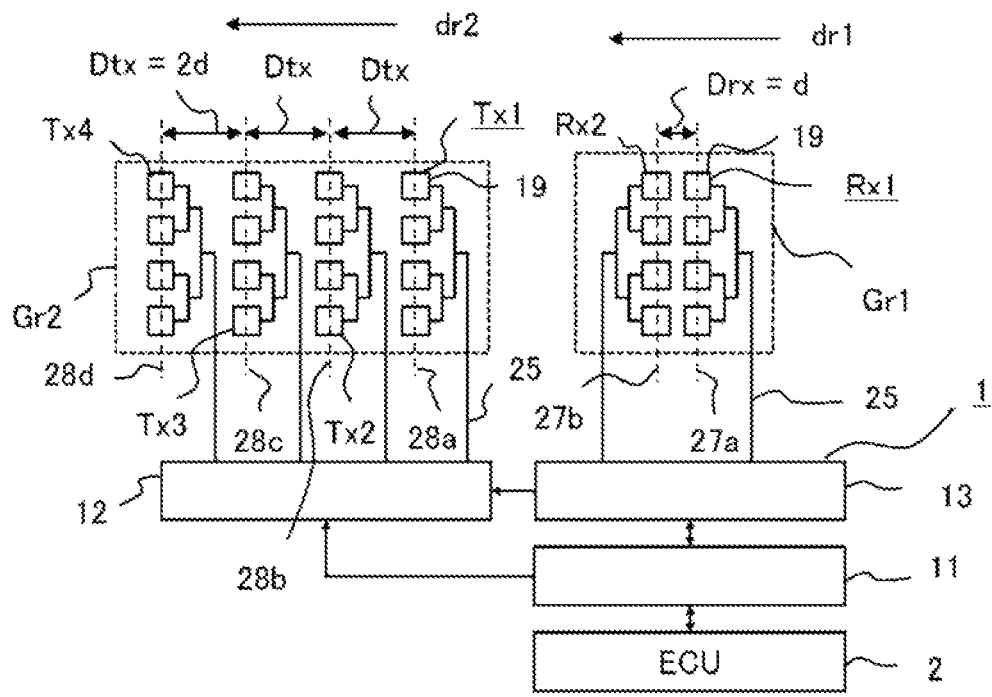
FIG. 9 illustrates a second example of the antenna arrangement in the radar device according to embodiment 1.
Figure 10:
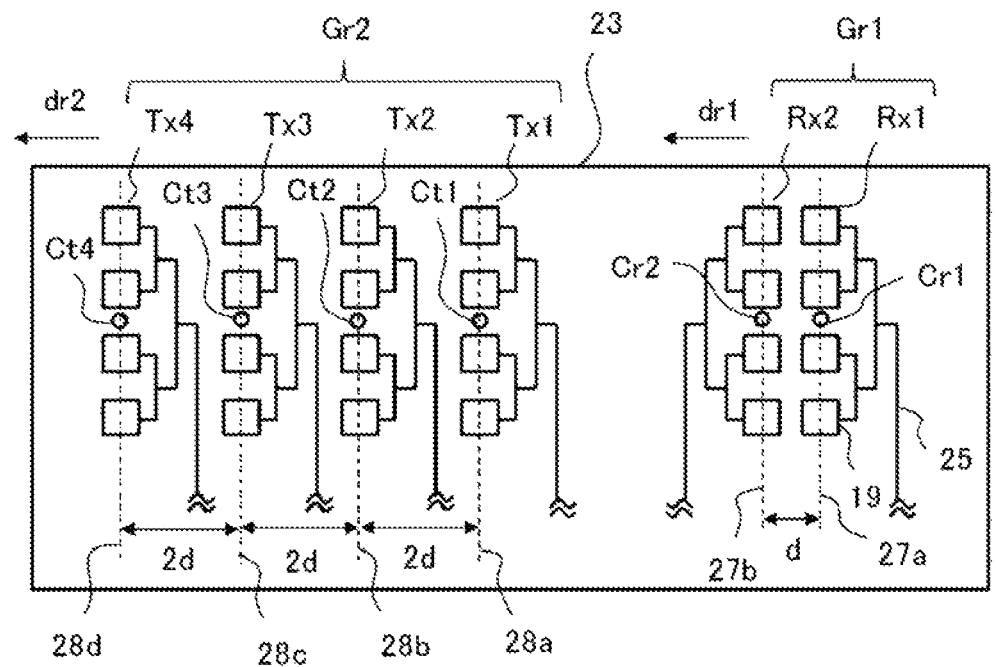
FIG. 10 illustrates details of the antenna arrangement in FIG. 9.
Figure 11:
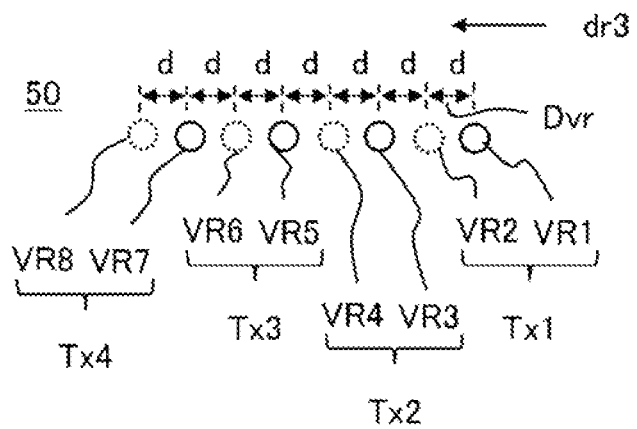
FIG. 11 illustrates a virtual reception antenna group corresponding to the antenna arrangement in FIG. 9.
Figure 12:
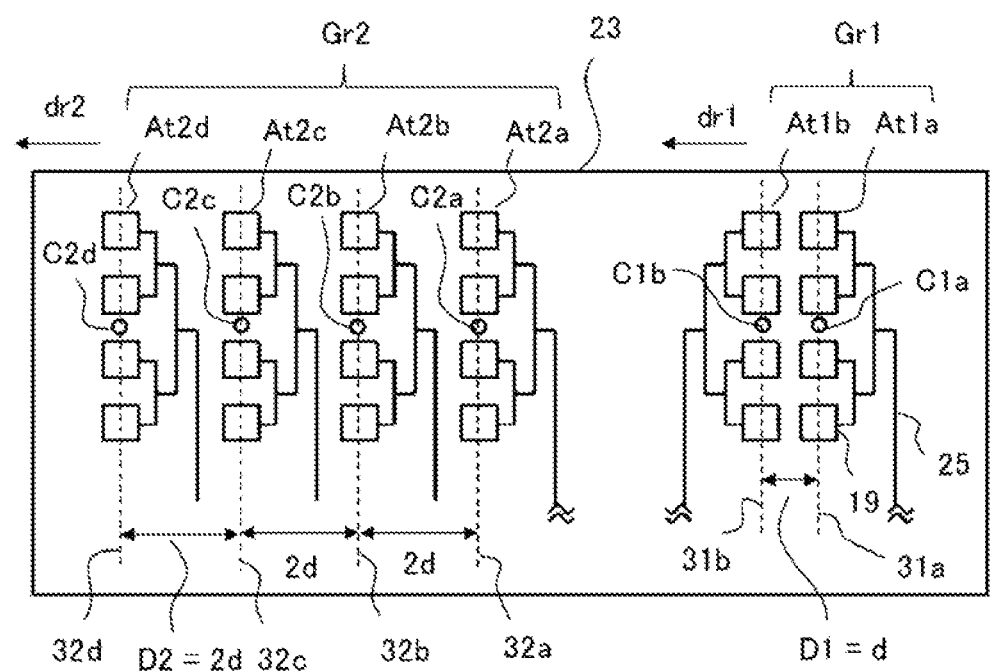
FIG. 12 illustrates a third example of the antenna arrangement in the radar device according to embodiment 1.
Figure 13:
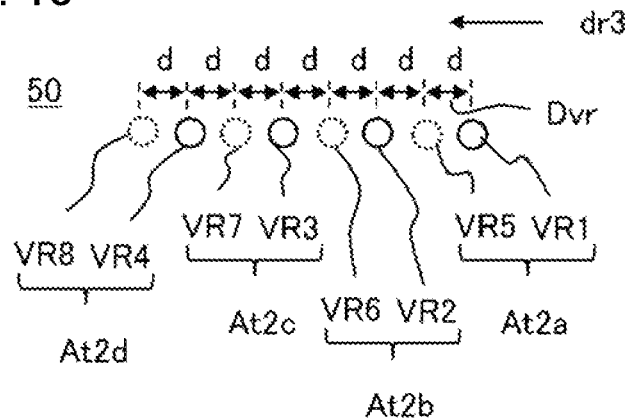
FIG. 13 illustrates a first example of a virtual reception antenna group corresponding to the antenna arrangement in FIG. 12.
Figure 14:
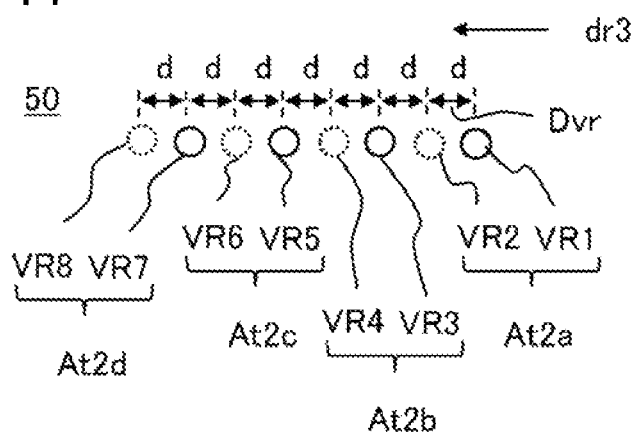
FIG. 14 illustrates a second example of the virtual reception antenna group corresponding to the antenna arrangement in FIG. 12.
Figure 15:
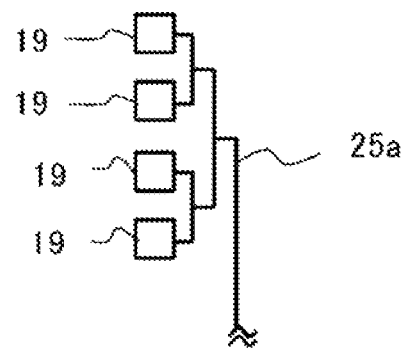
FIG. 15 illustrates a first example of an antenna of the radar device according to embodiment 1.
Figure 16:
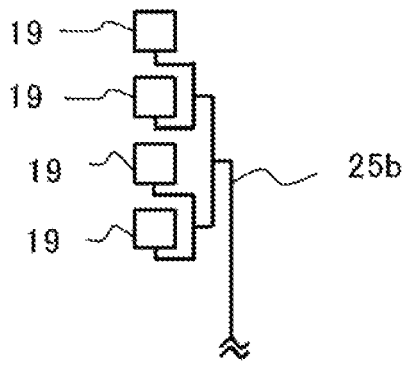
FIG. 16 illustrates a second example of the antenna of the radar device according to embodiment 1.
Figure 17:
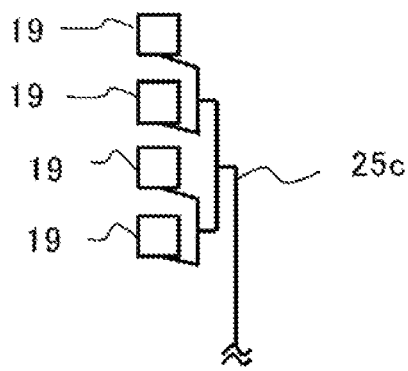
FIG. 17 illustrates a third example of the antenna of the radar device according to embodiment 1.
Figure 18:
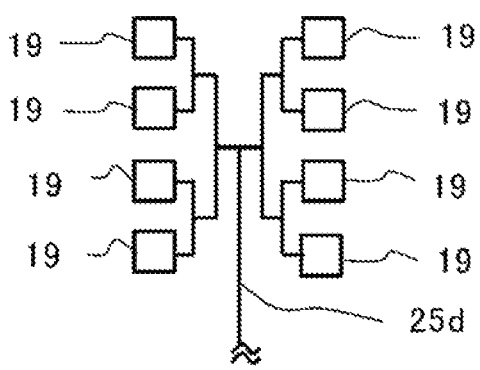
FIG. 18 illustrates a fourth example of the antenna of the radar device according to embodiment 1.
Figure 19:
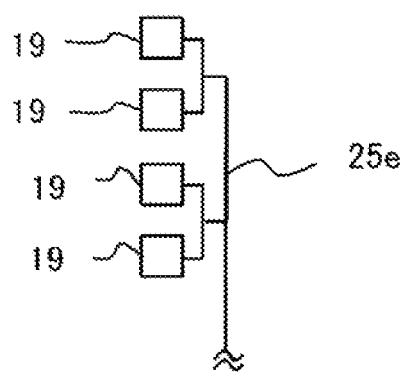
FIG. 19 illustrates a fifth example of the antenna of the radar device according to embodiment 1.
Figure 20:
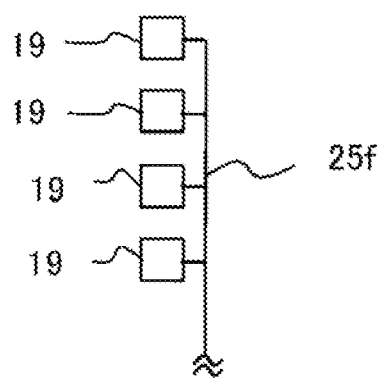
FIG. 20 illustrates a sixth example of the antenna of the radar device according to embodiment 1.
Figure 21:
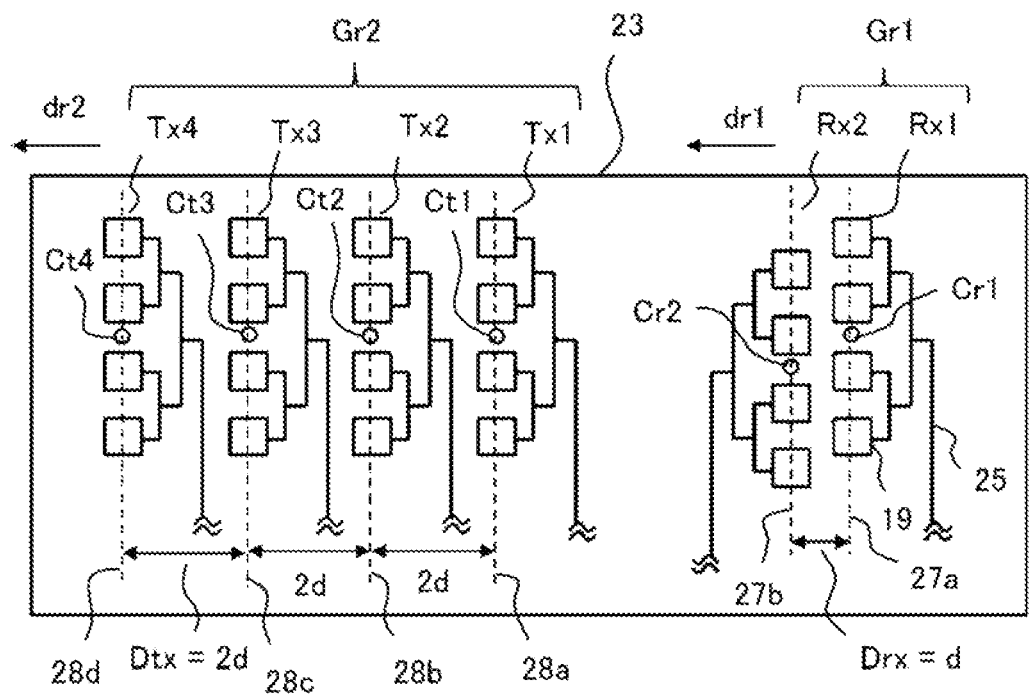
FIG. 21 illustrates a fourth example of the antenna arrangement in the radar device according to embodiment 1.
Figure 22:
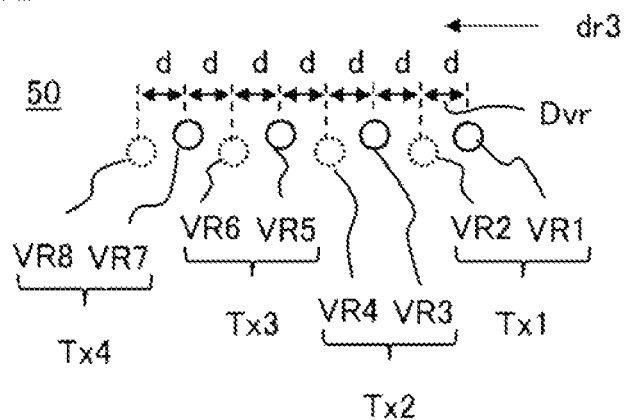
FIG. 22 illustrates a virtual reception antenna group corresponding to the antenna arrangement in FIG. 21.
Figure 23:
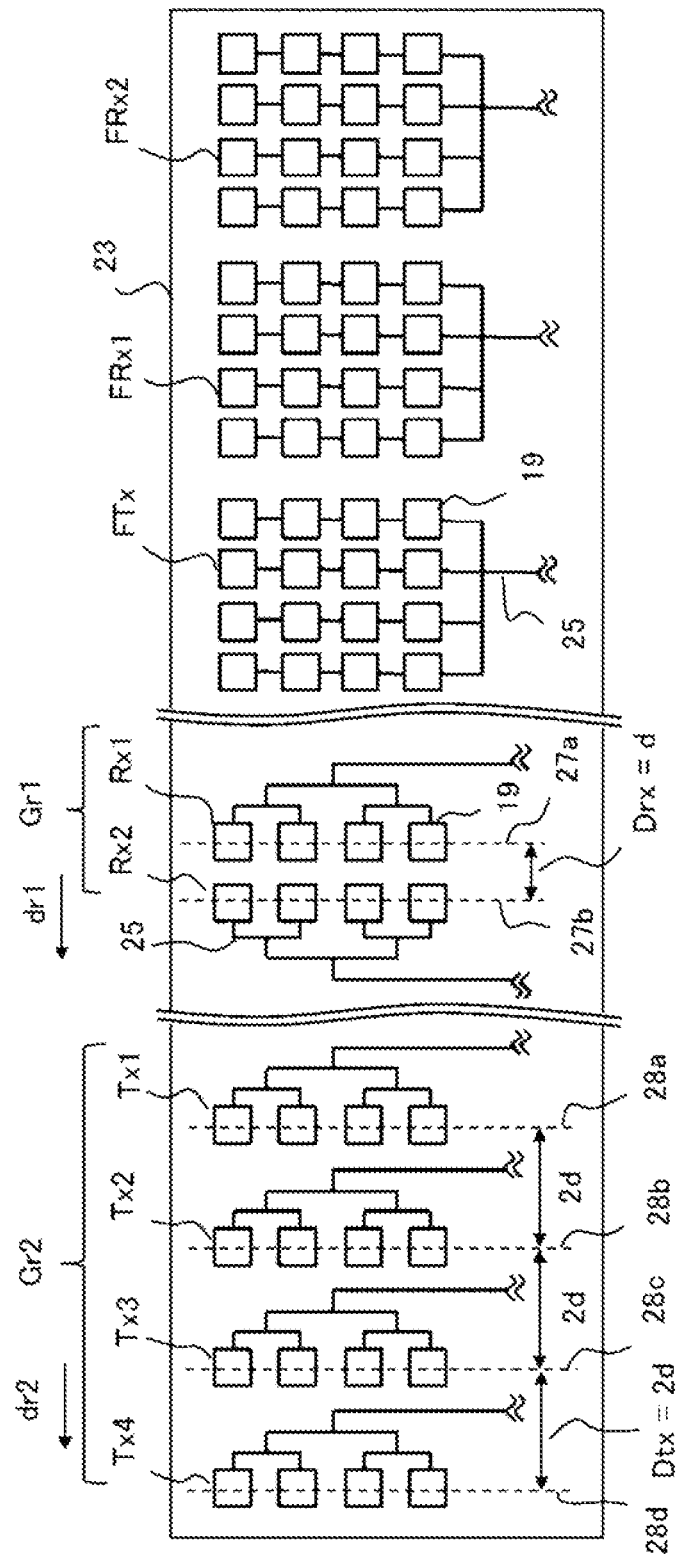
FIG. 23 illustrates a fifth example of the antenna arrangement in the radar device according to embodiment 1.
Figure 24:
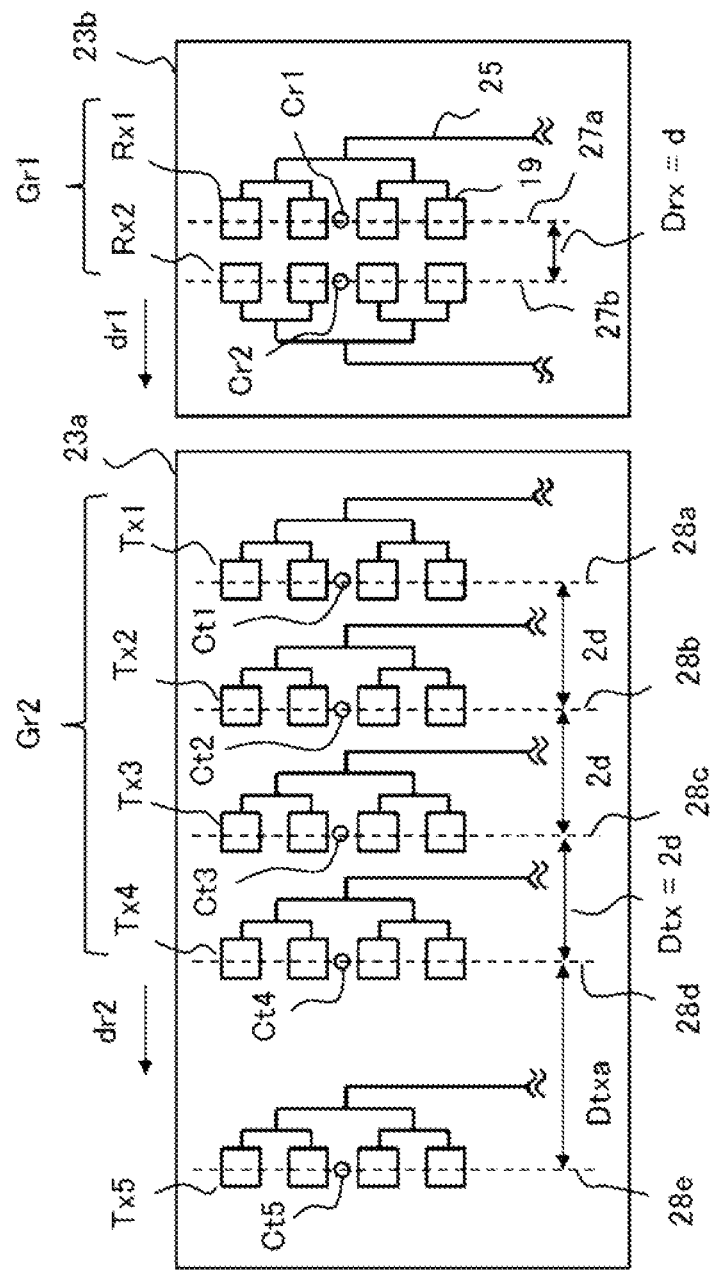
FIG. 24 illustrates a sixth example of the antenna arrangement in the radar device according to embodiment 1.
Figure 25:
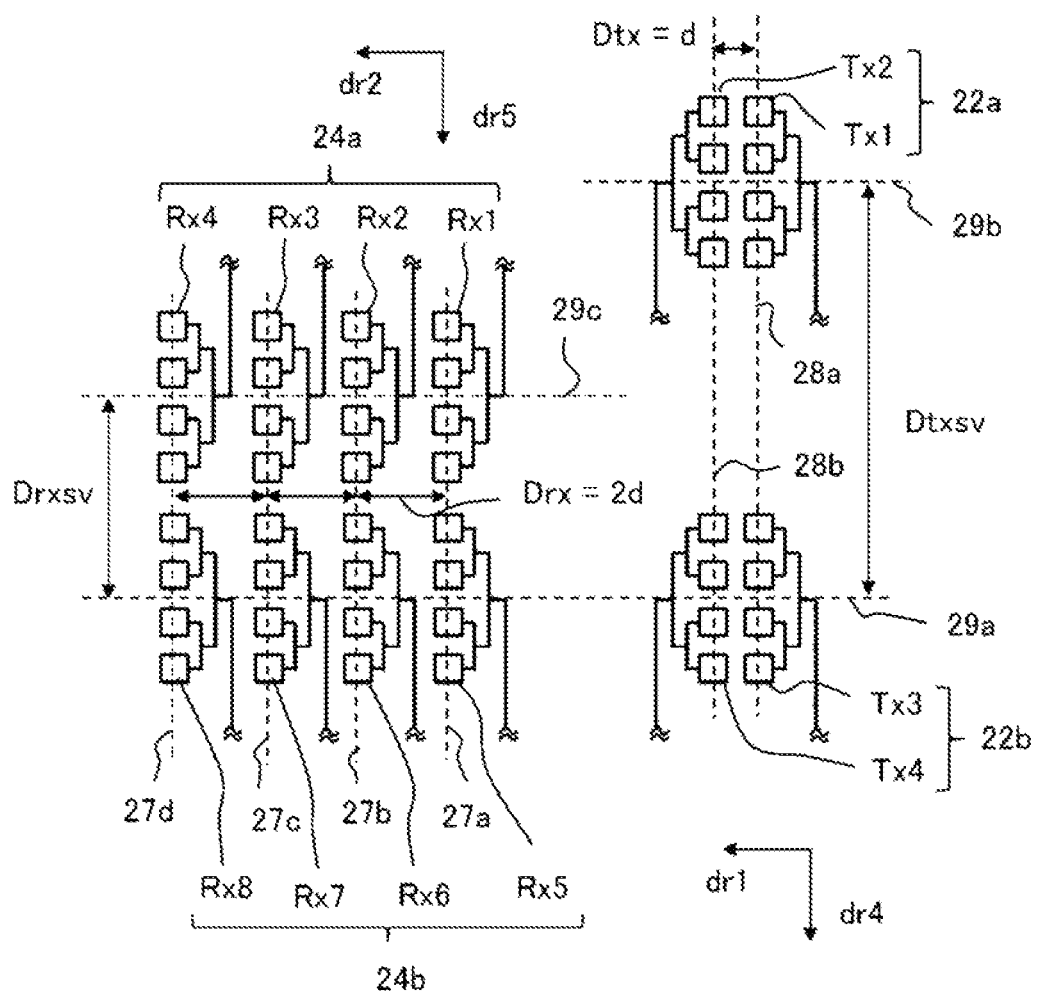
FIG. 25 illustrates a seventh example of the antenna arrangement in the radar device according to embodiment 1.
Figure 26:
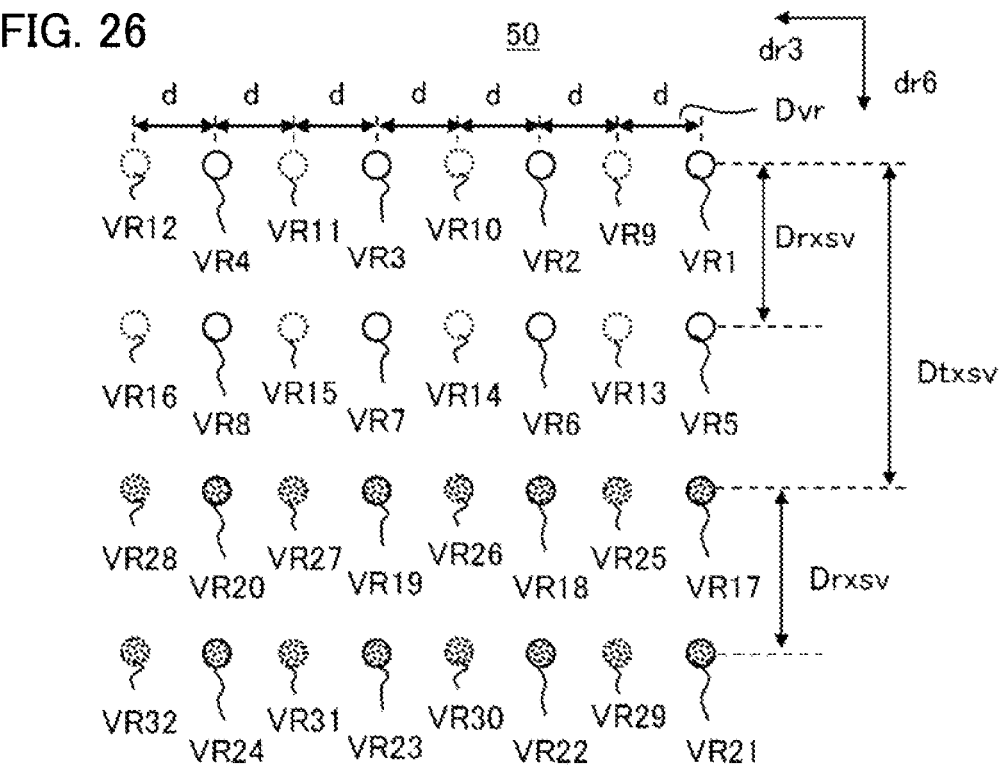
FIG. 26 illustrates a virtual reception antenna group corresponding to the antenna arrangement in FIG. 25.

FIG. 1 illustrates a configuration of a radar device according to embodiment 1, and FIG. 2 illustrates an example of a hardware configuration for realizing functions of a processing unit in FIG. 1. FIG. 3 illustrates a first example of an antenna arrangement in the radar device according to embodiment 1, and FIG. 4 illustrates details of the antenna arrangement in FIG. 3. FIG. 5 illustrates an angle measurement method performed by the radar device according to embodiment 1, and FIG. 6 illustrates an example of a modulation pattern in the radar device according to embodiment 1. FIG. 7 illustrates a virtual reception antenna group corresponding to the antenna arrangement in FIG. 3, and FIG. 8 is a flowchart showing a process performed by the radar device according to embodiment 1. FIG. 9 illustrates a second example of the antenna arrangement in the radar device according to embodiment 1. FIG. 10 illustrates details of the antenna arrangement in FIG. 9, and FIG. 11 illustrates a virtual reception antenna group corresponding to the antenna arrangement in FIG. 9. FIG. 12 illustrates a third example of the antenna arrangement in the radar device according to embodiment 1. FIG. 13 illustrates a first example of a virtual reception antenna group corresponding to the antenna arrangement in FIG. 12, and FIG. 14 illustrates a second example of the virtual reception antenna group corresponding to the antenna arrangement in FIG. 12. FIG. 15 illustrates a first example of an antenna of the radar device according to embodiment 1, and FIG. 16 illustrates a second example of the antenna of the radar device according to embodiment 1. FIG. 17 illustrates a third example of the antenna of the radar device according to embodiment 1, and FIG. 18 illustrates a fourth example of the antenna of the radar device according to embodiment 1. FIG. 19 illustrates a fifth example of the antenna of the radar device according to embodiment 1, and FIG. 20 illustrates a sixth example of the antenna of the radar device according to embodiment 1. FIG. 21 illustrates a fourth example of the antenna arrangement in the radar device according to embodiment 1, and FIG. 22 illustrates a virtual reception antenna group corresponding to the antenna arrangement in FIG. 21. FIG. 23 illustrates a fifth example of the antenna arrangement in the radar device according to embodiment 1, and FIG. 24 illustrates a sixth example of the antenna arrangement in the radar device according to embodiment 1. FIG. 25 illustrates a seventh example of the antenna arrangement in the radar device according to embodiment 1, and FIG. 26 illustrates a virtual reception antenna group corresponding to the antenna arrangement in FIG. 25. The same or corresponding components in the drawings are shown while being denoted by the same reference characters, and redundant descriptions thereof are omitted.

A radar device 1 according to embodiment 1 includes a processing unit 11, a transmission circuit 12, a reception circuit 13, a plurality of transmission antennas Tx1 and Tx2, and a plurality of reception antennas Rx1, Rx2, Rx3, and Rx4. Constituent units each treated as one antenna such as these antennas Tx1, Tx2, Rx1, Rx2, Rx3, and Rx4 are referred to as channels. Hereinafter, the transmission antennas Tx1 and Tx2 are sometimes collectively referred to as transmission antennas Tx. Likewise, the reception antennas Rx1, Rx2, Rx3, and Rx4 are sometimes collectively referred to as reception antennas Rx.

The radar device 1 is mounted to a moving body. If the moving body is a vehicle, the radar device 1 is connected to an electronic control unit (ECU) 2 of the vehicle.

It is noted that FIG. 1 shows, as an example, a radar device 1 in which the number of the transmission antennas Tx is 2, and the number of the reception antennas Rx is 4. However, as in the third example of the antenna arrangement in the radar device 1 shown in FIG. 12, the radar device 1 according to embodiment 1 only has to have a configuration in which: two first antennas At1a and At1b are provided as transmission antennas or reception antennas arranged such that an antenna interval D1 between the adjacent first antennas is equal to a distance d which is a predetermined basic distance; and second antennas for operations opposite to those of the first antennas are channels, the number of which is any number equal to or larger than 2. If the first antennas are transmission antennas Tx, the second antennas are reception antennas Rx. If the first antennas are reception antennas Rx, the second antennas are transmission antennas Tx. FIG. 12 shows an example in which four second antennas At2a, At2b, At2c, and At2d are provided. The first antennas At1a and At1b are sometimes collectively referred to as first antennas At1. Likewise, the second antennas At2a, At2b, At2c, and At2d are sometimes collectively referred to as second antennas At2.

The radar device 1 emits a transmission signal generated by the transmission circuit 12, from the transmission antenna Tx1 or the transmission antenna Tx2 toward a target object 33 (see FIG. 5). The transmission signal is reflected by the target object 33 to be detected. Reflection signals as signals resulting from the reflection are received by the reception antennas Rx. The received signals are inputted as reception signals via the reception circuit 13 to the processing unit 11. The processing unit 11 performs signal processing on the reception signals, to calculate a distance to the target object 33, a relative speed of the target object 33, and an angle at which the target object 33 is present (hereinafter, referred to as the distance, the relative speed, and the angle of the target object). Hereinafter, a configuration of each component of the radar device 1 will be described.

The processing unit 11 controls operations of respective components such as the transmission antennas Tx, the reception antennas Rx, the transmission circuit 12, and the reception circuit 13 composing the radar device 1. In addition, the processing unit 11 causes generation of a transmission signal to be transmitted from either of the transmission antennas Tx and performs signal processing on reception signals received by the reception antennas Rx, to calculate a distance, a relative speed, and an angle of the target object.

The processing unit 11 is composed of, for example, a processor 98 implemented by a one-chip microcomputer having a function of a central processing unit (CPU) or by a programmable logic device (PLD) such as a field-programmable gate array (FPGA), and a memory 99 composed of a random access memory (RAM) and a read only memory (ROM). Each function of the processing unit 11 is realized through execution, by the processor 98, of a program stored in the memory 99. Each function may be executed through cooperation between a plurality of the processors 98 and a plurality of the memories 99. Details of the operations of the processing unit 11 will be described later.

The transmission circuit 12 is composed of a voltage generation circuit 121, a voltage control oscillator 122, a distribution circuit 123, and a transmission switch 124. The voltage generation circuit 121 generates a desired voltage waveform at a timing of control by the processing unit 11. The voltage control oscillator 122 generates a transmission signal on the basis of the voltage waveform generated by the voltage generation circuit 121, and causes oscillation of the transmission signal. FIG. 6 shows an example of a modulation pattern 61 of the transmission signal. The desired voltage waveform is a voltage waveform having been set in designing, i.e., a designed voltage waveform.

The distribution circuit 123 amplifies, as appropriate, the transmission signal having been subjected to oscillation by the voltage control oscillator 122. The distribution circuit 123 outputs the amplified transmission signal to the transmission switch 124 and also to each of mixers 131, 132, 133, and 134 described later provided to the reception circuit 13.

The transmission switch 124 is connected to the transmission antenna Tx1 and the transmission antenna Tx2 and switches, through control by the processing unit 11, an output destination between the transmission antenna Tx1 and the transmission antenna Tx2. Therefore, the transmission signal outputted from the distribution circuit 123 is emitted as a beam in the form of an electromagnetic wave from the transmission antenna Tx1 or Tx2 according to the state of the transmission switch 124.

The emitted electromagnetic wave is reflected by the target object 33. Electromagnetic waves resulting from the reflection by the target object 33 are received by the respective reception antennas Rx1, Rx2, Rx3, and Rx4. The reception signals received by the respective reception antennas Rx1, Rx2, Rx3, and Rx4 are inputted to the reception circuit 13.

The reception circuit 13 is composed of the mixers 131, 132, 133, and 134, filter circuits 141, 142, 143, and 144, and analog-to-digital converters 151, 152, 153, and 154. Each analog-to-digital converter is abbreviated as ADC, as appropriate.

Each of the mixers 131, 132, 133, and 134, each of the filter circuits 141, 142, 143, and 144, and each of the ADCs 151, 152, 153, and 154 are provided to a corresponding one of the reception antennas Rx1, Rx2, Rx3, and Rx4.

To the mixers 131, 132, 133, and 134, the reception signals received by the respective reception antennas Rx1, Rx2, Rx3, and Rx4 are inputted. In addition, to each of the mixers 131, 132, 133, and 134, the transmission signal is inputted from the distribution circuit 123 of the transmission circuit 12 as described above. Each of the mixers 131, 132, 133, and 134 mixes the reception signal received by the corresponding one of the reception antennas Rx1, Rx2, Rx3, and Rx4 and the transmission signal inputted from the distribution circuit 123 of the transmission circuit 12 with each other, and outputs the resultant wave mixture.

Each of the filter circuits 141, 142, 143, and 144 is composed of: a band-pass filter that extracts a signal in a desired frequency band; and an amplification circuit that amplifies the signal. Each of the filter circuits 141, 142, 143, and 144 extracts only a signal in the desired frequency band from the wave mixture outputted from the corresponding one of the mixers 131, 132, 133, and 134, amplifies the extracted signal, and outputs the amplified signal as a reception signal voltage. The desired frequency band is a frequency band having been set in designing, i.e., a designed frequency band.

Each of the ADCs 151, 152, 153, and 154 is composed of a converter that performs A/D conversion so as to convert an analog signal into a digital signal. At a timing of control by the processing unit 11, each of the ADCs 151, 152, 153, and 154 converts the reception signal voltage outputted from the corresponding one of the filter circuits 141, 142, 143, and 144 into digital voltage data through A/D conversion. The digital voltage data is inputted to the processing unit 11, stored in the memory 99 of the processing unit 11, and used for arithmetic processing described later.

Next, the transmission antennas Tx and the reception antennas Rx will be described. The transmission antennas Tx1 and Tx2, and the reception antennas Rx1, Rx2, Rx3, and Rx4, each include a plurality of element antennas 19 and a power supply circuit 25 and are arranged on a plane as shown in FIG. 3 and FIG. 4. Each element antenna 19 is, for example, a patch antenna.

The transmission antennas Tx and the reception antennas Rx are arranged on a front surface of a substrate 23. The transmission antennas Tx and the reception antennas Rx may be arranged on the same substrate 23 as in FIG. 4. Alternatively, as in FIG. 24, the transmission antennas Tx may be arranged on one substrate, and the reception antennas Rx may be arranged on another substrate. FIG. 24 shows an example in which the transmission antennas Tx are arranged on a substrate 23a, and the reception antennas Rx are arranged on a substrate 23b.

In the radar device 1 according to embodiment 1, each of the transmission antennas Tx and the reception antennas Rx is formed by a combination of the plurality of element antennas 19. For example, in a first example of the antenna arrangement in FIG. 3 and FIG. 4, if each white quadrangle is defined as one element antenna 19, each transmission antenna Tx is composed of four element antennas 19. Each reception antenna Rx is also composed of four element antennas 19. It is noted that the number of the element antennas 19 is not limited to 4 and may be set to any number as appropriate.

The transmission antenna Tx1 and the transmission antenna Tx2 are designed to have emission characteristics that are substantially the same as each other. Likewise, the reception antennas Rx1, Rx2, Rx3, and Rx4 are designed to have emission characteristics that are substantially the same as one another. The emission characteristics that are substantially the same are emission characteristics, the difference among which falls within an allowable range. Meanwhile, the emission characteristics of the transmission antennas Tx and the emission characteristics of the reception antennas Rx may be different from each other. It is noted that the emission direction of a radio wave emitted from each transmission antenna Tx is a direction perpendicular to a flat surface, i.e., a front surface or a back surface, of the substrate 23. In FIG. 4, the emission direction is a direction perpendicular to the drawing sheet.

The transmission antenna Tx1 includes a plurality of element antennas 19 arranged along a phase center line 28a extending through a phase center Ct1. The transmission antenna Tx2 includes a plurality of element antennas 19 arranged along a phase center line 28b extending through a phase center Ct2. The plurality of element antennas 19 of each transmission antenna Tx are arranged along the phase center line extending through the corresponding phase center. In each of the reception antennas Rx1, Rx2, Rx3, and Rx4 as well, a plurality of element antennas 19 thereof are arranged along a phase center line extending through a corresponding phase center in the same manner as in the transmission antennas Tx. The reception antenna Rx1 includes a plurality of element antennas 19 arranged along a phase center line 27a extending through a phase center Cr1, and the reception antenna Rx2 includes a plurality of element antennas 19 arranged along a phase center line 27b extending through a phase center Cr2. The reception antenna Rx3 includes a plurality of element antennas 19 arranged along a phase center line 27c extending through a phase center Cr3, and the reception antenna Rx4 includes a plurality of element antennas 19 arranged along a phase center line 27d extending through a phase center Cr4. The extension direction of the phase center line of each of the transmission antennas Tx and the reception antennas Rx matches with the extension direction of the plurality of element antennas 19.

As shown in FIG. 3 and FIG. 4, the transmission antennas Tx are arranged side by side on the front surface of the substrate 23 so as to be parallel to each other, i.e., such that the respective phase center lines are parallel to each other. Hereinafter, the array direction of the transmission antennas Tx is referred to as a first array direction dr1. The first array direction dr1 is a direction perpendicular to the transmission direction of the transmission signal and is a direction perpendicular to the phase center lines 28a and 28b. If a certain distance described later determined according to the desired field-of-view range of the radar device 1 is defined as a distance d, a transmission antenna interval Dtx between the two transmission antennas Tx1 and Tx2, i.e., the interval between the phase center line 28a and the phase center line 28b, is an interval equal to the distance d. The desired field-of-view range is a field-of-view range having been set in designing so as to attain a required field-of-view range, i.e., a designed field-of-view range.

Likewise, as shown in FIG. 3 and FIG. 4, the reception antennas Rx are arranged side by side on the front surface of the substrate 23 so as to be parallel to one another, i.e., such that the respective phase center lines are parallel to one another. Hereinafter, the array direction of the reception antennas Rx is referred to as a second array direction dr2. The second array direction dr2 is a direction perpendicular to the transmission direction of the transmission signal and is a direction perpendicular to the phase center lines 27a to 27d. The first array direction dr1 and the second array direction dr2 are parallel to each other. FIG. 3 and FIG. 4 each show an example in which the phase centers Ct1 and Ct2 of the transmission antennas Tx and the phase centers Cr1, Cr2, Cr3, and Cr4 of the reception antennas Rx are arranged on a same straight line. The transmission antennas Tx1 and Tx2 are arranged sequentially toward a positive side in the first array direction dr1, and the reception antennas Rx1, Rx2, Rx3, and Rx4 are arranged sequentially toward a positive side in the second array direction dr2. In FIG. 3 and FIG. 4, a reception antenna interval Drx between adjacent ones of the reception antennas Rx1, Rx2, Rx3, and Rx4 is 2 times the distance d, i.e., 2d.

Each of the transmission antennas Tx1 and Tx2 includes the power supply circuit 25 which supplies power to the element antennas 19 of the transmission antenna. Likewise, each of the reception antennas Rx1, Rx2, Rx3, and Rx4 includes the power supply circuit 25 which supplies power to the element antennas 19 of the reception antenna. FIG. 3 and FIG. 4 each show, as an example of the power supply circuit 25, a power supply circuit of a parallel power supply type formed so as to have equal wire lengths to the respective element antennas 19. Each of the transmission antennas Tx1 and Tx2 has the power supply circuit 25 arranged on a positive side or a negative side thereof in the first array direction dr1, and each of the reception antennas Rx1, Rx2, Rx3, and Rx4 has the power supply circuit 25 arranged on a positive side or a negative side thereof in the second array direction dr2. The element antennas 19 of the transmission antennas Tx1 and Tx2 are arranged so as to face each other such that the power supply circuit 25 of one of the transmission antennas is not located in a region adjacent to the other transmission antenna. The element antennas 19 of the reception antennas Rx1, Rx2, Rx3, and Rx4 are arranged so as not to face each other with the power supply circuit 25 of one of the reception antennas being located in a region adjacent to another one of the reception antennas. Here, an antenna group including a set of antennas, the antenna interval between which is equal to or shorter than the distance d, is defined as a first antenna group Gr1, and an antenna group including no set of antennas, the antenna interval between which is equal to or shorter than the distance d, is defined as a second antenna group Gr2. In the first example of the antenna arrangement shown in FIG. 3 and FIG. 4, the transmission antennas Tx1 and Tx2 are antennas in the first antenna group Gr1, and the reception antennas Rx1, Rx2, Rx3, and Rx4 are antennas in the second antenna group Gr2.

In the radar device 1 according to embodiment 1, the transmission antennas Tx and the reception antennas Rx form virtual reception antennas. Each virtual reception antenna refers to a virtual reception antenna formed through multiple-input multiple-output (MIMO) technologies. In general, virtual reception antennas are often formed by a plurality of transmission antennas arranged at a first interval and a plurality of reception antennas arranged at a second interval shorter than the first interval. Configuring is performed such that a transmission signal from any of the transmission antennas is received by each reception antenna and subjected to signal processing so that interpolation between the transmission antennas arranged at the longer interval can be performed with the reception antennas. The plurality of virtual reception antennas compose a virtual reception antenna group. In a radar device in which such a plurality of virtual reception antennas are formed, the number of the virtual reception antennas is the number of the reception antennas multiplied by the number of the transmission antennas, and a desired antenna directivity can be realized with a smaller number of reception antennas than in the case where the number of the transmission antennas is one. The desired antenna directivity is an antenna directivity having been set in designing, i.e., a designed antenna directivity.

A virtual reception antenna group 50 formed by the transmission antennas Tx and the reception antennas Rx in the first example of the antenna arrangement in FIG. 3 and FIG. 4 is shown in FIG. 7. The virtual reception antenna group 50 includes a plurality of virtual reception antennas and is composed of the plurality of virtual reception antennas. Eight virtual reception antennas VR1, VR2, VR3, VR4, VR5, VR6, VR7, and VR8 are formed by the two transmission antennas Tx1 and Tx2 and the four reception antennas Rx1, Rx2, Rx3, and Rx4. The radar device 1 according to embodiment 1 is configured such that the virtual reception antennas VR1, VR2, VR3, VR4, VR5, VR6, VR7, and VR8 are arranged at regular intervals such that the interval between adjacent ones of the virtual reception antennas is the distance d. It is noted that each virtual reception antenna is indicated by a circle. The center of the circle corresponds to the phase center of the corresponding transmission antenna Tx or reception antenna Rx. The virtual reception antennas VR1 to VR8 are sometimes collectively referred to as virtual reception antennas VR, and the array direction of the virtual reception antennas VR is referred to as a third array direction dr3. The virtual reception antennas in the virtual reception antenna group 50 are arrayed in the third array direction dr3 at regular intervals each of which is the distance d. In the first example of the antenna arrangement in FIG. 3 and FIG. 4, the phase centers of the transmission antennas Tx and the reception antennas Rx are arranged on the same straight line, and thus the virtual reception antennas VR in the virtual reception antenna group 50 are arranged on the same straight line. The third array direction dr3 is a direction perpendicular to the transmission direction of the transmission signal and is a direction parallel to the first array direction dr1 and the second array direction dr2.

In the example in FIG. 7, the virtual reception antennas VR1, VR2, VR3, VR4, VR5, VR6, VR7, and VR8 are arranged in the order of VR1, VR5, VR2, VR6, VR3, VR7, VR4, and VR8 toward a positive side in the third array direction dr3. Out of the virtual reception antenna group 50, VR1, VR2, VR3, and VR4 indicated by solid-line circles are virtual reception antennas formed with signals that result from transmission by the transmission antenna Tx1 and that are received by the reception antennas Rx1, Rx2, Rx3, and Rx4, and VR5, VR6, VR7, and VR8 indicated by dash-line circles are virtual reception antennas formed with signals that result from transmission by the transmission antenna Tx2 and that are received by the reception antennas Rx1, Rx2, Rx3, and Rx4.

Next, descriptions will be given regarding: a method for determining a distance d; and a method for determining a transmission antenna interval Dtx which is the interval between adjacent ones of the transmission antennas Tx, a reception antenna interval Drx which is the interval between adjacent ones of the reception antennas Rx, and a virtual reception antenna interval Dvr which is the interval between adjacent ones of the virtual reception antenna VR in the virtual reception antenna group 50.

As described above, in the first example of the antenna arrangement shown in FIG. 3 and FIG. 4, the transmission antenna Tx1 and the transmission antenna Tx2 are arranged in the first array direction dr1 such that the transmission antenna interval Dtx therebetween is the distance d, and the reception antennas Rx1, Rx2, Rx3, and Rx4 are arranged in the second array direction dr2 such that the reception antenna interval Drx between adjacent ones of the reception antennas is 2 times the distance d, i.e., 2d.

In the radar device 1 according to embodiment 1, transmission signals are assumed to be alternately emitted from the transmission antenna Tx1 and the transmission antenna Tx2 according to, for example, the modulation pattern 61 described later shown in FIG. 6 through control by the processing unit 11. In this case, the radar device 1 can receive signals in a total of eight virtual reception channels including: four channels for signals that result from transmission by the transmission antenna Tx1 and that are received by the reception antennas Rx1, Rx2, Rx3, and Rx4; and four channels for signals that result from transmission by the transmission antenna Tx2 and that are received by the reception antennas Rx1, Rx2, Rx3, and Rx4. As shown in FIG. 7, the virtual reception channels are a total of eight channels for reception by the respective virtual reception antennas VR1, VR2, VR3, VR4, VR5, VR6, VR7, and VR8. The virtual reception channels of the virtual reception antennas VR1, VR2, VR3, VR4, VR5, VR6, VR7, and VR8 are defined as virtual reception channels VRC1, VRC2, VRC3, VRC4, VRC5, VRC6, VRC7, and VRC8.

As described above, in the radar device 1 according to embodiment 1, the virtual reception antenna interval Dvr between the virtual reception antennas VR1, VR2, VR3, VR4, VR5, VR6, VR7, and VR8 is set to the distance d. The distance d is a value determined such that no grating lobe occurs within the field-of-view range of the radar device 1. In general, if the wavelength of a radio wave is defined as $\lambda$, when the plurality of virtual reception antennas VR are arranged in the third array direction dr3 at an interval of $\lambda/2$, antennas (composing the virtual reception antenna group 50) can be designed such that no grating lobe occurs even upon oscillation of a beam within a range of ±90° with respect to the direction perpendicular to the third array direction dr3, i.e., the emission direction. The field-of-view range of the radar device 1 can also be considered as a field-of-view range within which angle measurement can be performed without ambiguousness, i.e., a field-of-view range within which angle measurement can be performed with high accuracy. That is, setting of the distance d to be $\lambda/2$ makes it possible to realize a radar device having, as the field-of-view range, the range of ±90° within which angle measurement can be performed with high accuracy and within which no grating lobe occurs.

For example, a radar device employing a phase monopulse method will be contemplated. In this case, as shown in FIG. 5, if, for example, the virtual reception antenna interval Dvr between two of the virtual reception antennas which are the virtual reception antennas VR1 and VR5 is defined as d, the wavelength of the transmission signal is defined as λ, and the phase difference between the two virtual reception antennas VR1 and VR5 is defined as φ, the following relationship is established between the phase difference φ and an angle θ of the target object 33. Here, as shown in FIG. 5, the angle θ is the angle of the target object 33 in the case where the emission direction of the transmission signal is defined as θ=0.

$$\varphi = (2\pi d/\lambda) \cdot \sin \theta \quad (1)$$

$$\theta = \sin^{-1}(\varphi \lambda \pi d) \quad (2)$$

Here, the phase difference φ falls within a range of ±π. Therefore, if the distance d is long, the field-of-view range of the radar device 1, i.e., the range of the angle θ within which angle measurement can be performed, is narrowed. Meanwhile, if the distance d is short, the field-of-view range of the radar device 1, i.e., the range of the angle θ within which angle measurement can be performed, is widened. As is obvious from expression (1) and expression (2), the distance d needs to be set to fall within the range of d≤λ/2 in order to measure an angle θ that falls within a field-of-view range of, for example, −90°≤θ≤+90°.

In this manner, the distance d is a value determined according to the desired field-of-view range required for the radar device 1, i.e., the range of the angle θ within which angle measurement is desired to be performed. In other words, if the virtual reception antenna interval Dvr between adjacent ones of the virtual reception antennas VR is longer than the distance d, a desired wide field-of-view range of the radar device 1 cannot be ensured. Therefore, if an angle measurement process is desired to be realized within the desired wide field-of-view range of the radar device 1, the virtual reception antenna interval Dvr between adjacent ones of the virtual reception antennas VR needs to be set to an interval equal to or shorter than the distance d. If the virtual reception antennas VR are set to be arranged at regular intervals such that the virtual reception antenna interval Dvr between adjacent ones of the virtual reception antennas is the distance d, maximization is attained at a necessary value. Thus, it is possible to increase the degree of freedom in: arrangement of the power supply circuits 25 of the reception antennas Rx and the transmission antennas Tx; setting of sizes of the element antennas 19; and the like.

Judging from the relationship in expression (2), the distance d changes also according to the wavelength λ of the transmission signal. Therefore, if the wavelength λ of the transmission signal is variable, the distance d is determined on the basis of the desired field-of-view range of the radar device 1 and the wavelength λ of the transmission signal.

Next, operation of the radar device 1 will be described. First, in the transmission circuit 12, the voltage generation circuit 121 generates a desired voltage waveform at a timing of control by the processing unit 11. The voltage control oscillator 122 generates a transmission signal on the basis of the generated voltage waveform and outputs the transmission signal. The distribution circuit 123 outputs the transmission signal to the transmission switch 124 and also to each of the mixers 131, 132, 133, and 134 in the reception circuit 13. The transmission signal is emitted from the transmission antenna Tx1 or Tx2 according to the state of the transmission switch 124.

The emitted transmission signal is reflected by the target object 33. Reflection signals resulting from the reflection of the transmission signal by the target object 33 are received by the respective reception antennas Rx1, Rx2, Rx3, and Rx4 and inputted as reception signals to the reception circuit 13.

In the reception circuit 13, the mixers 131, 132, 133, and 134, the filter circuits 141, 142, 143, and 144, and the ADCs 151, 152, 153, and 154 are connected so as to correspond to the reception antennas Rx1, Rx2, Rx3, and Rx4, respectively.

In the reception circuit 13, each of the mixers 131, 132, 133, and 134 mixes the transmission signal from the distribution circuit 123 and the reception signal from the corresponding one of the reception antennas Rx1, Rx2, Rx3, and Rx4 with each other. Next, each of the filter circuits 141, 142, 143, and 144 extracts only a signal in a desired frequency band from the corresponding signal mixture. At a timing of control by the processing unit 11, each of the ADCs 151, 152, 153, and 154 obtains digital voltage data through A/D conversion of a reception signal voltage which is an output from the corresponding one of the filter circuits 141, 142, 143, and 144. The digital voltage data is inputted to the processing unit 11 and stored in the memory 99. The processing unit 11 reads out the digital voltage data from the memory 99 and uses the digital voltage data in arithmetic processing described later.

Next, details of operation of the processing unit 11 will be described. Descriptions will be given regarding a case where the radar device 1 according to embodiment 1 is, for example, a radar device (of a time-division MIMO type) that performs transmission through switching between the transmission antennas Tx1 and Tx2 over time by a fast chirp modulation (FCM) method. It is noted that the radar method for the radar device 1 according to embodiment 1 is not limited to the FCM method, and the radar device 1 can employ various radar methods such as a frequency modulated continuous wave (FM-CW) method and a pulse-Doppler method.

FIG. 6 shows an exemplary modulation pattern in the case of performing transmission through switching between the transmission antennas Tx1 and Tx2 over time by the FCM method. As shown in FIG. 6, the FCM method involves repetitive transmission of an electromagnetic wave having been modulated such that the frequency thereof rises (up) or drops (down) at a fixed tilt. The horizontal axis indicates time, and the vertical axis indicates transmission signal voltage. Hereinafter, one modulated portion is referred to as a chirp, and a group of repeatedly transmitted chirps is referred to as a chirp sequence. The chirp sequence is repeated at a cycle Tc. FIG. 6 shows an example of a chirp sequence composed of down-chirps. This example is an example of the time-division MIMO type in which transmission is performed through switching, per chirp, between the transmission antennas Tx1 and Tx2. The total number of the chirps for the transmission antennas Tx1 and Tx2 is set to N.

In FIG. 6, the transmission antennas performing transmission according to the transmission switch, and chirp numbers, are shown together with the modulation pattern 61. In each chirp sequence, a first chirp, i.e., a chirp with a chirp number 1, is a chirp, of the modulation pattern 61, transmitted from the transmission antenna Tx1. A chirp with a chirp number 2 is a chirp, of the modulation pattern 61, transmitted from the transmission antenna Tx2. When the chirp number is an odd number, the chirp of the modulation pattern 61 is transmitted from the transmission antenna Tx1. Meanwhile, when the chirp number is an even number, the chirp of the modulation pattern 61 is transmitted from the transmission antenna Tx2. FIG. 6 shows a case where the chirp numbers are 1, 2, 3, N−2, N−1, and N. It is noted that the radar device 1 according to embodiment 1 is applicable, without limitation to the given parameters of the chirp sequence such as a modulation width and a tilt of each chirp shown in FIG. 6.

As described above, the modulation pattern 61 makes it possible to receive signals in a total of eight virtual reception channels, including: reception signals that result from transmission of a transmission signal from the transmission antenna Tx1 and that are received by the reception antennas Rx1, Rx2, Rx3, and Rx4; and reception signals that result from transmission of a transmission signal from the transmission antenna Tx2 and that are received by the reception antennas Rx1, Rx2, Rx3, and Rx4. As shown in FIG. 7, the virtual reception channels are a total of eight channels, i.e., the virtual reception channels VRC1, VRC2, VRC3, VRC4, VRC5, VRC6, VRC7, and VRC8 corresponding to the virtual reception antennas VR1, VR2, VR3, VR4, VR5, VR6, VR7, and VR8.

The processing unit 11 receives data in the eight virtual reception channels and measures the distance and the relative speed of the target object 33 by the FCM method. A principle of measuring a distance and a relative speed by the FCM method is based on known technologies as described in Patent Document 2. Hereinafter, operation of the processing unit 11 will be described with reference to FIG. 8. FIG. 8 is a flowchart showing a flow of a process of measuring the distance, the relative speed, and the angle of the target object by the processing unit 11. However, FIG. 8 is merely an example, and the signal processing method performed by the radar device 1 according to embodiment 1 is not limited to that shown in FIG. 8.

First, in step ST1, the processing unit 11 performs a frequency conversion process through reception of obtained data in the eight virtual reception channels VRC1 to VRC8 (frequency conversion process step). Here, descriptions will be given on the assumption that, for example, a two-dimensional fast Fourier transform (FFT) is used for the frequency conversion process as described in Patent Document 2.

Specifically, a first time of FFT process is executed on data of each chirp in FIG. 6, whereby a power spectrum is generated. Next, the result of the process is collected per frequency bin over all the chirps, and a second time of FFT process is executed. Here, the frequencies of beat signals i.e., components that reach peaks in the power spectra detected in the respective chirps according to transmission signals reflected by the same target object 33, are equal to one another.

However, if the target object 33 has a relative speed with respect to the vehicle mounted with the radar device 1, the phases of the beat signals slightly differ among the chirps. That is, as a result of the second time of FFT process, a power spectrum in which a frequency component based on a rotation speed in a phase is set as a frequency bin i.e., speed bin is obtained per frequency bin i.e., distance bin obtained as a result of the first time of FFT process. Hereinafter, the power spectrum obtained through the second time of FFT process is referred to as a two-dimensional power spectrum.

Then, in step ST2, the processing unit 11 detects a peak by extracting a peak from the two-dimensional power spectrum (peak detection step). Examples of the method for the peak detection include a known constant false alarm (CFAR) method and the like. Alternatively, as another method, any method may be employed as long as the method enables detection of reflection from the target object. For example, a method may be employed in which a frequency bin at which a value higher than a preset threshold value is obtained and at which a local maximum value is obtained is extracted from among the frequency bins.

Further, data in the virtual reception channels VRC1 to VRC8 may be added up in a stage preceding the peak detection. For example, a peak may be detected after the amplitude values of the eight virtual reception channels are added up and averaged. Alternatively, a peak may be detected after a beam is oriented in a preset direction by a known digital beam forming (DBF) process.

Then, in step ST3, the processing unit 11 calculates, for the detected peak, a distance and a relative speed of the target object 33 on the basis of, for example, a principle of a known FCM method such as one as described in Patent Document 2 (distance-speed calculation step). It is noted that, in embodiment 1, the method for calculating a distance and a relative speed of the target object is not limited to one in this case and may be any method.

Then, in step ST4, the processing unit 11 measures the angle of the target object 33 (angle measurement process step). There are various angle measurement methods such as a beamformer method, a super-resolution angle measurement method, and a maximum likelihood estimation method, and the angle measurement method is not limited to one in embodiment 1. Here, a case where angle measurement is performed by the aforementioned phase monopulse method will be described as an example.

For example, phase monopulse angle measurement is performed according to expression (2) on signals in the respective virtual reception channels at all reception channel intervals such that the intervals between the virtual reception channels in FIG. 7, i.e., the virtual reception antenna interval Dvr, are each the distance d. The reception channel intervals are seven intervals, i.e., the interval between VR1 and VR5, the interval between VR5 and VR2, the interval between VR2 and VR6, the interval between VR6 and VR3, the interval between VR3 and VR7, the interval between VR7 and VR4, and the interval between VR4 and VR8. An average value of seven angles obtained by the phase monopulse angle measurement is obtained, and the average value is outputted as the angle of the target object 33.

By the above method, the processing unit 11 in the radar device 1 calculates the distance, the relative speed, and the angle of the target object 33. If the process flow that is the above process is executed per chirp sequence repeated at the preset time interval (cycle Tc) as shown in FIG. 6, a distance, a relative speed, and an angle of the target object 33 are repeatedly calculated at this time interval.

The detection results obtained by the radar device 1 such as the distance, the relative speed, and the angle of the target object 33 are transferred to the ECU 2 of the vehicle. The ECU 2 of the vehicle uses these detection results for control of various vehicle applications or the like.

It is noted that the processing unit 11 may perform a process in which smoothing against an error in each of the detection results such as the distance, the relative speed, and the angle is performed by, for example, obtaining correlations in time series and smoothing the detection results in time series through a time-series process that is a technique called a tracking process or the like.

Although an example in which the time-division MIMO type is employed has been described in embodiment 1, another type may be employed as long as the type enables separation between signals from the transmission antennas Tx1 and Tx2. For example, it is also possible to employ: a type in which transmissions from the transmission antennas Tx1 and Tx2 are performed at different transmission frequencies; a type in which transmission is performed after code multiplication is performed such that there is orthogonality between the transmission antennas Tx1 and Tx2; a type in which signals from the transmission antennas Tx1 and Tx2 are separated; and the like.

The radar device 1 according to embodiment 1 includes: the first antenna group Gr1 having the plurality of first antennas arranged at the antenna interval D1 which is the predetermined distance d; the second antenna group Gr2 having the second antennas, for operations opposite to those of the first antennas, the number of which is any number equal to or larger than 2; and the virtual reception antenna group 50 having the plurality of virtual reception antennas VR arranged at regular intervals each of which is the distance d, by interpolation, with the first antennas, between the second antennas arranged at intervals each of which is longer than the distance d. Consequently, the radar device 1 can reduce side lobe and inhibit erroneous detection even if, owing to the power supply circuits 25, three or more channels of antennas cannot be physically arranged at regular intervals each of which is the distance d. In the radar device 1 according to embodiment 1, the virtual reception antennas VR are arranged such that the interval between adjacent ones of the virtual reception antennas is the distance d, and thus it is possible to reduce side lobe and inhibit erroneous detection. As indicated with the reception antennas Rx in FIG. 32, if the power supply circuits 25 exist in the lateral direction (adjacent direction) with respect to the antennas, three or more channels of antennas cannot be physically arranged at regular intervals each of which is the distance d. Considering this, the radar device 1 according to embodiment 1 is adjusted in terms of the manner of arrangement in the first antenna group Gr1 and the second antenna group Gr2 so as to realize the virtual reception antenna group 50 having the plurality of virtual reception antennas VR arranged at regular intervals each of which is the distance d, by employing the MIMO type or the like.

In the radar device 1 according to embodiment 1, the power supply circuits 25 for the antennas are of the parallel power supply type, whereby wide-band antenna frequency characteristics are realized, with a fractional bandwidth being not lower than 2% and not higher than 10%. Owing to these power supply circuits 25, three or more channels of antennas cannot be physically arranged at regular intervals each of which is the distance d. However, the radar device 1 according to embodiment 1 includes: a set of first antennas At1, one such set being composed of two first antennas At1 arranged at an interval which is the distance d; and a plurality of second antennas At2 arranged at intervals each of which is 2 times the distance d. The radar device 1 realizes the virtual reception antenna group 50 having the plurality of virtual reception antennas VR arranged at regular intervals each of which is the distance d, by employing the MIMO type or the like. Consequently, the radar device 1 can reduce side lobe and inhibit erroneous detection while ensuring wide-band antenna frequency characteristics. Antennas having wide-band antenna frequency characteristics are wide-band antennas.

The radar device 1 according to embodiment 1 including the transmission antennas Tx and the reception antennas Rx arranged as in the first example of the antenna arrangement is a radar device 1 according to embodiment 1 including the antennas in the first example of the antenna arrangement. The radar device 1 according to embodiment 1 including the antennas in the first example of the antenna arrangement includes: the first antenna group Gr1 having the plurality of first antennas, i.e., the transmission antennas Tx, arranged at the antenna interval D1 which is the predetermined distance d; the second antenna group Gr2 having the second antennas, i.e., the reception antennas Rx, for operations opposite to those of the first antennas, the number of which is any number equal to or larger than 2; and the virtual reception antenna group 50 having the plurality of virtual reception antennas VR arranged at regular intervals each of which is the distance d, by interpolation, with the first antennas, between the second antennas arranged at intervals each of which is longer than the distance d. Consequently, the radar device 1 can reduce side lobe and inhibit erroneous detection even if, owing to the power supply circuits 25, three or more channels of antennas cannot be physically arranged at regular intervals each of which is the distance d. The antenna interval D1 in the first example of the antenna arrangement is the transmission antenna interval Dtx.

The first example of the antenna arrangement shown in FIG. 3 and FIG. 4 is an example in which the first antennas in the first antenna group Gr1 are transmission antennas Tx, and the second antennas in the second antenna group Gr2 are reception antennas Rx. However, as shown in FIG. 9 and FIG. 10, the first antennas in the first antenna group Gr1 may be reception antennas Rx, and the second antennas in the second antenna group Gr2 may be transmission antennas Tx. A second example of the antenna arrangement shown in FIG. 9 and FIG. 10 is an example in which the number of the transmission antennas Tx is 4, and the number of the reception antennas Rx is 2. In a radar device 1 including the antennas in the second example of the antenna arrangement, the transmission switch 124 in the transmission circuit 12 is configured to perform switching between transmission antennas Tx1, Tx2, Tx3, and Tx4. In addition, the reception circuit 13 includes, correspondingly to the reception antennas Rx1 and Rx2, the mixers 131 and 132, the filter circuits 141 and 142, and the analog-to-digital converters 151 and 152. The modulation pattern 61 is a pattern in which Tx1, Tx2, Tx3, and Tx4 are repeated in this order. FIG. 11 shows a virtual reception antenna group 50 formed by the transmission antennas Tx and the reception antennas Rx in the second example of the antenna arrangement. Eight virtual reception antennas VR1 to VR8 are formed by the two reception antennas Rx1 and Rx2, and the four transmission antennas Tx1, Tx2, Tx3, and Tx4.

The reception antenna Rx1 includes the plurality of element antennas 19 arranged along the phase center line 27a extending through the phase center Cr1. The reception antenna Rx2 includes the plurality of element antennas 19 arranged along the phase center line 27b extending through the phase center Cr2. The plurality of element antennas 19 of each reception antenna Rx are arranged along the phase center line extending through the corresponding phase center. In each of the transmission antennas Tx1, Tx2, Tx3, and Tx4 as well, a plurality of element antennas 19 thereof are arranged along a phase center line extending through a corresponding phase center in the same manner as in the reception antennas Rx. The transmission antenna Tx1 includes the plurality of element antennas 19 arranged along the phase center line 28a extending through the phase center Ct1, and the transmission antenna Tx2 includes the plurality of element antennas 19 arranged along the phase center line 28b extending through the phase center Ct2. The transmission antenna Tx3 includes a plurality of element antennas 19 arranged along a phase center line 28c extending through a phase center Ct3, and the transmission antenna Tx4 includes a plurality of element antennas 19 arranged along a phase center line 28d extending through a phase center Ct4. The extension direction of the phase center line of each of the transmission antennas Tx and the reception antennas Rx matches with the extension direction of the plurality of element antennas 19.

The transmission antennas Tx are arranged side by side on the front surface of the substrate 23 so as to be parallel to one another, i.e., such that the respective phase center lines 28a to 28d are parallel to one another. The reception antennas Rx are arranged side by side on the front surface of the substrate 23 so as to be parallel to each other, i.e., such that the respective phase center lines 27a and 27b are parallel to each other. The reception antenna interval Drx between the two reception antennas Rx1 and Rx2, i.e., the interval between the phase center line 27a and the phase center line 27b, is an interval equal to the distance d. The transmission antenna interval Dtx between adjacent ones of the transmission antennas Tx1, Tx2, Tx3, and Tx4 is 2 times the distance d, i.e., 2d. In the second example of the antenna arrangement shown in FIG. 10, since the reception antenna interval Drx is an interval equal to the distance d, the reception antennas Rx1 and Rx2 are antennas in the first antenna group Gr1. Meanwhile, since the transmission antenna interval Dtx is 2 times the distance d, i.e., 2d, the transmission antennas Tx1 to Tx4 are antennas in the second antenna group Gr2.

The reception antennas Rx are arranged side by side in the first array direction dr1, and the transmission antennas Tx are arranged side by side in the second array direction dr2. The first array direction dr1 is a direction perpendicular to the phase center lines 27a and 27b, and the second array direction dr2 is a direction perpendicular to the phase center lines 28a to 28d. FIG. 10 shows an example in which the phase centers Ct1 to Ct4 of the transmission antennas Tx and the phase centers Cr1 and Cr2 of the reception antennas Rx are located on the same straight line. The reception antennas Rx1 and Rx2 are arranged sequentially toward the positive side in the first array direction dr1, and the transmission antennas Tx1, Tx2, Tx3, and Tx4 are arranged sequentially toward the positive side in the second array direction dr2.

In the example in FIG. 11, the virtual reception antennas VR1 to VR8 are arranged in the order of VR1, VR2, VR3, VR4, VR5, VR6, VR7, and VR8 toward the positive side in the third array direction dr3. Out of the virtual reception antenna group 50, VR1, VR3, VR5, and VR7 indicated by solid-line circles are virtual reception antennas formed with signals that result from transmission by the transmission antennas Tx1 to Tx4 and that are each received by the reception antenna Rx1, and VR2, VR4, VR6, and VR8 indicated by dash-line circles are virtual reception antennas formed with signals that result from transmission by the transmission antennas Tx1 to Tx4 and that are each received by the reception antenna Rx2.

The radar device 1 according to embodiment 1 including the transmission antennas Tx and the reception antennas Rx arranged as in the second example of the antenna arrangement is a radar device 1 according to embodiment 1 including the antennas in the second example of the antenna arrangement. The radar device 1 according to embodiment 1 including the antennas in the second example of the antenna arrangement includes: the first antenna group Gr1 having the plurality of first antennas, i.e., the reception antennas Rx, arranged at the antenna interval D1 which is the predetermined distance d; the second antenna group Gr2 having the second antennas, i.e., the transmission antennas Tx, for operations opposite to those of the first antennas, the number of which is any number equal to or larger than 2; and the virtual reception antenna group 50 having the plurality of virtual reception antennas VR arranged at regular intervals each of which is the distance d, by interpolation, with the first antennas, between the second antennas arranged at intervals each of which is longer than the distance d. Consequently, the radar device 1 can reduce side lobe and inhibit erroneous detection even if, owing to the power supply circuits 25, three or more channels of antennas cannot be physically arranged at regular intervals each of which is the distance d. The antenna interval D1 in the second example of the antenna arrangement is the reception antenna interval Drx.

As described in the first example and the second example of the antenna arrangement, the plurality of first antennas arranged at the antenna interval D1 which is the predetermined distance d may be transmission antennas Tx or reception antennas Rx. FIG. 12 shows a third example of the antenna arrangement in which the first antennas and the second antennas are specified as neither the transmission antennas Tx nor the reception antennas Rx, as described above. The first antennas At1a and At1b in the first antenna group Gr1 are arranged at the antenna interval D1 which is the predetermined distance d. The four second antennas At2a, At2b, At2c, and At2d for operations opposite to those of the first antennas are arranged at an antenna interval D2 which is 2 times the distance d, i.e., 2d. The antenna interval D1 is the antenna interval between the adjacent first antennas. The antenna interval D2 is the antenna interval between adjacent ones of the second antennas. A radar device 1 including the antennas in the third example of the antenna arrangement has, if the first antennas are transmission antennas Tx, the configuration shown in FIG. 1. Meanwhile, the radar device 1 has, if the first antennas are reception antennas Rx, the same configuration as that of the radar device 1 including the antennas in the second example of the antenna arrangement.

FIG. 13 and FIG. 14 each show a virtual reception antenna group 50 formed by the first antennas At1 and the second antennas At2 in the third example of the antenna arrangement. The virtual reception antenna group 50 shown in FIG. 13 corresponds to the case where the first antennas At1 are transmission antennas Tx, and the virtual reception antenna group 50 shown in FIG. 14 corresponds to the case where the first antennas At1 are reception antennas Rx. The modulation pattern 61 in the case where the first antennas At1 are transmission antennas Tx is the pattern in which Tx1 and Tx2 are repeated in this order. The modulation pattern 61 in the case where the first antennas At1 are reception antennas Rx is the pattern in which Tx1, Tx2, Tx3, and Tx4 are repeated in this order.

The first antenna At1a includes a plurality of element antennas 19 arranged along a phase center line 31a extending through a phase center C1a. The first antenna At1b includes a plurality of element antennas 19 arranged along a phase center line 31b extending through a phase center C1b. The plurality of element antennas 19 of each first antenna At1 are arranged along the phase center line extending through the corresponding phase center. In each of the second antennas At2a, At2b, At2c, and At2d as well, a plurality of element antennas 19 thereof are arranged along a phase center line extending through a corresponding phase center in the same manner as in the first antennas At1. The second antenna At2a includes a plurality of element antennas 19 arranged along a phase center line 32a extending through a phase center C2a, and the second antenna At2b includes a plurality of element antennas 19 arranged along a phase center line 32b extending through a phase center C2b. The second antenna At2c includes a plurality of element antennas 19 arranged along a phase center line 32c extending through a phase center C2c, and the second antenna At2*d* includes a plurality of element antennas 19 arranged along a phase center line 32*d* extending through a phase center C2*d*. The extension direction of the phase center line of each of the first antennas At1 and the second antennas At2 matches with the extension direction of the plurality of element antennas 19.

As shown in FIG. 12, the first antennas At1 are arranged side by side on the front surface of the substrate 23 so as to be parallel to each other, i.e., such that the respective phase center lines are parallel to each other. The array direction of the first antennas At1 is the first array direction dr1. The first array direction dr1 is a direction perpendicular to the phase center lines 31*a* and 31*b*. The antenna interval D1 between the two first antennas At1*a* and At1*b*, i.e., the interval between the phase center line 31*a* and the phase center line 31*b*, is an interval equal to the distance d.

Likewise, as shown in FIG. 12, the second antennas At2 are arranged side by side on the front surface of the substrate 23 so as to be parallel to one another, i.e., such that the respective phase center lines are parallel to one another. The array direction of the second antennas At2 is the second array direction dr2. The second array direction dr2 is a direction perpendicular to the phase center lines 32*a* to 32*d*. The first array direction dr1 and the second array direction dr2 are parallel to each other. FIG. 12 shows an example in which the phase centers C1*a* and C1*b* of the first antennas At1 and the phase centers C2*a*, C2*b*, C2*c*, and C2*d* of the second antennas At2 are arranged on the same straight line. The first antennas At1*a* and At2*a* are arranged sequentially toward the positive side in the first array direction dr1, and the second antennas At2*a*, At2*b*, At2*c*, and At2*d* are arranged sequentially toward the positive side in the second array direction dr2.

In the example in FIG. 13, the virtual reception antennas VR1 to VR8 are arranged in the order of VR1, VR5, VR2, VR6, VR3, VR7, VR4, and VR8 toward the positive side in the third array direction dr3. Out of the virtual reception antenna group 50, VR1, VR2, VR3, and VR4 indicated by solid-line circles are virtual reception antennas formed with signals that result from transmission by the first antenna At1*a* as a transmission antenna and that are received by the second antennas At2*a*, At2*b*, At2*c*, and At2*d* as reception antennas, and VR5, VR6, VR7, and VR8 indicated by dash-line circles are virtual reception antennas formed with signals that result from transmission by the first antenna At1*b* as a transmission antenna and that are received by the second antennas At2*a*, At2*b*, At2*c*, and At2*d* as reception antennas.

In the example in FIG. 14, the virtual reception antennas VR1 to VR8 are arranged in the order of VR1, VR2, VR3, VR4, VR5, VR6, VR7, and VR8 toward the positive side in the third array direction dr3. Out of the virtual reception antenna group 50, VR1, VR3, VR5, and VR7 indicated by solid-line circles are virtual reception antennas formed with signals that result from transmission by the second antennas At2*a* to At2*d* as transmission antennas and that are each received by the first antenna At1*a* as a reception antenna, and VR2, VR4, VR6, and VR8 indicated by dash-line circles are virtual reception antennas formed with signals that result from transmission by the second antennas At2*a* to At2*d* as transmission antennas and that are each received by the first antenna At1*b* as a reception antenna.

The radar device 1 according to embodiment 1 including the first antennas At1 and the second antennas At2 arranged as in the third example of the antenna arrangement is a radar device 1 according to embodiment 1 including the antennas in the third example of the antenna arrangement. The radar device 1 according to embodiment 1 including the antennas in the third example of the antenna arrangement includes: the first antenna group Gr1 including the first antennas At1 as a plurality of transmission antennas or reception antennas arranged at the antenna interval D1 which is the predetermined distance d; the second antenna group Gr2 having the second antennas At2, for operations opposite to those of the first antennas At1, the number of which is any number equal to or larger than 2; and the virtual reception antenna group 50 having the plurality of virtual reception antennas VR configured such that interpolation, with the first antennas At1, between the second antennas arranged at a longer interval is performed. Consequently, the radar device 1 can reduce side lobe and inhibit erroneous detection even if, owing to the power supply circuits 25, three or more channels of antennas cannot be physically arranged at regular intervals each of which is the distance d.

If the channel number, i.e., the antenna number, of the first antennas At1 is limited to 2, it is preferable to employ the first example of the antenna arrangement in which the first antennas At1 are transmission antennas Tx each having a transmission function and the second antennas At2 are reception antennas Rx each having a reception function. The reason is as follows.

If the second antennas At2 are transmission antennas Tx, i.e., if the second example of the antenna arrangement is employed, the number of the transmission antennas Tx is larger than the number of the reception antennas Rx. A larger number of the transmission antennas Tx leads to a larger extent of the transmission circuit 12 in the radar device 1. The transmission circuit 12 which is a circuit having a function of transmitting a radio wave is likely to have a larger heat generation amount than the reception circuit 13. If the channel number, i.e., the antenna number, of the first antennas At1 is limited to 2, and the channel number, i.e., the antenna number, of the second antennas At2 is larger than that of the first antennas At1, use of the first antennas At1 as transmission antennas Tx makes it possible to realize a radar device 1 in which the heat generation amount is small.

Although descriptions have been given regarding an example in which the power supply circuit 25 of each of the transmission antennas Tx and the reception antennas Rx is a power supply circuit of the parallel power supply type formed so as to have equal wire lengths to the respective element antennas 19, the power supply circuit 25 is not limited thereto. FIG. 15 to FIG. 20 show antennas in a first example to a sixth example. A power supply circuit 25*a* of the antenna in the first example shown in FIG. 15 is a power supply circuit of the parallel power supply type. The antenna in the first example shown in FIG. 15 includes four element antennas 19 and the power supply circuit 25*a*. The antenna in the second example shown in FIG. 16 includes four element antennas 19 and a power supply circuit 25*b*, and the antenna in the third example shown in FIG. 17 includes four element antennas 19 and a power supply circuit 25*c*. The antenna in the fourth example shown in FIG. 18 includes eight element antennas 19 and a power supply circuit 25*d*. The antenna in the fifth example shown in FIG. 19 includes four element antennas 19 and a power supply circuit 25*e*. The antenna in the sixth example shown in FIG. 20 includes four element antennas 19 and a power supply circuit 25*f*. These power supply circuits are collectively denoted by a reference character 25 but denoted by 25*a*, 25*b*, 25*c*, 25*d*, 25*e*, and 25*f* when being distinguished from one another.

The power supply circuit 25*a* of the antenna in the first example shown in FIG. 15 is of an example in which portions thereof connected to the element antennas 19 are parallel to the first array direction dr1 of the first antennas At1 in the first antenna group Gr1 or the second array direction dr2 of the second antennas At2 in the second antenna group Gr2. Since the extension direction of the plurality of element antennas 19 is perpendicular to the first array direction dr1 or the second array direction dr2, the power supply circuit 25a of the antenna in the first example shown in FIG. 15 can also be said to be of an example in which portions thereof connected to the element antennas 19 are perpendicular to the extension direction of the plurality of element antennas 19. The power supply circuit 25b of the antenna in the second example shown in FIG. 16 is of an example in which portions thereof connected to the element antennas 19 extend in the extension direction of the plurality of element antennas 19. The power supply circuit 25c of the antenna in the third example shown in FIG. 17 is of an example in which portions thereof connected to the element antennas 19 are oblique with respect to the extension direction of the plurality of element antennas 19. In each of the antenna in the second example and the antenna in the third example as well, the corresponding power supply circuit is a power supply circuit of the parallel power supply type formed so as to have equal wire lengths to the respective element antennas 19 in the same manner as in the first example. A radar device 1 according to embodiment 1 including the antenna in the second example or the antenna in the third example can reduce side lobe and inhibit erroneous detection even if three or more channels of reception antennas or transmission antennas cannot be physically arranged at an interval which is the predetermined distance d.

Although each element antenna 19 is drawn so as to have the shape of a quadrangle, the shape of the element antenna 19 may be any shape. As in the antenna in the fourth example shown in FIG. 18, the number of antenna rows composing one channel may be increased to 2 or more. FIG. 18 shows an example in which: the eight element antennas 19 and the power supply circuit 25d are provided; and two sets each having four element antennas 19 extend in a direction perpendicular to the first array direction dr1 or the second array direction dr2.

The radar device 1 according to embodiment 1 is of an example in which: two first antennas At1 arranged at an interval which is the predetermined distance d compose one set; and this one set of first antennas At1 is provided. Radar devices 1 according to embodiments 2 to 6 described later, and a radar device 1 including antennas arranged as in a seventh example of the antenna arrangement shown in FIG. 25, are of an example in which: two first antennas At1 arranged at an interval which is the predetermined distance d compose one set; and a plurality of the sets of first antennas At1 are provided. Therefore, the radar device 1 according to embodiment 1 and the radar devices 1 according to embodiments 2 to 6 are of an example in which three or more channels of transmission antennas Tx or reception antennas Rx are not physically arranged at an interval which is the predetermined distance d. In this case, in order to realize a wide-band antenna having a fractional bandwidth that is, for example, not lower than 2% and not higher than 10%, a power supply circuit of a complete tournament-tree type, i.e., a power supply circuit of the parallel power supply type such as the power supply circuit 25a, 25b, or 25c, does not have to be formed, and the power supply circuit 25e of the antenna in the fifth example shown in FIG. 19 or the power supply circuit 25f of the antenna in the sixth example shown in FIG. 20 may be formed. Even in the case where not all the power supply line lengths to the respective element antennas 19 are equal to one another as in the antenna in the fifth example shown in FIG. 19 and the antenna in the sixth example shown in FIG. 20, realization of a desired antenna characteristic with a necessary fractional bandwidth makes it possible to, even if three or more channels of reception antennas or transmission antennas cannot be physically arranged at an interval which is the predetermined distance, reduce side lobe and inhibit erroneous detection while ensuring the necessary fractional bandwidth. The desired antenna characteristic is an antenna characteristic having been set in designing, i.e., a designed antenna characteristic.

The first array direction dr1, the second array direction dr2, and the third array direction dr3 do not indicate directions between the phase centers and indicate the array direction of the adjacent antennas. One of the plurality of antennas may be shifted in the extension direction of the element antennas 19 as in, for example, a fourth example of the antenna arrangement shown in FIG. 21. FIG. 21 shows an example in which the reception antennas Rx1 and Rx2 in the first antenna group Gr1 are shifted from each other in the extension direction of the element antennas 19 or the extension direction of the phase center lines. A radar device 1 including the first antenna group Gr1 and the second antenna group Gr2 arranged as in the fourth example of the antenna arrangement shown in FIG. 21 can measure the angle of the target object 33 not only in the first array direction dr1, the second array direction dr2, and the third array direction dr3 but also in the extension direction of the phase center line of each antenna perpendicular to these directions. The radar device 1 including the antennas in the fourth example of the antenna arrangement shown in FIG. 21 has a configuration that is the same as that of the radar device 1 including the antennas in the second example of the antenna arrangement, except for the antenna arrangement.

FIG. 22 shows a virtual reception antenna group 50 formed by the transmission antennas Tx and the reception antennas Rx in the fourth example of the antenna arrangement shown in FIG. 21. The fourth example of the antenna arrangement is different from the second example of the antenna arrangement shown in FIG. 11 in that the reception antennas Rx1 and Rx2 in the first antenna group Gr1 are shifted from each other in the extension direction of the element antennas 19 or the extension direction of the phase center lines. Therefore, in the virtual reception antenna group 50 formed in the fourth example of the antenna arrangement, the virtual reception antennas VR2, VR4, VR6, and VR8 indicated by dash-line circles are shifted in the extension direction of the phase center line of each antenna. A direction of each of the phase center lines 27a and 27b in FIG. 21 from the upper side to the lower side of the drawing sheet is defined as a positive direction of the extension direction of the phase center lines. Since the reception antennas Rx2 is shifted from the reception antenna Rx1 in the positive direction of the extension direction of the phase center lines, the virtual reception antenna group 50 is also such that the virtual reception antennas VR2, VR4, VR6, and VR8 formed with signals each received by the reception antenna Rx2 are shifted, in the positive direction of the extension direction of the phase center lines, from the virtual reception antennas VR1, VR3, VR5, VR7 formed with signals each received by the reception antenna Rx1.

The radar device 1 according to embodiment 1 including the transmission antennas Tx and the reception antennas Rx arranged as in the fourth example of the antenna arrangement shown in FIG. 21 is a radar device 1 according to embodiment 1 including the antennas in the fourth example of the antenna arrangement. The radar device 1 according to embodiment 1 including the antennas in the fourth example of the antenna arrangement includes: the first antenna group Gr1 having the plurality of first antennas, i.e., the reception antennas Rx, arranged at the antenna interval D1 which is the predetermined distance d; the second antenna group Gr2 having the second antennas, i.e., the transmission antennas Tx, for operations opposite to those of the first antennas, the number of which is any number equal to or larger than 2; and the virtual reception antenna group 50 having the plurality of virtual reception antennas VR arranged at regular intervals each of which is the distance d, by interpolation, with the first antennas, between the second antennas arranged at intervals each of which is longer than the distance d. Consequently, the radar device 1 can reduce side lobe and inhibit erroneous detection even if, owing to the power supply circuits 25, three or more channels of antennas cannot be physically arranged at regular intervals each of which is the distance d.

The radar device 1 may include antennas other than those in the first antenna group Gr1 and the second antenna group Gr2. A fifth example of the antenna arrangement shown in FIG. 23 is an example in which a transmission antenna FTx and reception antennas FRx1 and FRx2 are arranged as well as the first antenna group Gr1 and the second antenna group Gr2 in the second example of the antenna arrangement shown in FIG. 10. In the case of, for example, long-distance detection, antennas for long-distance detection do not necessarily need to be wide-band antennas. Therefore, the transmission antenna FTx and the reception antennas FRx1 and FRx2 which are conventional narrow-band antennas can be used for long-distance detection. A radar device 1 including the antennas in the fifth example of the antenna arrangement shown in FIG. 23 has a configuration obtained by providing a transmission circuit for the transmission antenna FTx and a reception circuit for the reception antennas FRx1 and FRx2 to the radar device 1 including the antennas in the second example of the antenna arrangement. The radar device 1 including the transmission antennas Tx, the reception antennas Rx, the transmission antenna FTx, and the reception antennas FRx1 and FRx2 arranged as in the fifth example of the antenna arrangement shown in FIG. 23 can detect a target object 33 at a short distance and a target object 33 at a long distance. The radar device 1 including the antennas in the fifth example of the antenna arrangement includes the radar device 1 according to embodiment 1 including the antennas in the second example of the antenna arrangement, and thus exhibits the same advantageous effects as those of the radar device 1 according to embodiment 1 including the antennas in the second example of the antenna arrangement.

A sixth example of the antenna arrangement shown in FIG. 24 is an example in which the first antenna group Gr1 and the second antenna group Gr2 in the second example of the antenna arrangement shown in FIG. 10, and a transmission antenna Tx5, are arranged. FIG. 24 shows an example in which: the reception antennas Rx1 and Rx2 in the first antenna group Gr1 are arranged on the front surface of the substrate 23b; and the transmission antennas Tx1 to Tx4 in the second antenna group Gr2, and the transmission antenna Tx5, are arranged on the front surface of the substrate 23a. A radar device 1 including the antennas in the sixth example of the antenna arrangement shown in FIG. 24 is, in association with addition of the transmission antenna Tx5, configured from the radar device 1 including the antennas in the second example of the antenna arrangement such that the transmission switch 124 performs switching between the transmission antennas Tx1, Tx2, Tx3, Tx4, and Tx5. The transmission antenna Tx5 includes a plurality of element antennas 19 arranged along a phase center line 28e extending through a phase center Ct5. FIG. 24 shows an example in which a transmission antenna interval Dtxa between the transmission antenna Tx5 and the transmission antenna Tx4 in the second antennas group Gr2 adjacent thereto is longer than the transmission antenna interval Dtx. The radar device 1 including the antennas in the sixth example of the antenna arrangement includes the radar device 1 according to embodiment 1 including the antennas in the second example of the antenna arrangement, and thus exhibits the same advantageous effects as those of the radar device 1 according to embodiment 1 including the antennas in the second example of the antenna arrangement.

A plurality of sets of antennas in the first antenna group Gr1 and the second antenna group Gr2 may be arranged in the extension direction of the phase center lines. The seventh example of the antenna arrangement shown in FIG. 25 corresponds to an antenna arrangement in which two sets are provided, each set being composed of the first antenna group Gr1 and the second antenna group Gr2 in the first example of the antenna arrangement shown in FIG. 4. The first antenna group Gr1 includes four transmission antennas Tx1, Tx2, Tx3, and Tx4, and the second antenna group Gr2 includes eight reception antennas Rx1, Rx2, Rx3, Rx4, Rx5, Rx6, Rx7, and Rx8. The transmission antennas Tx compose sets of antennas, the antenna interval between which is equal to or shorter than the distance d, and the reception antennas Rx do not compose any set of antennas, the antenna interval between which is equal to or shorter than the distance d. The transmission antennas Tx1 and Tx2 compose a first antenna set 22a, and the transmission antennas Tx3 and Tx4 compose a first antenna set 22b. The reception antennas Rx1 to Rx4 compose a second antenna set 24a, and the reception antennas Rx5 to Rx8 compose a second antenna set 24b. The first antenna set 22b and the second antenna set 24b constitute the first example of the antenna arrangement shown in FIG. 4. The first antenna set 22a and the second antenna set 24a constitute an antenna arrangement in which the transmission antennas Tx and the reception antennas Rx in the first example of the antenna arrangement shown in FIG. 4 have been shifted from each other in the extension direction of the phase center lines.

It is noted that FIG. 25 shows an example in which: the number of the first antenna sets arranged in the first array direction dr1 in the first antenna group Gr1 is 1; and the number of the second antenna sets arranged in the second array direction dr2 in the second antenna group Gr2 is 1. However, there is also a case where: the number of the first antenna sets arranged in the first array direction dr1 in the first antenna group Gr1 is equal to or larger than 2; and the number of the second antenna sets arranged in the second array direction dr2 in the second antenna group Gr2 is equal to or larger than 2. In such a case, the first antenna group Gr1 can also be said to include: a group A having a plurality of first antennas At1 arranged in the first array direction dr1; and a group B having the same configuration as that of the group A and shifted therefrom in a fourth array direction dr4 which is a direction perpendicular to the first array direction dr1. In the case of FIG. 25, the group A is the first antenna set 22a, and the group B is the first antenna set 22b. Likewise, the second antenna group Gr2 can also be said to include: a group C having a plurality of second antennas At2 arranged in the second array direction dr2; and a group D having the same configuration as that of the group C and shifted therefrom in a fifth array direction dr5 which is a direction perpendicular to the second array direction dr2. In the case of FIG. 25, the group C is the second antenna set 24a, and the group D is the second antenna set 24b.

A radar device 1 including the antennas in the seventh example of the antenna arrangement shown in FIG. 25 is configured such that the transmission switch 124 in the transmission circuit 12 performs switching between the transmission antennas Tx1, Tx2, Tx3, and Tx4. In addition, the reception circuit 13 includes, correspondingly to the reception antennas Rx1, Rx2, Rx3, Rx4, Rx5, Rx6, Rx7, and Rx8, eight mixers 131, eight filter circuits 141, and eight analog-to-digital converters 151. The radar device 1 including the antennas in the seventh example of the antenna arrangement transmits a transmission signal having a modulation pattern 61 in which Tx1, Tx2, Tx3, and Tx4 are repeated in this order.

Each of the transmission antennas Tx1 and Tx3 includes a plurality of element antennas 19 arranged along the phase center line 28a, and each of the transmission antennas Tx2 and Tx4 includes a plurality of element antennas 19 arranged along the phase center line 28b. Each of the reception antennas Rx1 and Rx5 includes a plurality of element antennas 19 arranged along the phase center line 27a, and each of the reception antennas Rx2 and Rx6 includes a plurality of element antennas 19 arranged along the phase center line 27b. Each of the reception antennas Rx3 and Rx7 includes a plurality of element antennas 19 arranged along the phase center line 27c, and each of the reception antennas Rx4 and Rx8 includes a plurality of element antennas 19 arranged along the phase center line 27d. The transmission antennas Tx1 and Tx3, and the transmission antennas Tx2 and Tx4, are arranged side by side on the front surface of the substrate 23 so as to be parallel to each other, i.e., such that the respective phase center lines are parallel to each other. The reception antennas Rx1 and Rx5, the reception antennas Rx2 and Rx6, the reception antennas Rx3 and Rx7, and the reception antennas Rx4 and Rx8 are arranged side by side on the front surface of the substrate 23 so as to be parallel to one another, i.e., such that the respective phase center lines are parallel to one another.

The transmission antennas Tx1 and Tx2 in the first antenna set 22a are arranged in the first array direction dr1, and the transmission antennas Tx3 and Tx4 in the first antenna set 22b are arranged in the first array direction dr1. The reception antennas Rx1 to Rx4 in the second antenna set 24a are arranged in the second array direction dr2, and the reception antennas Rx5 to Rx8 in the second antenna set 24b are arranged in the second array direction dr2. FIG. 25 shows an example in which the phase centers of the respective reception antennas Rx5 to Rx8 in the second antenna set 24b, and the phase centers of the respective transmission antennas Tx3 and Tx4 in the first antenna set 22b, are arranged on a dash line 29a which is the same straight line. The first antenna set 22a and the first antenna set 22b are arranged sequentially toward the positive side in the fourth array direction dr4 perpendicular to the first array direction dr1. The second antenna set 24a and the second antenna set 24b are arranged sequentially toward the positive side in the fifth array direction dr5 perpendicular to the second array direction dr2. The phase centers of the respective transmission antennas Tx1 and Tx2 in the first antenna set 22a are arranged on a dash line 29b which is the same straight line. The phase centers of the respective reception antennas Rx1 to Rx4 in the second antenna set 24a are arranged on a dash line 29c which is the same straight line. The dash lines 29a, 29b, and 29c are parallel to one another.

The transmission antenna interval Dtx between the transmission antenna Tx1 and the transmission antenna Tx2 in the first antenna set 22a, i.e., the interval between the phase center line 28a and the phase center line 28b, and the transmission antenna interval Dtx between the transmission antenna Tx3 and the transmission antenna Tx4 in the first antenna set 22b, i.e., the interval between the phase center line 28a and the phase center line 28b, are intervals each of which is equal to the distance d. The reception antenna interval Drx between adjacent reception antennas Rx among the reception antennas Rx1 to Rx4 in the second antenna set 24a, i.e., the interval between adjacent phase center lines among the phase center lines 27a to 27d, and the reception antenna interval Drx between adjacent reception antennas Rx among the reception antennas Rx5 to Rx8 in the second antenna set 24b, i.e., the interval between adjacent phase center lines among the phase center lines 27a to 27d, are 2 times the distance d, i.e., 2d. A transmission antenna set interval Dtxsv which is a first antenna set interval between the first antenna set 22a and the first antenna set 22b is the interval between the dash line 29b and the dash line 29a. A reception antenna set interval Drxsv which is a second antenna set interval between the second antenna set 24a and the second antenna set 24b is the interval between the dash line 29c and the dash line 29a.

FIG. 26 shows a virtual reception antenna group 50 formed by the transmission antennas Tx and the reception antennas Rx in the seventh example of the antenna arrangement in FIG. 25. In the virtual reception antenna group 50, thirty-two virtual reception antennas VR1 to VR32 are formed by the four transmission antennas Tx1 to Tx4 and the eight reception antennas Rx1 to Rx8. VR1, VR2, VR3, VR4, VR5, VR6, VR7, and VR8 each indicated by a solid-line circle the inside of which is white are virtual reception antennas formed with signals that result from transmission by the transmission antenna Tx1 and that are received by the reception antennas Rx1 to Rx8, and VR9, VR10, VR11, VR12, VR13, VR14, VR15, and VR16 each indicated by a dash-line circle the inside of which is white are virtual reception antennas formed with signals that result from transmission by the transmission antenna Tx2 and that are received by the reception antennas Rx1 to Rx8. VR17, VR18, VR19, VR20, VR21, VR22, VR23, and VR24 each indicated by a solid-line circle the inside of which is patterned are virtual reception antennas formed with signals that result from transmission by the transmission antenna Tx3 and that are received by the reception antennas Rx1 to Rx8, and VR25, VR26, VR27, VR28, VR29, VR30, VR31, and VR32 each indicated by a dash-line circle the inside of which is patterned are virtual reception antennas formed with signals that result from transmission by the transmission antenna Tx4 and that are received by the reception antennas Rx1 to Rx8.

In the virtual reception antenna group 50 shown in FIG. 26, eight virtual reception antennas VR arrayed in the third array direction dr3 parallel to the first array direction dr1 and the second array direction dr2 compose one set, and four such sets are arrayed in a sixth array direction dr6 perpendicular to the third array direction dr3. The sixth array direction dr6 is a direction parallel to the fourth array direction dr4 and the fifth array direction dr5. These four sets are referred to as a first set, a second set, a third set, and a fourth set sequentially toward a positive side in the sixth array direction dr6. The virtual reception antennas VR1, VR9, VR2, VR10, VR3, VR11, VR4, and VR12 in the first set are arranged at regular intervals such that the virtual reception antenna interval Dvr between adjacent ones of the virtual reception antennas is the distance d. The virtual reception antennas VR1 to VR4 are virtual reception antennas, in the first set, formed with signals that result from transmission by the transmission antennas Tx1 and that are received by the reception antennas Rx1 to Rx4, and the virtual reception antennas VR9 to VR12 are virtual reception antennas, in the first set, formed with signals that result from transmission by the transmission antenna Tx2 and that are received by the reception antennas Rx1 to Rx4.

The virtual reception antennas VR5, VR13, VR6, VR14, VR7, VR15, VR8, and VR16 in the second set are arranged at regular intervals such that the virtual reception antenna interval Dvr between adjacent ones of the virtual reception antennas is the distance d. The virtual reception antennas VR5 to VR8 are virtual reception antennas, in the second set, formed with signals that result from transmission by the transmission antenna Tx1 and that are received by the reception antennas Rx5 to Rx8, and the virtual reception antennas VR13 to VR16 are virtual reception antennas, in the second set, formed with signals that result from transmission by the transmission antenna Tx2 and that are received by the reception antennas Rx5 to Rx8. The virtual reception antennas VR17, VR25, VR18, VR26, VR19, VR27, VR20, and VR28 in the third set are arranged at regular intervals such that the virtual reception antenna interval Dvr between adjacent ones of the virtual reception antennas is the distance d. The virtual reception antennas VR17 to VR20 are virtual reception antennas, in the third set, formed with signals that result from transmission by the transmission antenna Tx3 and that are received by the reception antennas Rx1 to Rx4, and the virtual reception antennas VR25 to VR28 are virtual reception antennas, in the third set, formed with signals that result from transmission by the transmission antenna Tx4 and that are received by the reception antennas Rx1 to Rx4. The virtual reception antennas VR21, VR29, VR22, VR30, VR23, VR31, VR24, and VR32 in the fourth set are arranged at regular intervals such that the virtual reception antenna interval Dvr between adjacent ones of the virtual reception antennas is the distance d. The virtual reception antennas VR21 to VR24 are virtual reception antennas, in the fourth set, formed with signals that result from transmission by the transmission antenna Tx3 and that are received by the reception antennas Rx5 to Rx8, and the virtual reception antennas VR29 to VR32 are virtual reception antennas, in the fourth set, formed with signals that result from transmission by the transmission antenna Tx4 and that are received by the reception antennas Rx5 to Rx8.

The interval in the sixth array direction dr6 between the first set of virtual reception antennas and the second set of virtual reception antennas is the reception antenna set interval Drxsv, and the interval in the sixth array direction dr6 between the third set of virtual reception antennas and the fourth set of virtual reception antennas is the reception antenna set interval Drxsv. The interval in the sixth array direction dr6 between the first set of virtual reception antennas and the third set of virtual reception antennas is the transmission antenna set interval Dtxsv. The radar device 1 including the antennas in the seventh example of the antenna arrangement corresponds to a radar device 1 according to embodiment 1 including two sets each having the antennas in the first example of the antenna arrangement, and thus exhibits the same advantageous effects as those of the radar device 1 according to embodiment 1 including the antennas in the first example of the antenna arrangement. In addition, the radar device 1 including the antennas in the seventh example of the antenna arrangement can measure the distance, the relative speed, and the angle of the target object 33 in the third array direction dr3 and the sixth array direction dr6 perpendicular thereto. That is, the measurement can be performed two-dimensionally.

The radar device 1 according to embodiment 1 is of an example in which, since three or more channels of first antennas At1 cannot be physically arranged at an interval which is the predetermined distance d, two channels of first antennas At1 are physically arranged at an interval which is the distance d. However, in the radar device 1 according to embodiment 1, the plurality of virtual reception antennas VR formed through transmission and reception by the first antennas At1 and the second antennas At2 can be arranged at regular intervals each of which is the distance d, and thus it is possible to reduce side lobe and inhibit erroneous detection.

As described above, the radar device 1 according to embodiment 1 includes: the plurality of transmission antennas Tx each of which emits a transmission signal toward the target object 33; the plurality of reception antennas Rx which receive reflection signals resulting from reflection of the transmission signal by the target object 33 and output the reflection signals as reception signals; and the processing unit 11 which processes the reception signals outputted from the plurality of respective reception antennas Rx. An antenna interval, between adjacent ones of the antennas, that is determined on the basis of a field-of-view range required for the radar device 1 is defined as a basic distance (distance d). An antenna group that includes either the plurality of transmission antennas Tx or the plurality of reception antennas Rx and that includes the first antenna set having the plurality of first antennas At1 such that the antenna interval D1 between adjacent ones of the first antennas is the basic distance (distance d), is defined as the first antenna group Gr1. An antenna group that includes others, out of the plurality of antennas, different from the first antennas At1 in the first antenna group Gr1 and that includes the second antenna set having the plurality of second antennas At2 such that the antenna interval D2 between adjacent ones of the second antennas is 2 times the basic distance (distance d), is defined as the second antenna group Gr2. Each of the first antennas At1 and the second antennas At2 includes the plurality of element antennas 19 and the power supply circuit 25 which supplies power to the element antennas 19. The plurality of first antennas At1 are arranged side by side in the first array direction dr1 perpendicular to the transmission direction of the transmission signal, and each first antenna At1 has the power supply circuit 25 on the positive side or the negative side thereof in the first array direction dr1. The plurality of second antennas At2 are arranged side by side in the second array direction dr2 that is perpendicular to the transmission direction of the transmission signal and that is parallel to the first array direction dr1, and each second antenna At2 has the power supply circuit 25 on the positive side or the negative side thereof in the second array direction dr2. None of the power supply circuits 25 is located between adjacent ones of the antennas in the first antenna set. In the virtual reception antenna group 50 composed of the plurality of virtual reception antennas VR formed by the plurality of first antennas At1 in the first antenna group Gr1 and the plurality of second antennas At2 in the second antenna group Gr2, the virtual reception antennas VR are arranged side by side in the third array direction dr3 that is perpendicular to the transmission direction of the transmission signal and that is parallel to the first array direction dr1 and the second array direction dr2, and the interval (virtual reception antenna interval Dvr) in the third array direction dr3 between adjacent ones of the virtual reception antennas VR is the basic distance (distance d).

With this configuration, in the radar device 1 according to embodiment 1: the first antenna group Gr1 includes the first antenna set having the plurality of first antennas At1 such that the antenna interval D1 between adjacent ones of the first antennas is the basic distance (distance d); the second antenna group Gr2 includes the second antenna set having the plurality of second antennas At2 such that the antenna interval D2 between adjacent ones of the second antennas is 2 times the basic distance (distance d); and the interval (virtual reception antenna interval Dvr) between adjacent virtual reception antennas VR among the plurality of virtual reception antennas VR formed through transmission and reception by the plurality of first antennas At1 and the plurality of second antennas At2 is the basic distance (distance d). Consequently, the radar device 1 can reduce side lobe and inhibit erroneous detection even if three or more channels of first antennas At1 as reception antennas Rx or transmission antennas Tx cannot be physically arranged at an interval which is the predetermined distance d.

Embodiment 2

Figure 27:
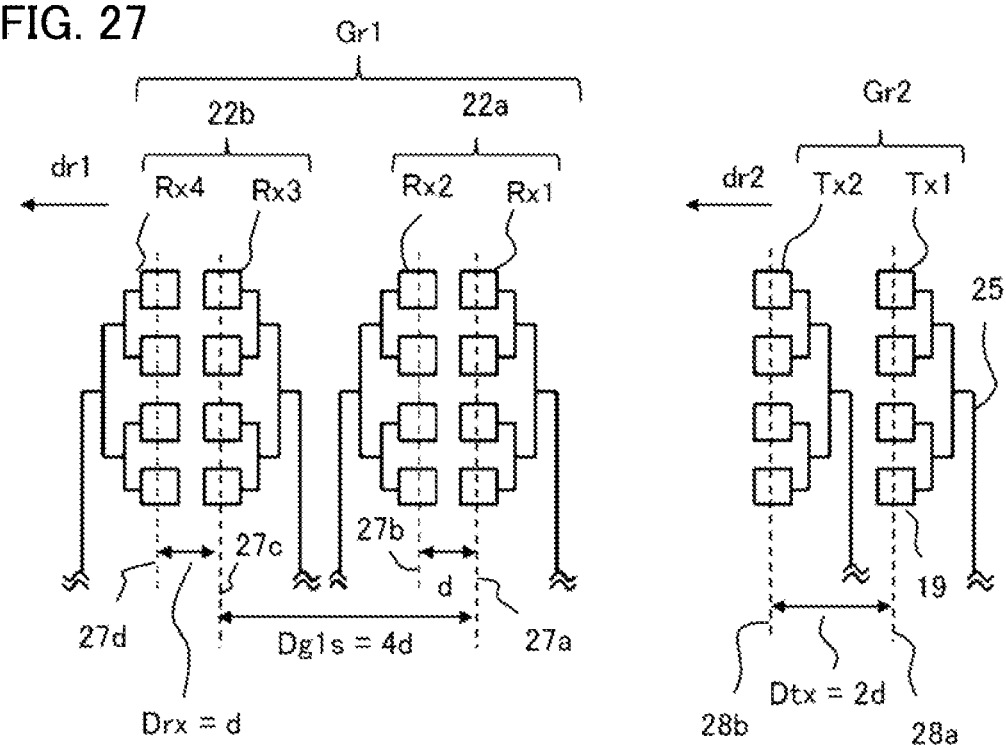
FIG. 27 illustrates an antenna arrangement in a radar device according to embodiment 2.
Figure 28:
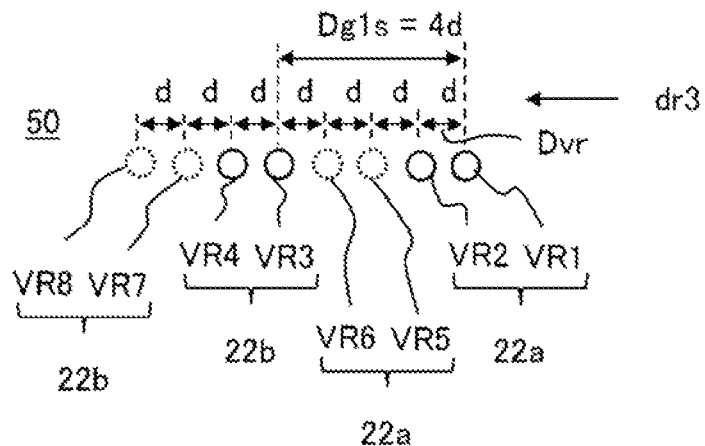
FIG. 28 illustrates a virtual reception antenna group corresponding to the antenna arrangement in FIG. 27.

FIG. 27 illustrates an antenna arrangement in a radar device according to embodiment 2, and FIG. 28 illustrates a virtual reception antenna group corresponding to the antenna arrangement in FIG. 27. For the radar device 1 according to embodiment 1, descriptions have been given regarding an example in which the first antenna group Gr1 includes only one antenna set in the first array direction dr1, the one set being composed of two antennas. The radar device 1 according to embodiment 2 is of an example in which the first antenna group Gr1 includes a plurality of antenna sets in the first array direction dr1, each one of the sets being composed of two antennas. Differences from the radar device 1 according to embodiment 1 will be mainly described. The radar device 1 according to embodiment 2 including antennas in the antenna arrangement in FIG. 27 includes: the two transmission antennas Tx1 and Tx2; the four reception antennas Rx1, Rx2, Rx3, and RX4; and the transmission circuit 12, the reception circuit 13, and the processing unit 11 shown in FIG. 1. The radar device 1 including the antennas in the antenna arrangement in FIG. 27 transmits a transmission signal having a modulation pattern 61 in which Tx1 and Tx2 are repeated in this order.

The transmission antennas Tx and the reception antennas Rx will be described. In the antenna arrangement shown in FIG. 27, the reception antennas Rx are antennas in the first antenna group Gr1, i.e., first antennas At1, and the transmission antennas Tx are antennas in the second antenna group Gr2, i.e., second antennas At2. The reception antennas Rx1, Rx2, RX3, and RX4 are arranged sequentially toward the positive side in the first array direction dr1, and the transmission antennas Tx1 and Tx2 are arranged sequentially toward the positive side in the second array direction dr2. The reception antennas Rx1 and Rx2 are such that the reception antenna interval Drx therebetween, i.e., the interval between the phase center line 27a and the phase center line 27b, is an interval equal to the distance d. Likewise, the reception antennas Rx3 and Rx4 are such that the reception antenna interval Drx therebetween, i.e., the interval between the phase center line 27c and the phase center line 27d, is an interval equal to the distance d. Each reception antenna interval Drx is the antenna interval D1 (see FIG. 12), between the first antennas At1, which is the distance d. The reception antennas Rx1 and Rx2 compose a first antenna set 22a, and the reception antennas Rx3 and Rx4 compose a first antenna set 22b. A first antenna set interval Dg1s between the first antenna set 22a and the first antenna set 22b, i.e., the interval between the phase center line 27a and the phase center line 27c, is 4 times the distance d, i.e., 4d. It is noted that the first antenna set interval Dg1s may be the interval between the phase center line 27b and the phase center line 27d. The first antenna set interval Dg1s is the interval between the adjacent first antenna sets.

The transmission antennas Tx1 and Tx2 are such that the transmission antenna interval Dtx therebetween, i.e., the interval between the phase center line 28a and the phase center line 28b, is 2 times the distance d, i.e., 2d. The transmission antenna interval Dtx is the antenna interval D2 (see FIG. 12), between the second antennas At2, which is 2 times the distance d. As the power supply circuit 25 of each of the transmission antennas Tx and the reception antennas Rx, a power supply circuit of the parallel power supply type formed so as to have equal wire lengths to the respective element antennas 19 is shown. Since the transmission antennas Tx are second antennas At2 in the second antenna group Gr2, an example is shown in which: the power supply circuit 25 of one of the transmission antennas Tx is located in a region adjacent to the other transmission antenna; and the respective element antennas 19 are arranged so as not to face each other. Since the reception antennas Rx are first antennas At1 in the first antenna group Gr1, the element antennas 19 of the reception antennas Rx1 and Rx2 in the first antenna set 22a are arranged so as to face each other such that the power supply circuit 25 of one of the reception antennas is not located in a region adjacent to the other reception antenna. Likewise, the element antennas 19 of the reception antennas Rx3 and Rx4 in the first antenna set 22b are arranged so as to face each other such that the power supply circuit 25 of one of the reception antennas is not located in a region adjacent to the other reception antenna.

FIG. 28 shows a virtual reception antenna group 50 formed by the transmission antennas Tx and the reception antennas Rx in the antenna arrangement in FIG. 27. The virtual reception antenna group 50 includes a plurality of virtual reception antennas. Eight virtual reception antennas VR1, VR2, VR3, VR4, VR5, VR6, VR7, and VR8 are formed by: the two transmission antennas Tx1 and Tx2 which are second antennas At2; and the four reception antennas Rx1, Rx2, Rx3, and Rx4 which are first antennas At1. The eight virtual reception antennas VR are arranged at regular intervals such that the virtual reception antenna interval Dvr as the interval between adjacent ones of the virtual reception antennas VR is the distance d. The virtual reception antennas VR in the virtual reception antenna group 50 are arrayed in the third array direction dr3 at regular intervals each of which is the distance d. The third array direction dr3 is a direction parallel to the first array direction dr1 and the second array direction dr2.

In the example in FIG. 28, the virtual reception antennas VR1 to VR8 are arranged in the order of VR1, VR2, VR5, VR6, VR3, VR4, VR7, and VR8 toward the positive side in the third array direction dr3. Out of the virtual reception antenna group 50, VR1, VR2, VR3, and VR4 indicated by solid-line circles are virtual reception antennas formed with signals that result from transmission by the transmission antennas Tx1 and that are received by the reception antennas Rx1 to Rx4, and VR5, VR6, VR7, and VR8 indicated by dash-line circles are virtual reception antennas formed with signals that result from transmission by the transmission antenna Tx2 and that are received by the reception antennas Rx1 to Rx4. The virtual reception antennas VR1 and VR2 are virtual reception antennas formed with signals received by the reception antennas Rx1 and Rx2 in the first antenna set 22a, and the virtual reception antennas VR3 and VR4 are virtual reception antennas formed with signals received by the reception antennas Rx3 and Rx4 in the first antenna set 22b. Therefore, the interval between the virtual reception antenna VR1 formed by the reception antenna Rx1 in the first antenna set 22a and the virtual reception antenna VR3 formed by the reception antenna Rx3 in the first antenna set 22b, is the first antenna set interval Dg1s which is 4d. The virtual reception antennas VR1 and VR3 are virtual reception antennas respectively formed by the reception antennas Rx1 and Rx3 on the negative side in the third array direction dr3 in the first antenna sets 22a and 22b. The interval between the virtual reception antennas VR2 and VR4 respectively formed by the reception antennas Rx2 and Rx4 on the positive side in the third array direction dr3 in the first antenna sets 22a and 22b, is also the first antenna set interval Dg1s which is 4d.

VR5, VR6, VR7, and VR8 indicated by dash-line circles are also such that, in the same manner as VR1, VR2, VR3, and VR4 indicated by the solid-line circles, the interval between the virtual reception antenna VR5 formed by the reception antenna Rx1 in the first antenna set 22a and the virtual reception antenna VR7 formed by the reception antenna Rx3 in the first antenna set 22b, is the first antenna set interval Dg1s which is 4d. That is, the interval between the virtual reception antennas VR5 and VR7 respectively formed by the reception antennas Rx1 and Rx3 on the negative side in the third array direction dr3 in the first antenna sets 22a and 22b, is the first antenna set interval Dg1s which is 4d. The interval between the virtual reception antennas VR6 and VR8 respectively formed by the reception antennas Rx2 and Rx4 on the positive side in the third array direction dr3 in the first antenna sets 22a and 22b, is also the first antenna set interval Dg1s which is 4d.

The first antenna set interval Dg1s between the first antenna sets 22a and 22b each having two reception antennas Rx arranged at the reception antenna interval Drx which is the distance d in the first antenna group Gr1, i.e., the antenna interval D1, is determined according to expression (3).

$$Dg1s = Ng2 \times D2 \quad (3)$$

Here, Ng2 is the number of second antennas, i.e., a second antenna number. In the case of the antenna arrangement in FIG. 27, the second antenna number Ng2 is 2, the second antennas At2 in the second antenna group Gr2 are transmission antennas Tx, and the antenna interval D2 between the adjacent second antennas At2 in the second antenna group Gr2 is the transmission antenna interval Dtx which is 2 times the distance d.

In the case of the antenna arrangement in FIG. 27, the first antenna set interval Dg1s is 2×D2 which equals 4d. As described above, the plurality of first antennas At1 arranged at the antenna interval D1 which is the predetermined distance d may be transmission antennas Tx or reception antennas Rx. The second antennas At2 are antennas for operations opposite to those of the first antennas At1. The antenna arrangement in FIG. 27 is of an example in which the number of the first antennas At1 is 4, and the number of the second antennas At2 is 2. However, antennas in the radar device 1 according to embodiment 2 are not limited thereto. The number of the first antennas At1 only has to be an even number equal to or larger than 4, two or more first antenna sets only have to be provided, and the number of the second antennas At2 only has to be equal to or larger than 2.

In the radar device 1 according to embodiment 2, the number of the first antennas At1 included in the first antenna group Gr1 is an even number equal to or larger than 4, the number of the second antennas At2 included in the second antenna group Gr2 is equal to or larger than 2, and the transmission circuit 12 and the reception circuit 13 have configurations respectively corresponding to the number of the transmission antennas Tx which are either the first antennas At1 or the second antennas At2 and the number of the reception antennas Rx which are the others out of the first antennas At1 and the second antennas At2. In the radar device 1 according to embodiment 2, the first antennas At1 are arranged such that the first antenna set interval Dg1s as the interval between the adjacent first antenna sets each having two first antennas At1 arranged at an interval which is the predetermined distance d, has a value obtained by multiplying the second antenna number Ng2 as the number of the second antennas At2 and the antenna interval D2 as the interval between the adjacent second antennas At2 in the second antenna group Gr2. The radar device 1 according to embodiment 2 corresponds to the case where three or more channels of first antennas At1 cannot be physically arranged at an interval which is the predetermined distance d. However, in the radar device 1, the plurality of virtual reception antennas VR formed through transmission and reception by the first antennas At1 and the second antennas At2 can be arranged at regular intervals each of which is the distance d, and thus it is possible to reduce side lobe and inhibit erroneous detection.

The radar device 1 according to embodiment 1 including the first antennas At1 and the second antennas At2 arranged as in the first example to sixth example of the antenna arrangement is suitable for the case where the number of channels of the first antennas At1 is 2. Meanwhile, the radar device 1 according to embodiment 2 is suitable for the case where the number of channels of the first antennas At1 is an even number equal to or larger than 2. It is noted that the radar device 1 according to embodiment 2 may be such that, in the same manner as in the seventh example of the antenna arrangement shown in FIG. 25, a plurality of sets of antennas in the first antenna group Gr1 and the second antenna group Gr2 are arranged in the extension direction of the phase center lines. In this case, the distance, the relative speed, and the angle of the target object 33 can be measured in the third array direction dr3 and the sixth array direction dr6 perpendicular thereto. That is, the measurement can be performed two-dimensionally.

Embodiment 3

Figure 29:
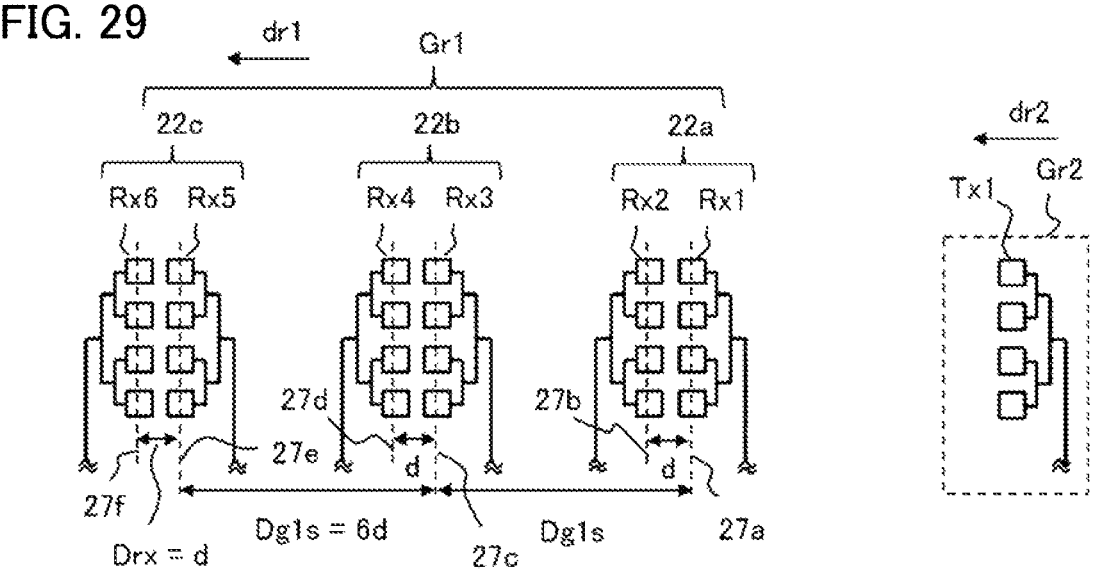
FIG. 29 illustrates an antenna arrangement in a radar device according to embodiment 3.
Figure 30:
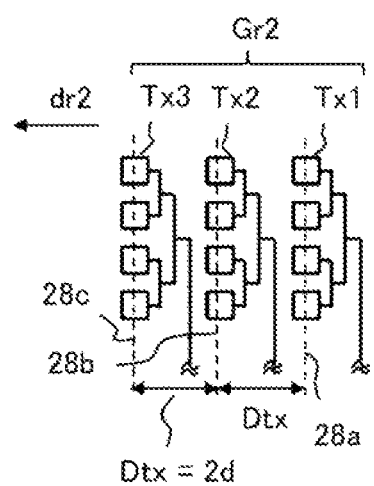
FIG. 30 illustrates an arrangement of transmission antennas in FIG. 29.
Figure 31:
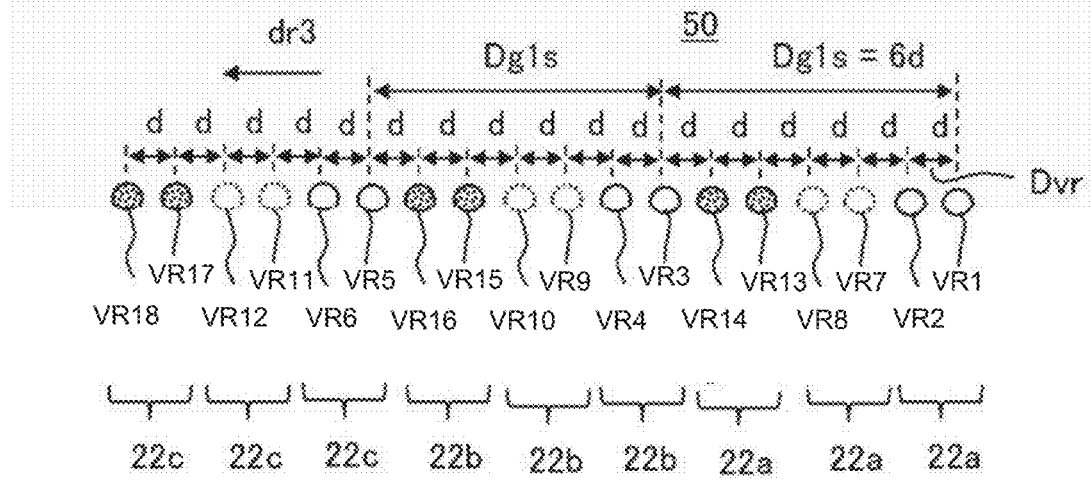
FIG. 31 illustrates a virtual reception antenna group corresponding to the antenna arrangement in FIG. 29.

FIG. 29 illustrates an antenna arrangement in a radar device according to embodiment 3, and FIG. 30 illustrates an arrangement of transmission antennas in FIG. 29. FIG. 31 illustrates a virtual reception antenna group corresponding to the antenna arrangement in FIG. 29. For the radar device 1 according to embodiment 2, descriptions have been given regarding an example in which the first antenna group Gr1 includes a plurality of antenna sets in the first array direction dr1, each one of the sets being composed of two antennas. The radar device 1 according to embodiment 3 is of an example in which, in the same manner as in the radar device 1 according to embodiment 2, the first antenna group Gr1 includes a plurality of antenna sets in the first array direction dr1, each one of the sets being composed of two antennas. Meanwhile, the radar device 1 is of an example in which the number of the second antennas At2 in the second antenna group Gr2 is a prime number equal to or larger than 2. Differences from the radar device 1 according to embodiment 2 will be mainly described. The radar device 1 according to embodiment 3 including antennas in the antenna arrangement in FIG. 29 and FIG. 30 is different from the radar device 1 according to embodiment 2 including the antennas in the antenna arrangement in FIG. 27 in that: the number of the antenna sets in the first antenna group Gr1 is 3; and the number of the transmission antennas Tx which are second antennas At2 in the second antenna group Gr2 is 3. Specifically, the radar device 1 according to embodiment 3 including the antennas in the antenna arrangement in FIG. 29 and FIG. 30 includes: three transmission antennas Tx1, Tx2, and Tx3; six reception antennas Rx1, Rx2, Rx3, Rx4, Rx5, and Rx6; the transmission circuit 12; the reception circuit 13; and the processing unit 11. The transmission circuit 12 is configured such that the transmission switch 124 performs switching between the three transmission antennas Tx1, Tx2, and Tx3. The reception circuit 13 has a configuration corresponding to the six reception antennas Rx1 to Rx6. The radar device 1 including the antennas in the antenna arrangement in FIG. 29 and FIG. 30 transmits a transmission signal having a modulation pattern 61 in which Tx1, Tx2, and Tx3 are repeated in this order.

The transmission antennas Tx and the reception antennas Rx will be described. In the antenna arrangement shown in FIG. 29 and FIG. 30, the reception antennas Rx are antennas in the first antenna group Gr1, i.e., first antennas At1, and the transmission antennas Tx are antennas in the second antenna group Gr2, i.e., second antennas At2. The reception antennas Rx1 to Rx6 are arranged sequentially toward the positive side in the first array direction dr1, and the transmission antennas Tx1, Tx2, and Tx3 are arranged sequentially toward the positive side in the second array direction dr2. The reception antennas Rx1 and Rx2 compose the first antenna set 22a, the reception antennas Rx3 and Rx4 compose the first antenna set 22b, and the reception antennas Rx5 and Rx6 compose a first antenna set 22c. The first antenna sets 22a and 22b are the same as those described in embodiment 2. The reception antennas Rx5 and Rx6 in the first antenna set 22c are such that the reception antenna interval Drx therebetween, i.e., the interval between a phase center line 27e and a phase center line 27f, is an interval equal to the distance d. The reception antenna interval Drx is the antenna interval D1 (see FIG. 12), between the first antennas At1, which is the distance d. The interval between adjacent first antenna sets among the first antenna sets 22a, 22b, and 22c, i.e., the first antenna set interval Dg1s, is 6 times the distance d, i.e., 6d. The interval between the first antenna set 22a and the first antenna set 22b is the interval between the phase center line 27a and the phase center line 27c or the interval between the phase center line 27b and the phase center line 27d, and the interval between the first antenna set 22b and the first antenna set 22c is the interval between the phase center line 27c and the phase center line 27e or the interval between the phase center line 27d and the phase center line 27f.

The transmission antennas Tx1, Tx2, and Tx3 are such that the interval between adjacent ones of the transmission antennas Tx, i.e., the transmission antenna interval Dtx, is 2 times the distance d, i.e., 2d. The interval between the transmission antenna Tx1 and the transmission antenna Tx2 is the interval between the phase center line 28a and the phase center line 28b, and the interval between the transmission antenna Tx2 and the transmission antenna Tx3 is the interval between the phase center line 28b and the phase center line 28c. The transmission antenna interval Dtx is the antenna interval D2 (see FIG. 12), between the second antennas At2, which is 2 times the distance d. As the power supply circuit 25 of each of the transmission antennas Tx and the reception antennas Rx, a power supply circuit of the parallel power supply type formed so as to have equal wire lengths to the respective element antennas 19 is shown. Since the transmission antennas Tx are second antennas At2 in the second antenna group Gr2, an example is shown in which: the power supply circuit 25 of one of the transmission antennas Tx is located in a region adjacent to another one of the transmission antennas; and the respective element antennas 19 are arranged so as not to face each other. Since the reception antennas Rx are first antennas At1 in the first antenna group Gr1, the element antennas 19 of the two reception antennas Rx in each of the first antenna sets 22a, 22b, and 22c are arranged so as to face each other such that the power supply circuit 25 of one of the reception antennas is not located in a region adjacent to the other reception antenna.

FIG. 31 shows a virtual reception antenna group 50 formed by the transmission antennas Tx and the reception antennas Rx in the antenna arrangement in FIG. 29 and FIG. 30. The virtual reception antenna group 50 includes a plurality of virtual reception antennas. Eighteen virtual reception antennas VR1 to VR18 are formed by: the three transmission antennas Tx1 to Tx3 which are second antennas At2; and the six reception antennas Rx1 to Rx6 which are first antennas At1. The eighteen virtual reception antennas VR are arranged at regular intervals such that the virtual reception antenna interval Dvr as the interval between adjacent ones of the virtual reception antennas VR is the distance d. The virtual reception antennas VR in the virtual reception antenna group 50 are arrayed in the third array direction dr3 at regular intervals each of which is the distance d. The third array direction dr3 is a direction parallel to the first array direction dr1 and the second array direction dr2.

In the example in FIG. 31, the virtual reception antennas VR1 to VR18 are arranged in the order of VR1, VR2, VR7, VR8, VR13, VR14, VR3, VR4, VR9, VR10, VR15, VR16, VR5, VR6, VR11, VR12, VR17, and VR18 toward the positive side in the third array direction dr3. Out of the virtual reception antenna group 50, VR1, VR2, VR3, VR4, VR5, and VR6 each indicated by a solid-line circle the inside of which is white are virtual reception antennas formed with signals that result from transmission by the transmission antenna Tx1 and that are received by the reception antennas Rx1 to Rx6, and VR7, VR8, VR9, VR10, VR11, and VR12 each indicated by a dash-line circle the inside of which is white are virtual reception antennas formed with signals that result from transmission by the transmission antenna Tx2 and that are received by the reception antennas Rx1 to Rx6. VR13, VR14, VR15, VR16, VR17, and VR18 each indicated by a solid-line circle the inside of which is patterned are virtual reception antennas formed with signals that result from transmission by the transmission antenna Tx3 and that are received by the reception antennas Rx1 to Rx6.

The virtual reception antennas VR1 and VR2 are virtual reception antennas formed with signals received by the reception antennas Rx1 and Rx2 in the first antenna set 22a, the virtual reception antennas VR3 and VR4 are virtual reception antennas formed with signals received by the reception antennas Rx3 and Rx4 in the first antenna set 22b, and the virtual reception antennas VR5 and VR6 are virtual reception antennas formed with signals received by the reception antennas Rx5 and Rx6 in the first antenna set 22c. Therefore, the interval between adjacent ones of the virtual reception antennas VR1, VR3, and VR5 respectively formed by the reception antenna Rx1 in the first antenna set 22a, the reception antenna Rx3 in the first antenna set 22b, and the reception antenna Rx5 in the first antenna set 22c, is the first antenna set interval Dg1s which is 6d. With the reception antennas Rx1, Rx3, and Rx5 being reception antennas Rx on the negative side in the third array direction dr3 in the first antenna sets 22a, 22b, and 22c, the interval between the virtual reception antennas VR2, VR4, and VR6 respectively formed by the reception antennas Rx2, Rx4, and Rx6 which are reception antennas Rx on the positive side in the third array direction dr3 in the first antenna sets 22a, 22b, and 22c, is also the first antenna set interval Dg1s which is 6d.

VR7, VR8, VR9, VR10, VR11, and VR12 each indicated by a dash-line circle the inside of which is white are also such that, in the same manner as VR1 to VR6 each indicated by a solid-line circle the inside of which is white, the interval between adjacent ones of the virtual reception antennas VR7, VR9, and VR11 respectively formed by the reception antenna Rx1 in the first antenna set 22a, the reception antenna Rx3 in the first antenna set 22b, and the reception antenna Rx5 in the first antenna set 22c, is the first antenna set interval Dg1s which is 6d. The interval between the virtual reception antennas VR8, VR10, and VR12 respectively formed by the reception antennas Rx2, Rx4, and Rx6 which are reception antennas Rx on the positive side in the third array direction dr3 in the first antenna sets 22a, 22b, and 22c, is also the first antenna set interval Dg1s which is 6d.

VR13, VR14, VR15, VR16, VR17, and VR18 each indicated by a solid-line circle the inside of which is patterned are also such that, in the same manner as VR1 to VR6 each indicated by a solid-line circle the inside of which is white, the interval between adjacent ones of the virtual reception antennas VR13, VR15, and VR17 respectively formed by the reception antenna Rx1 in the first antenna set 22a, the reception antenna Rx3 in the first antenna set 22b, and the reception antenna Rx5 in the first antenna set 22c, is the first antenna set interval Dg1s which is 6d. The interval between the virtual reception antennas VR14, VR16, and VR18 respectively formed by the reception antennas Rx2, Rx4, and Rx6 which are reception antennas Rx on the positive side in the third array direction dr3 in the first antenna sets 22a, 22b, and 22c, is also the first antenna set interval Dg1s which is 6d.

The first antenna set interval Dg1s which is the interval between adjacent first antenna sets among the first antenna sets 22a, 22b, and 22c each having two reception antennas Rx arranged at the reception antenna interval Drx which is the distance d in the first antenna group Gr1, i.e., the antenna interval D1, is determined according to expression (3). In the case of the antenna arrangement in FIG. 29 and FIG. 30, the second antenna number Ng2 is 3, the second antennas At2 in the second antenna group Gr2 are transmission antennas Tx, and the antenna interval D2 between adjacent ones of the second antennas At2 in the second antenna group Gr2 is the transmission antenna interval Dtx which is 2 times the distance d. In the case of the antenna arrangement in FIG. 29 and FIG. 30, the first antenna set interval Dg1s is 3×D2 which equals 6d. As described above, the plurality of first antennas At1 arranged at the antenna interval D1 which is the predetermined distance d may be transmission antennas Tx or reception antennas Rx. The second antennas At2 are antennas for operations opposite to those of the first antennas At1. The antenna arrangement in FIG. 29 and FIG. 30 is of an example in which the number of the first antennas At1 is 6, and the number of the second antennas At2 is 3. However, antennas in the radar device 1 according to embodiment 3 are not limited thereto. The number of the first antennas At1 only has to be an even number equal to or larger than 4, two or more first antenna sets only have to be provided, and the number of the second antennas At2 only has to be a prime number equal to or larger than 2.

In the radar device 1 according to embodiment 3, the number of the first antennas At1 included in the first antenna group Gr1 is an even number equal to or larger than 4, the number of the second antennas At2 included in the second antenna group Gr2 is a prime number equal to or larger than 2, and the transmission circuit 12 and the reception circuit 13 have configurations respectively corresponding to the number of the transmission antennas Tx which are either the first antennas At1 or the second antennas At2 and the number of the reception antennas Rx which are the others out of the first antennas At1 and the second antennas At2. In the radar device 1 according to embodiment 3, the first antennas At1 are arranged such that the first antenna set interval Dg1s as the interval between adjacent ones of the first antenna sets each having two first antennas At1 arranged at an interval which is the predetermined distance d, has a value obtained by multiplying the second antenna number Ng2 as the number of the second antennas At2 and the antenna interval D2 as the interval between adjacent ones of the second antennas At2 in the second antenna group Gr2. The radar device 1 according to embodiment 3 corresponds to the case where three or more channels of first antennas At1 cannot be physically arranged at an interval which is the predetermined distance d. However, in the radar device 1, the plurality of virtual reception antennas VR formed through transmission and reception by the first antennas At1 and the second antennas At2 can be arranged at regular intervals each of which is the distance d, and thus it is possible to reduce side lobe and inhibit erroneous detection.

The radar device 1 according to embodiment 3 is suitable for the case where: the number of channels of the first antennas At1 is an even number equal to or larger than 2; and the number of the second antennas At2 is a prime number equal to or larger than 2. In the radar device 1 according to embodiment 3, even if the number of the second antennas At2 is a prime number equal to or larger than 2, the plurality of virtual reception antennas VR formed through transmission and reception by the first antennas At1 and the second antennas At2 can be arranged at regular intervals each of which is the distance d. In addition, in the case where the second antennas At2 are transmission antennas Tx, the plurality of virtual reception antennas VR can be arranged at regular intervals each of which is the distance d if the virtual reception antennas VR are arranged so as to be, for each transmission antenna Tx, made into groups corresponding to the respective sets of reception antennas Rx, i.e., the first antenna sets 22a, 22b, and 22c. It is noted that the radar device 1 according to embodiment 3 may be such that, in the same manner as in the seventh example of the antenna arrangement shown in FIG. 25, a plurality of sets of antennas in the first antenna group Gr1 and the second antenna group Gr2 are arranged in the extension direction of the phase center lines. In this case, the distance, the relative speed, and the angle of the target object 33 can be measured in the third array direction dr3 and the sixth array direction dr6 perpendicular thereto. That is, the measurement can be performed two-dimensionally.

Embodiment 4

Figure 32:
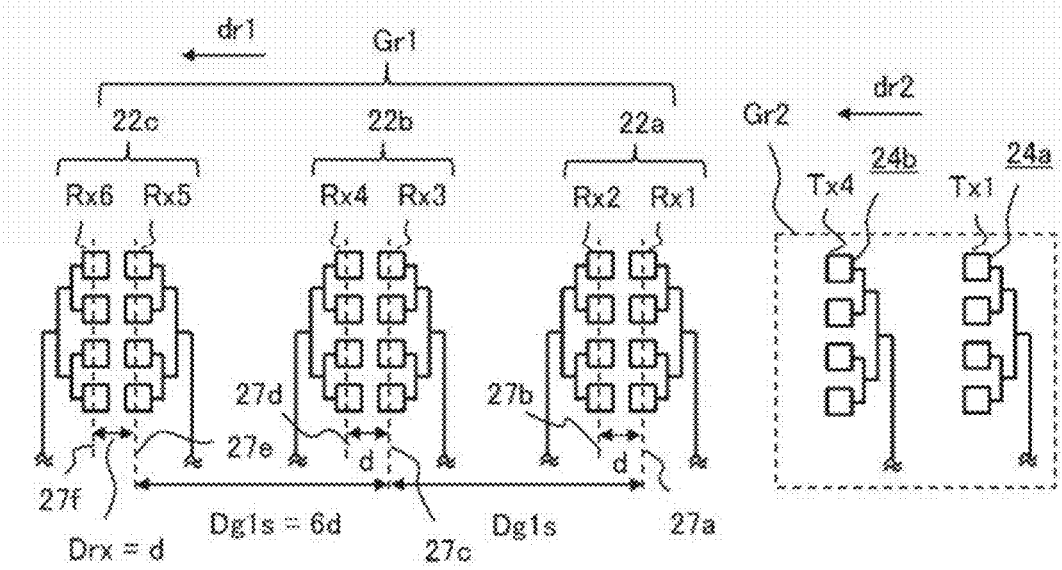
FIG. 32 illustrates an antenna arrangement in a radar device according to embodiment 4.
Figure 33:
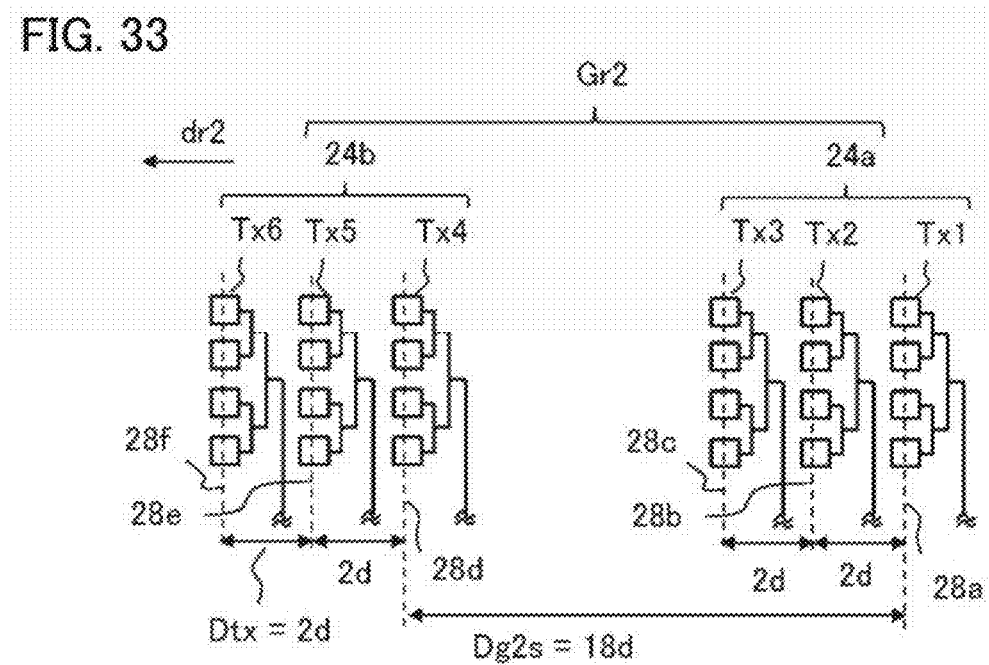
FIG. 33 illustrates an arrangement of transmission antennas in FIG. 32.
Figure 34:
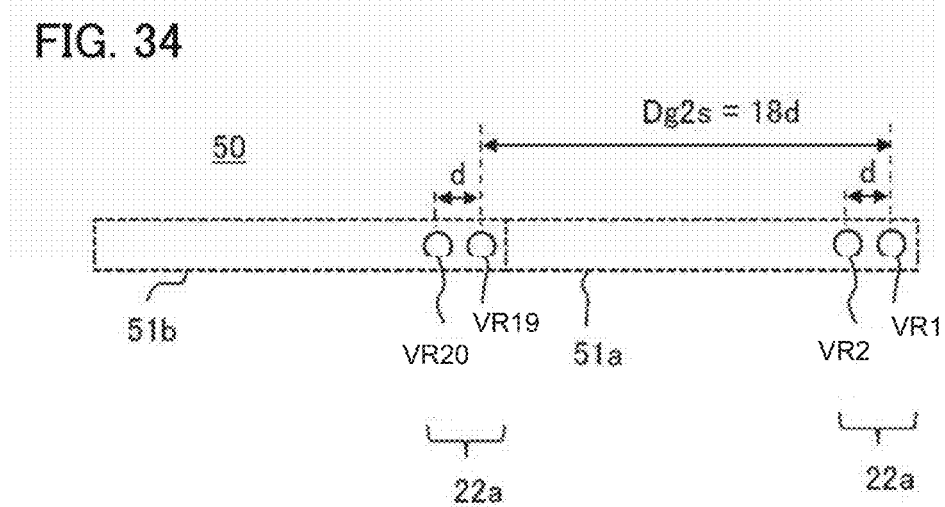
FIG. 34 illustrates a virtual reception antenna group corresponding to the antenna arrangement in FIG. 32.
Figure 35:
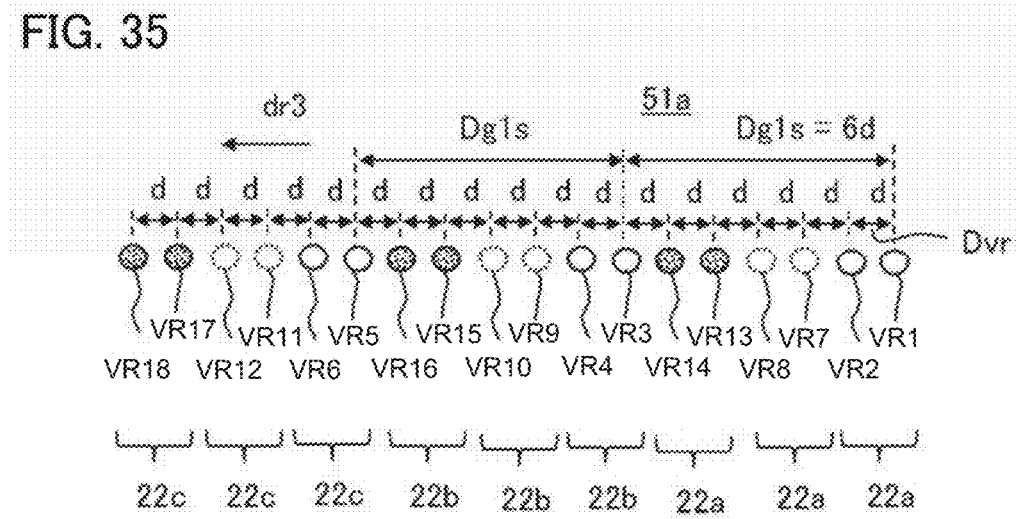
FIG. 35 illustrates a first virtual reception antenna group in FIG. 34.
Figure 36:
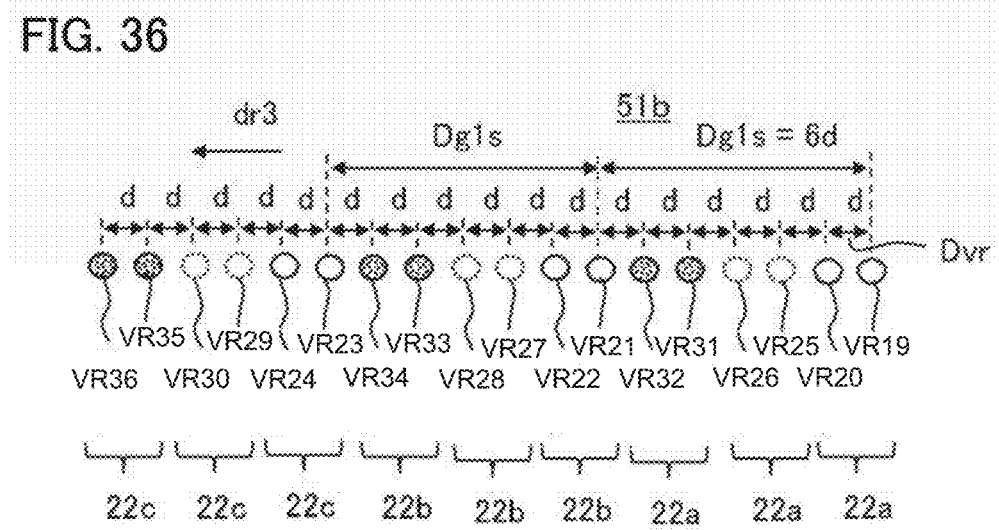
FIG. 36 illustrates a second virtual reception antenna group in FIG. 34.

FIG. 32 illustrates an antenna arrangement in a radar device according to embodiment 4, and FIG. 33 illustrates an arrangement of transmission antennas in FIG. 32. FIG. 34 illustrates a virtual reception antenna group corresponding to the antenna arrangement in FIG. 32, FIG. 35 illustrates a first virtual reception antenna group in FIG. 34, and FIG. 36 illustrates a second virtual reception antenna group in FIG. 34. For the radar device 1 according to embodiment 3, descriptions have been given regarding an extension method for the antenna arrangement in the radar device 1 according to embodiment 2 in the case where the number of the second antennas At2 in the second antenna group Gr2 is a prime number equal to or larger than 2. The radar device 1 according to embodiment 4 is of an example in which a plurality of second antenna sets each having second antennas At2, the number of which is a prime number equal to or larger than 2, are provided. Differences from the radar device 1 according to embodiment 3 will be mainly described. The radar device 1 according to embodiment 4 including antennas in the antenna arrangement in FIG. 32 and FIG. 33 is different from the radar device 1 according to embodiment 3 including the antennas in the antenna arrangement in FIG. 29 and FIG. 30 in that the second antenna group Gr2 includes two second antenna sets each having three transmission antennas Tx which are second antennas At2. Specifically, the radar device 1 according to embodiment 4 including the antennas in the antenna arrangement in FIG. 32 and FIG. 33 includes: six transmission antennas Tx1, Tx2, Tx3, Tx4, Tx5, and Tx6; the six reception antennas Rx1, Rx2, Rx3, Rx4, Rx5, and Rx6; the transmission circuit 12; the reception circuit 13; and the processing unit 11. The transmission circuit 12 is configured such that the transmission switch 124 performs switching between the six transmission antennas Tx1 to Tx6. The reception circuit 13 has a configuration corresponding to the six reception antennas Rx1 to Rx6. The radar device 1 including the antennas in the antenna arrangement in FIG. 32 and FIG. 33 transmits a transmission signal having a modulation pattern 61 in which Tx1, Tx2, Tx3, Tx4, Tx5, and Tx6 are repeated in this order.

The transmission antennas Tx and the reception antennas Rx will be described. In the antenna arrangement shown in FIG. 32 and FIG. 33, the reception antennas Rx are antennas in the first antenna group Gr1, i.e., first antennas At1, and the transmission antennas Tx are antennas in the second antenna group Gr2, i.e., second antennas At2. The reception antennas Rx1 to Rx6 are arranged sequentially toward the positive side in the first array direction dr1, and the transmission antennas Tx1 to Tx6 are arranged sequentially toward the positive side in the second array direction dr2. The reception antennas Rx1 and Rx2 compose the first antenna set 22a, the reception antennas Rx3 and Rx4 compose the first antenna set 22b, and the reception antennas Rx5 and Rx6 compose the first antenna set 22c. The first antenna group Gr1 shown in FIG. 32 is the same as the first antenna group Gr1 shown in FIG. 29, and thus the descriptions thereof will not be repeated.

The transmission antennas Tx1, Tx2, and Tx3 compose a second antenna set 24a, and the transmission antennas Tx4, Tx5, and Tx6 compose a second antenna set 24b. If the number, i.e., the set number, of the second antenna sets is defined as a, and the antenna number, i.e., the in-set antenna number, in each second antenna set is defined as β, the second antenna group Gr2 in the antenna arrangement shown in FIG. 32 and FIG. 33 includes second antennas At2, the number of which is calculated as 6 according to α×β where the set number α is 2 and the in-set antenna number β is 3. The second antenna set 24a is the same as that described in embodiment 3. The second antenna set 24b also has the same configuration as that of the second antenna set 24a. The interval between adjacent transmission antennas Tx among the transmission antennas Tx4, Tx5, and Tx6, i.e., the transmission antenna interval Dtx, is 2 times the distance d, i.e., 2d. The interval between the transmission antenna Tx4 and the transmission antenna Tx5 is the interval between the phase center line 28d and the phase center line 28e, and the interval between the transmission antenna Tx5 and the transmission antenna Tx6 is the interval between the phase center line 28e and a phase center line 28f. The transmission antenna interval Dtx is the antenna interval D2 (see FIG. 12), between the second antennas At2, which is 2 times the distance d. As the power supply circuit 25 of each of the transmission antennas Tx and the reception antennas Rx, a power supply circuit of the parallel power supply type formed so as to have equal wire lengths to the respective element antennas 19 is shown. Since the transmission antennas Tx are second antennas At2 in the second antenna group Gr2, an example is shown in which: the power supply circuit 25 of one of the transmission antennas Tx is located in a region adjacent to another one of the transmission antennas; and the respective element antennas 19 are arranged so as not to face each other. Since the reception antennas Rx are first antennas At1 in the first antenna group Gr1, the element antennas 19 of the two reception antennas Rx in each of the first antenna sets 22a, 22b, and 22c are arranged so as to face each other such that the power supply circuit 25 of one of the reception antennas is not located in a region adjacent to the other reception antenna.

FIG. 34, FIG. 35, and FIG. 36 show a virtual reception antenna group 50 formed by the transmission antennas Tx and the reception antennas Rx in the antenna arrangement in FIG. 32 and FIG. 33. The virtual reception antenna group 50 includes a plurality of virtual reception antennas. Thirty-six virtual reception antennas VR1 to VR36 are formed by: the six transmission antennas Tx1 to Tx6 which are second antennas At2; and the six reception antennas Rx1 to Rx6 which are first antennas At1. The thirty-six virtual reception antennas VR are arranged at regular intervals such that the virtual reception antenna interval Dvr as the interval between adjacent ones of the virtual reception antennas VR is the distance d. The virtual reception antennas VR in the virtual reception antenna group 50 are arrayed in the third array direction dr3 at regular intervals each of which is the distance d. The third array direction dr3 is a direction parallel to the first array direction dr1 and the second array direction dr2.

Since the second antenna group Gr2 includes the two second antenna sets 24a and 24b, the virtual reception antenna group 50 is composed of: a virtual reception antenna group 51a having the virtual reception antennas VR1 to VR18 formed with signals that result from transmission by the transmission antennas Tx in the second antenna set 24a and that are received by the reception antennas Rx1 to Rx6; and a virtual reception antenna group 51b having the virtual reception antennas VR19 to VR36 formed with signals that result from transmission by the transmission antennas Tx in the second antenna set 24b and that are received by the reception antennas Rx1 to Rx6. The virtual reception antenna group 51a shown in FIG. 35 has the same configuration as that of the virtual reception antenna group 50 in FIG. 31 described in embodiment 3.

The virtual reception antenna group 51b has the same configuration as that of the virtual reception antenna group 51a. In the example in FIG. 36, the virtual reception antennas VR19 to VR36 are arranged in the order of VR19, VR20, VR25, VR26, VR31, VR32, VR21, VR22, VR27, VR28, VR33, VR34, VR23, VR24, VR29, VR30, VR35, and VR36 toward the positive side in the third array direction dr3. Out of the virtual reception antenna group 51*b*, VR19, VR20, VR21, VR22, VR23, and VR24 each indicated by a solid-line circle the inside of which is white are virtual reception antennas formed with signals that result from transmission by the transmission antenna Tx4 and that are received by the reception antennas Rx1 to Rx6, and VR25, VR26, VR27, VR28, VR29, and VR30 each indicated by a dash-line circle the inside of which is white are virtual reception antennas formed with signals that result from transmission by the transmission antenna Tx5 and that are received by the reception antennas Rx1 to Rx6. VR31, VR32, VR33, VR34, VR35, and VR36 each indicated by a solid-line circle the inside of which is patterned are virtual reception antennas formed with signals that result from transmission by the transmission antenna Tx6 and that are received by the reception antennas Rx1 to Rx6.

The virtual reception antennas VR19 and VR20 are virtual reception antennas formed with signals received by the reception antennas Rx1 and Rx2 in the first antenna set 22*a*, the virtual reception antennas VR21 and VR22 are virtual reception antennas formed with signals received by the reception antennas Rx3 and Rx4 in the first antenna set 22*b*, and the virtual reception antennas VR23 and VR24 are virtual reception antennas formed with signals received by the reception antennas Rx5 and Rx6 in the first antenna set 22*c*. Therefore, the interval between adjacent ones of the virtual reception antennas VR19, VR21, and VR23 respectively formed by the reception antenna Rx1 in the first antenna set 22*a*, the reception antenna Rx3 in the first antenna set 22*b*, and the reception antenna Rx5 in the first antenna set 22*c*, is the first antenna set interval Dg1*s* which is 6d. With the reception antennas Rx1, Rx3, and Rx5 being reception antennas Rx on the negative side in the third array direction dr3 in the first antenna sets 22*a*, 22*b*, and 22*c*, the interval between the virtual reception antennas VR20, VR22, and VR24 respectively formed by the reception antennas Rx2, Rx4, and Rx6 which are reception antennas Rx on the positive side in the third array direction dr3 in the first antenna sets 22*a*, 22*b*, and 22*c*, is also the first antenna set interval Dg1*s* which is 6d.

VR25, VR26, VR27, VR28, VR29, and VR30 each indicated by a dash-line circle the inside of which is white are also such that, in the same manner as VR19 to VR24 each indicated by a solid-line circle the inside of which is white, the interval between adjacent ones of the virtual reception antennas VR25, VR27, and VR29 respectively formed by the reception antenna Rx1 in the first antenna set 22*a*, the reception antenna Rx3 in the first antenna set 22*b*, and the reception antenna Rx5 in the first antenna set 22*c*, is the first antenna set interval Dg1*s* which is 6d. The interval between the virtual reception antennas VR26, VR28, and VR30 respectively formed by the reception antennas Rx2, Rx4, and Rx6 which are reception antennas Rx on the positive side in the third array direction dr3 in the first antenna sets 22*a*, 22*b*, and 22*c*, is also the first antenna set interval Dg1*s* which is 6d.

VR31, VR32, VR33, VR34, VR35, and VR36 each indicated by a solid-line circle the inside of which is patterned are also such that, in the same manner as VR19 to VR24 each indicated by a solid-line circle the inside of which is white, the interval between adjacent ones of the virtual reception antennas VR31, VR33, and VR35 respectively formed by the reception antenna Rx1 in the first antenna set 22*a*, the reception antenna Rx3 in the first antenna set 22*b*, and the reception antenna Rx5 in the first antenna set 22*c*, is the first antenna set interval Dg1*s* which is 6d. The interval between the virtual reception antennas VR32, VR34, and VR36 respectively formed by the reception antennas Rx2, Rx4, and Rx6 which are reception antennas Rx on the positive side in the third array direction dr3 in the first antenna sets 22*a*, 22*b*, and 22*c*, is also the first antenna set interval Dg1*s* which is 6d.

The first antenna set interval Dg1*s* which is the interval between adjacent first antenna sets among the first antenna sets 22*a*, 22*b*, and 22*c* each having two reception antennas Rx arranged at the reception antenna interval Drx which is the distance d in the first antenna group Gr1, i.e., the antenna interval D1, is determined according to expression (4).

$$Dg1s = \beta \times D2 \quad (4)$$

As described above, $\beta$ represents the antenna number, i.e., the in-set antenna number, in each second antenna set. In the case of the antenna arrangement in FIG. 32 and FIG. 33, the in-set antenna number $\beta$ in the second antenna set is 3, the second antennas At2 in the second antenna group Gr2 are transmission antennas Tx, and the antenna interval D2 between adjacent ones of the second antennas At2 in each of the second antenna sets 24*a* and 24*b* in the second antenna group Gr2 is the transmission antenna interval Dtx which is 2 times the distance d. In the case of the antenna arrangement in FIG. 32 and FIG. 33, the first antenna set interval Dg1*s* is 3×D2 which equals 6d.

A second antenna set interval Dg2*s* between the second antenna sets 24*a* and 24*b* each having three transmission antennas Tx arranged at the transmission antenna interval Dtx which is 2 times the distance d in the second antenna group Gr2, i.e., the antenna interval D2, is determined according to expression (5). The second antenna set interval Dg2*s* is the interval between the adjacent second antenna sets.

$$Dg2s = Dg1s \times Ng1/2 \quad (5)$$

Here, Ng1 represents the number of the first antennas, i.e., a first antenna number. In the case of the antenna arrangement in FIG. 32 and FIG. 33, the first antenna set interval Dg1*s* is 6d, and the first antenna number Ng1 is 6.

In the case of the antenna arrangement in FIG. 32 and FIG. 33, the second antenna set interval Dg2*s* is calculated as 18d according to 6d×6/2. As described above, the plurality of first antennas At1 arranged at the antenna interval D1 which is the predetermined distance d may be transmission antennas Tx or reception antennas Rx. The second antennas At2 are antennas for operations opposite to those of the first antennas At1. The antenna arrangement in FIG. 32 and FIG. 33 is of an example in which the number of the first antennas At1 is 6, and the number of the second antennas At2 is 6. However, antennas in the radar device 1 according to embodiment 4 are not limited thereto. The number of the first antennas At1, i.e., the first antenna number Ng1, only has to be an even number equal to or larger than 4, two or more first antenna sets only have to be provided, and the number of the second antennas At2, i.e., the second antenna number Ng2, only has to be $\alpha \times \beta$. Here, the set number $\alpha$ of the second antenna sets and the in-set antenna number $\beta$ in each second antenna set in the second antenna group Gr2 are each an integer equal to or larger than 2.

In the radar device 1 according to embodiment 4, the number of the first antennas At1 included in the first antenna group Gr1 is an even number equal to or larger than 4, the number of the second antennas At2 included in the second antenna group Gr2 is $\alpha \times \beta$, and the transmission circuit 12 and the reception circuit 13 have configurations respectively corresponding to the number of the transmission antennas Tx which are either the first antennas At1 or the second antennas At2 and the number of the reception antennas Rx which are the others out of the first antennas At1 and the second antennas At2. In the radar device 1 according to embodiment 4, the first antennas At1 are arranged such that the first antenna set interval Dg1s as the interval between adjacent ones of the first antenna sets each having two first antennas At1 arranged at an interval which is the predetermined distance d, has a value obtained by multiplying the in-set antenna number β as the number of the second antennas At2 in each of the second antenna sets 24a and 24b and the antenna interval D2 as the interval between adjacent ones of the second antennas At2 in each of the second antenna sets 24a and 24b. Further, in the radar device 1 according to embodiment 4, the second antennas At2 are arranged such that the second antenna set interval Dg2s as the interval between the adjacent second antenna sets 24a and 24b having a set number of a and each having second antennas At2 which have an in-set antenna number of β and which are arranged at the antenna interval D2, has a value obtained by dividing, by 2, the product of the first antenna set interval Dg1s and the first antenna number Ng1 as the number of the first antennas At1. The radar device 1 according to embodiment 4 corresponds to the case where three or more channels of first antennas At1 cannot be physically arranged at an interval which is the predetermined distance d. However, in the radar device 1, the plurality of virtual reception antennas VR formed through transmission and reception by the first antennas At1 and the second antennas At2 can be arranged at regular intervals each of which is the distance d, and thus it is possible to reduce side lobe and inhibit erroneous detection.

The radar device 1 according to embodiment 4 is suitable for the case where: the number of channels of the first antennas At1 is an even number equal to or larger than 2; and the number of the second antennas At2 is α×β which is the product of the set number α and the in-set antenna number β. In the radar device 1 according to embodiment 4, even if three or more channels of first antennas At1 cannot be physically arranged at an interval which is the predetermined distance d, the plurality of virtual reception antennas VR formed through transmission and reception by the first antennas At1 and the second antennas At2 can be arranged at regular intervals each of which is the distance d. In addition, in the case where the second antennas At2 are transmission antennas Tx, the plurality of virtual reception antennas VR can be arranged at regular intervals each of which is the distance d if the virtual reception antennas VR are arranged so as to be, for each transmission antenna Tx, made into groups corresponding to the respective sets of reception antennas Rx, i.e., the first antenna sets 22a, 22b, and 22c. It is noted that the radar device 1 according to embodiment 4 may be such that, in the same manner as in the seventh example of the antenna arrangement shown in FIG. 25, a plurality of sets of antennas in the first antenna group Gr1 and the second antenna group Gr2 are arranged in the extension direction of the phase center lines. In this case, the distance, the relative speed, and the angle of the target object 33 can be measured in the third array direction dr3 and the sixth array direction dr6 perpendicular thereto. That is, the measurement can be performed two-dimensionally.

The example of the antenna arrangement in FIG. 32 and FIG. 33 is an example in which each of the first antenna group Gr1 and the second antenna group Gr2 is arranged side by side with the other antenna group in the antenna array direction thereof, i.e., an example in which the first antenna group Gr1 is arranged on the positive side in the second array direction dr2 with respect to the second antenna group Gr2. However, the first antenna group Gr1 and the second antenna group Gr2 may be arranged side by side with each other in the extension direction of each of the phase center lines of the respective antennas as in FIG. 37. In the example of an antenna arrangement in FIG. 37, the first antenna group Gr1 is arranged on the upper side of the drawing sheet with respect to the second antenna group Gr2. If the first antenna group Gr1 and the second antenna group Gr2 are arranged side by side with each other in the extension direction of each of the phase center lines of the respective antennas, the virtual reception antennas VR can be arranged at regular intervals each of which is the predetermined distance d, and the length of the radar device 1 in a longitudinal direction across the transmission antennas Tx and the reception antennas Rx, i.e., the length of the radar device 1 in the first array direction dr1 and the second array direction dr2, can be reduced. In this case, even if the total number of the transmission antennas Tx and the reception antennas Rx is increased, the length in the longitudinal direction across the transmission antennas Tx and the reception antennas Rx, i.e., a length in an antenna longitudinal direction, can be prevented from becoming exceptionally longer than the length of each of the transmission circuit 12, the reception circuit 13, and the processing unit 11 in the antenna longitudinal direction. If the total number of the transmission antennas Tx and the reception antennas Rx on the same straight line is increased, the length of the radar device 1 in the longitudinal direction is increased according to the length in the antenna longitudinal direction. Considering this, if the total number of the transmission antennas Tx and the reception antennas Rx is increased, the length in the antenna longitudinal direction across the transmission antennas Tx and the reception antennas Rx is shortened, whereby the length of the radar device 1 in the longitudinal direction can be shortened.

Embodiment 5

Figure 37:
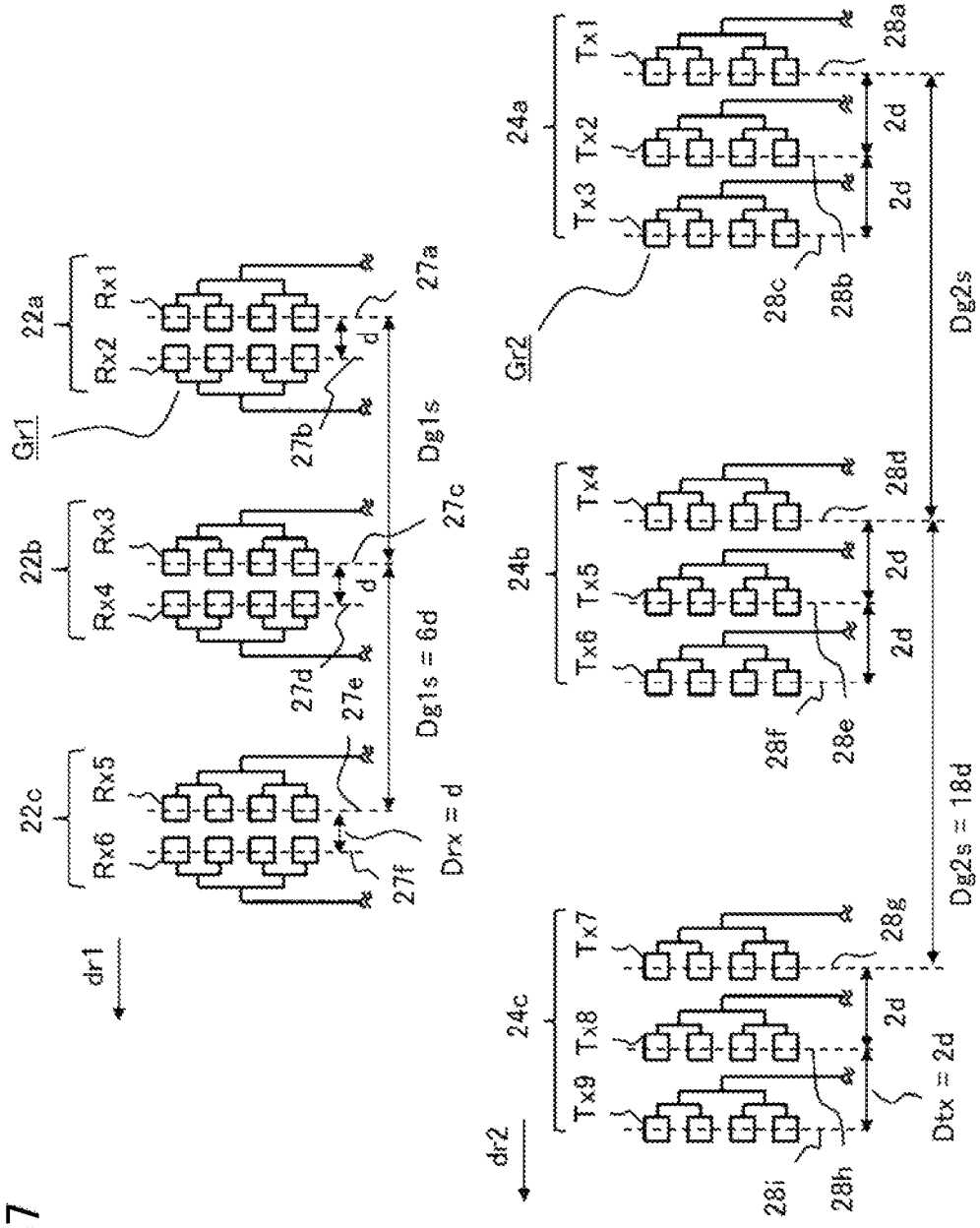
FIG. 37 illustrates an antenna arrangement in a radar device according to embodiment 5.
Figure 38:
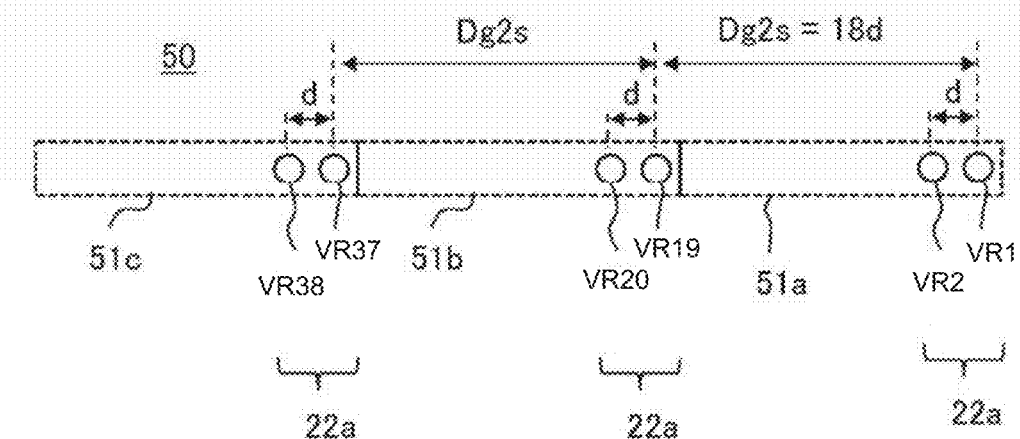
FIG. 38 illustrates a virtual reception antenna group corresponding to the antenna arrangement in FIG. 37.
Figure 39:
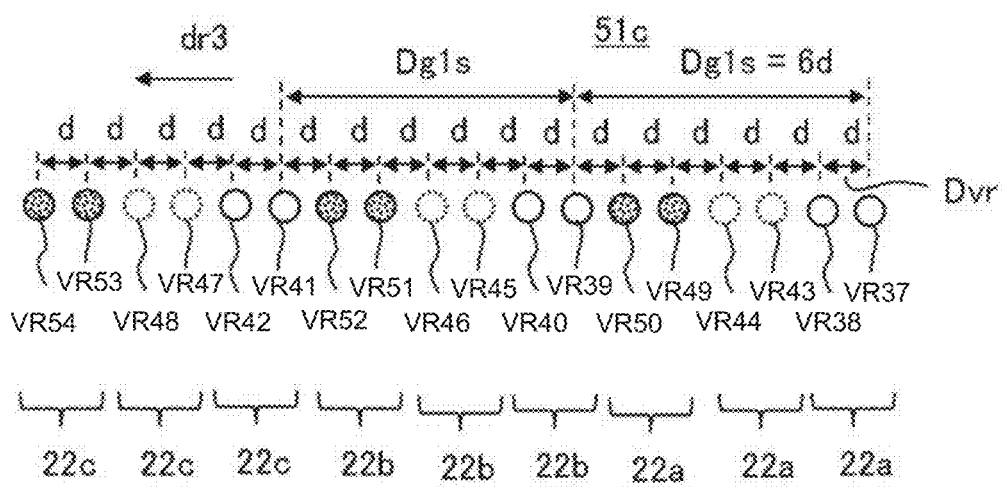
FIG. 39 illustrates a third virtual reception antenna group in FIG. 37.

FIG. 37 illustrates an antenna arrangement in a radar device according to embodiment 5, FIG. 38 illustrates a virtual reception antenna group corresponding to the antenna arrangement in FIG. 37, and FIG. 39 illustrates a third virtual reception antenna group in FIG. 37. A radar device 1 according to embodiment 5 is of an example in which the set number α of the second antenna sets in the second antenna group Gr2 is 3 as compared to the radar device 1 according to embodiment 4. Differences from the radar device 1 according to embodiment 4 will be mainly described. The radar device 1 according to embodiment 5 including antennas in the antenna arrangement in FIG. 37 is different from the radar device 1 according to embodiment 4 including the antennas in the antenna arrangement in FIG. 32 and FIG. 33 in that the second antenna group Gr2 includes three second antenna sets each having three transmission antennas Tx which are second antennas At2. With use of the set number α and the in-set antenna number β regarding the second antennas At2 in the second antenna group Gr2, the radar device 1 according to embodiment 4 including the antennas in the antenna arrangement in FIG. 32 and FIG. 33 is expressed as being of an example in which the set number α and the in-set antenna number β are respectively 2 and 3, and the radar device 1 according to embodiment 5 including the antennas in the antenna arrangement in FIG. 37 is expressed as being of an example in which each of the set number α and the in-set antenna number β is 3.

Specifically, the radar device 1 according to embodiment 5 including the antennas in the antenna arrangement in FIG. 37 includes: nine transmission antennas Tx1, Tx2, Tx3, Tx4, Tx5, Tx6, Tx7, Tx8, and Tx9; the six reception antennas Rx1, Rx2, Rx3, Rx4, Rx5, and Rx6; the transmission circuit 12; the reception circuit 13; and the processing unit 11. The transmission circuit 12 is configured such that the transmission switch 124 performs switching between the nine transmission antennas Tx1 to Tx9. The reception circuit 13 has a configuration corresponding to the six reception antennas Rx1 to Rx6. The radar device 1 including the antennas in the antenna arrangement in FIG. 37 transmits a transmission signal having a modulation pattern 61 in which Tx1, Tx2, Tx3, Tx4, Tx5, Tx6, Tx7, Tx8, and Tx9 are repeated in this order.

The transmission antennas Tx and the reception antennas Rx will be described. In the antenna arrangement shown in FIG. 37, the reception antennas Rx are antennas in the first antenna group Gr1, i.e., first antennas At1, and the transmission antennas Tx are antennas in the second antenna group Gr2, i.e., second antennas At2. The reception antennas Rx1 to Rx6 are arranged sequentially toward the positive side in the first array direction dr1, and the transmission antennas Tx1 to Tx9 are arranged sequentially toward the positive side in the second array direction dr2. The reception antennas Rx1 and Rx2 compose the first antenna set 22a, the reception antennas Rx3 and Rx4 compose the first antenna set 22b, and the reception antennas Rx5 and Rx6 compose the first antenna set 22c. The first antenna group Gr1 shown in FIG. 37 is the same as the first antenna group Gr1 shown in FIG. 32, and thus the descriptions thereof will not be repeated.

The transmission antennas Tx1, Tx2, and Tx3 compose the second antenna set 24a, the transmission antennas Tx4, Tx5, and Tx6 compose the second antenna set 24b, and the transmission antennas Tx7, Tx8, and Tx9 compose a second antenna set 24c. With use of the set number α and the in-set antenna number β regarding the second antennas At2 in the second antenna group Gr2, the second antenna group Gr2 in the antenna arrangement shown in FIG. 37 is expressed as including second antennas At2, the number of which is calculated as 9 according to α×β where the set number α is 3 and the in-set antenna number β is 3. The second antenna sets 24a and 24b are the same as those described in embodiment 4. The second antenna set 24c also has the same configuration as those of the second antenna sets 24a and 24b. The interval between adjacent transmission antennas Tx among the transmission antennas Tx7, Tx8, and Tx9, i.e., the transmission antenna interval Dtx, is 2 times the distance d, i.e., 2d. The interval between the transmission antenna Tx7 and the transmission antenna Tx8 is the interval between a phase center line 28g and a phase center line 28h, and the interval between the transmission antenna Tx8 and the transmission antenna Tx9 is the interval between the phase center line 28h and a phase center line 28i. The transmission antenna interval Dtx is the antenna interval D2 (see FIG. 12), between the second antennas At2, which is 2 times the distance d. The power supply circuit 25 of each of the transmission antennas Tx and the reception antennas Rx is the same as that in the radar device 1 according to embodiment 4. That is, as the power supply circuit 25, a power supply circuit of the parallel power supply type formed so as to have equal wire lengths to the respective element antennas 19 is shown.

FIG. 38 shows a virtual reception antenna group 50 formed by the transmission antennas Tx and the reception antennas Rx in the antenna arrangement in FIG. 37. The virtual reception antenna group 50 shown in FIG. 38 is composed of virtual reception antenna groups 51a, 51b, and 51c. The virtual reception antenna groups 51a and 51b are the same as the virtual reception antenna groups 51a and 51b shown in FIG. 35 and FIG. 36, respectively, and a virtual reception antenna group 51c is shown in FIG. 39. Fifty-four virtual reception antennas VR1 to VR54 are formed by: the nine transmission antennas Tx1 to Tx9 which are second antennas At2; and the six reception antennas Rx1 to Rx6 which are first antennas At1. The fifty-four virtual reception antennas VR are arranged at regular intervals such that the virtual reception antenna interval Dvr as the interval between adjacent ones of the virtual reception antennas VR is the distance d. The virtual reception antennas VR in the virtual reception antenna group 50 are arrayed in the third array direction dr3 at regular intervals each of which is the distance d. The third array direction dr3 is a direction parallel to the first array direction dr1 and the second array direction dr2.

Since the second antenna group Gr2 includes the three second antenna sets 24a, 24b, and 24c, the virtual reception antenna group 50 is composed of: the virtual reception antenna group 51a having the virtual reception antennas VR1 to VR18 formed with signals that result from transmission by the transmission antennas Tx in the second antenna set 24a and that are received by the reception antennas Rx1 to Rx6; the virtual reception antenna group 51b having the virtual reception antennas VR19 to VR36 formed with signals that result from transmission by the transmission antennas Tx in the second antenna set 24b and that are received by the reception antennas Rx1 to Rx6; and the virtual reception antenna group 51c having the virtual reception antennas VR37 to VR54 formed with signals that result from transmission by the transmission antennas Tx in the second antenna set 24c and that are received by the reception antennas Rx1 to Rx6.

The virtual reception antenna group 51c has the same configuration as those of the virtual reception antenna groups 51a and 51b. In the example in FIG. 39, the virtual reception antennas VR37 to VR54 are arranged in the order of VR37, VR38, VR43, VR44, VR49, VR50, VR39, VR40, VR45, VR46, VR51, VR52, VR41, VR42, VR47, VR48, VR53, and VR54 toward the positive side in the third array direction dr3. Out of the virtual reception antenna group 51c, VR37, VR38, VR39, VR40, VR41, and VR42 each indicated by a solid-line circle the inside of which is white are virtual reception antennas formed with signals that result from transmission by the transmission antenna Tx7 and that are received by the reception antennas Rx1 to Rx6, and VR43, VR44, VR45, VR46, VR47, and VR48 each indicated by a dash-line circle the inside of which is white are virtual reception antennas formed with signals that result from transmission by the transmission antenna Tx8 and that are received by the reception antennas Rx1 to Rx6. VR49, VR50, VR51, VR52, VR53, and VR54 each indicated by a solid-line circle the inside of which is patterned are virtual reception antennas formed with signals that result from transmission by the transmission antenna Tx9 and that are received by the reception antennas Rx1 to Rx6.

The virtual reception antennas VR37 and VR38 are virtual reception antennas formed with signals received by the reception antennas Rx1 and Rx2 in the first antenna set 22a, the virtual reception antennas VR39 and VR40 are virtual reception antennas formed with signals received by the reception antennas Rx3 and Rx4 in the first antenna set 22b, and the virtual reception antennas VR41 and VR42 are virtual reception antennas formed with signals received by the reception antennas Rx5 and Rx6 in the first antenna set 22c. Therefore, the interval between adjacent ones of the virtual reception antennas VR37, VR39, and VR41 respectively formed by the reception antenna Rx1 in the first antenna set 22a, the reception antenna Rx3 in the first antenna set 22b, and the reception antenna Rx5 in the first antenna set 22c, is the first antenna set interval Dg1s which is 6d. With the reception antennas Rx1, Rx3, and Rx5 being reception antennas Rx on the negative side in the third array direction dr3 in the first antenna sets 22a, 22b, and 22c, the interval between the virtual reception antennas VR38, VR40, and VR42 respectively formed by the reception antennas Rx2, Rx4, and Rx6 which are reception antennas Rx on the positive side in the third array direction dr3 in the first antenna sets 22a, 22b, and 22c, is also the first antenna set interval Dg1s which is 6d.

VR43, VR44, VR45, VR46, VR47, and VR48 each indicated by a dash-line circle the inside of which is white are also such that, in the same manner as VR37 to VR42 each indicated by a solid-line circle the inside of which is white, the interval between adjacent ones of the virtual reception antennas VR43, VR45, and VR47 respectively formed by the reception antenna Rx1 in the first antenna set 22a, the reception antenna Rx3 in the first antenna set 22b, and the reception antenna Rx5 in the first antenna set 22c, is the first antenna set interval Dg1s which is 6d. The interval between the virtual reception antennas VR44, VR46, and VR48 respectively formed by the reception antennas Rx2, Rx4, and Rx6 which are reception antennas Rx on the positive side in the third array direction dr3 in the first antenna sets 22a, 22b, and 22c, is also the first antenna set interval Dg1s which is 6d.

VR49, VR50, VR51, VR52, VR53, and VR54 each indicated by a solid-line circle the inside of which is patterned are also such that, in the same manner as VR37 to VR42 each indicated by a solid-line circle the inside of which is white, the interval between adjacent ones of the virtual reception antennas VR49, VR51, and VR53 respectively formed by the reception antenna Rx1 in the first antenna set 22a, the reception antenna Rx3 in the first antenna set 22b, and the reception antenna Rx5 in the first antenna set 22c, is the first antenna set interval Dg1s which is 6d. The interval between the virtual reception antennas VR50, VR52, and VR54 respectively formed by the reception antennas Rx2, Rx4, and Rx6 which are reception antennas Rx on the positive side in the third array direction dr3 in the first antenna sets 22a, 22b, and 22c, is also the first antenna set interval Dg1s which is 6d.

The first antenna set interval Dg1s which is the interval between adjacent first antenna sets among the first antenna sets 22a, 22b, and 22c each having two reception antennas Rx arranged at the reception antenna interval Drx which is the distance d in the first antenna group Gr1, i.e., the antenna interval D1, is determined according to expression (4). The second antenna set interval Dg2s between the second antenna sets 24a, 24b, and 24c each having three transmission antennas Tx arranged at the transmission antenna interval Dtx which is 2 times the distance d in the second antenna group Gr2, i.e., the antenna interval D2, is determined according to expression (5).

In the case of the antenna arrangement in FIG. 37, the in-set antenna number $\beta$ in each second antenna set is 3, the second antennas At2 in the second antenna group Gr2 are transmission antennas Tx, and the antenna interval D2 between adjacent ones of the second antennas At2 in each of the second antenna sets 24a, 24b, and 24c in the second antenna group Gr2 is the transmission antenna interval Dtx which is 2 times the distance d. In the case of the antenna arrangement in FIG. 37, the first antenna set interval Dg1s is 3×D2 which equals 6d, in the same manner as in the case of the antenna arrangement in FIG. 32 and FIG. 33. Since the first antenna set interval Dg1s is 6d and the first antenna number Ng1 is 6, the second antenna set interval Dg2s is calculated as 18d according to 6d×6/2 in the same manner as in the case of the antenna arrangement in FIG. 32 and FIG. 33.

As described above, the plurality of first antennas At1 arranged at the antenna interval D1 which is the predetermined distance d may be transmission antennas Tx or reception antennas Rx. The second antennas At2 are antennas for operations opposite to those of the first antennas At1. The antenna arrangement in FIG. 37 is of an example in which the number of the first antennas At1 is 6, and the number of the second antennas At2 is 9. However, antennas in the radar device 1 according to embodiment 5 are not limited thereto, as described in embodiment 4. The number of the first antennas At1, i.e., the first antenna number Ng1, only has to be an even number equal to or larger than 4, two or more first antenna sets only have to be provided, and the number of the second antennas At2, i.e., the second antenna number Ng2, only has to be $\alpha \times \beta$.

In the radar device 1 according to embodiment 5, the number of the first antennas At1 included in the first antenna group Gr1 is an even number equal to or larger than 4, the number of the second antennas At2 included in the second antenna group Gr2 is $\alpha \times \beta$, and the transmission circuit 12 and the reception circuit 13 have configurations respectively corresponding to the number of the transmission antennas Tx which are either the first antennas At1 or the second antennas At2 and the number of the reception antennas Rx which are the others out of the first antennas At1 and the second antennas At2. In the radar device 1 according to embodiment 5, the first antennas At1 are arranged such that the first antenna set interval Dg1s as the interval between adjacent ones of the first antenna sets each having two first antennas At1 arranged at an interval which is the predetermined distance d, has a value obtained by multiplying the in-set antenna number $\beta$ as the number of the second antennas At2 in each of the second antenna sets 24a, 24b, and 24c and the antenna interval D2 as the interval between adjacent ones of the second antennas At2 in each of the second antenna sets 24a, 24b, and 24c. Further, in the radar device 1 according to embodiment 5, the second antennas At2 are arranged such that the second antenna set interval Dg2s as the interval between adjacent ones of the second antenna sets 24a, 24b, and 24c having a set number of a and each having second antennas At2 which have an in-set antenna number of $\beta$ and which are arranged at the antenna interval D2, has a value obtained by dividing, by 2, the product of the first antenna set interval Dg1s and the first antenna number Ng1 as the number of the first antennas At1. The radar device 1 according to embodiment 5 corresponds to the case where three or more channels of first antennas At1 cannot be physically arranged at an interval which is the predetermined distance d. However, in the radar device 1, the plurality of virtual reception antennas VR formed through transmission and reception by the first antennas At1 and the second antennas At2 can be arranged at regular intervals each of which is the distance d, and thus it is possible to reduce side lobe and inhibit erroneous detection.

The radar device 1 according to embodiment 5 corresponds to the case where the set number $\alpha$ of the second antenna sets in the second antenna group Gr2 is 3 as compared to the radar device 1 according to embodiment 4.

The radar device 1 according to embodiment 5 exhibits the same advantageous effects as those of the radar device 1 according to embodiment 4.

Embodiment 6

Figure 40:
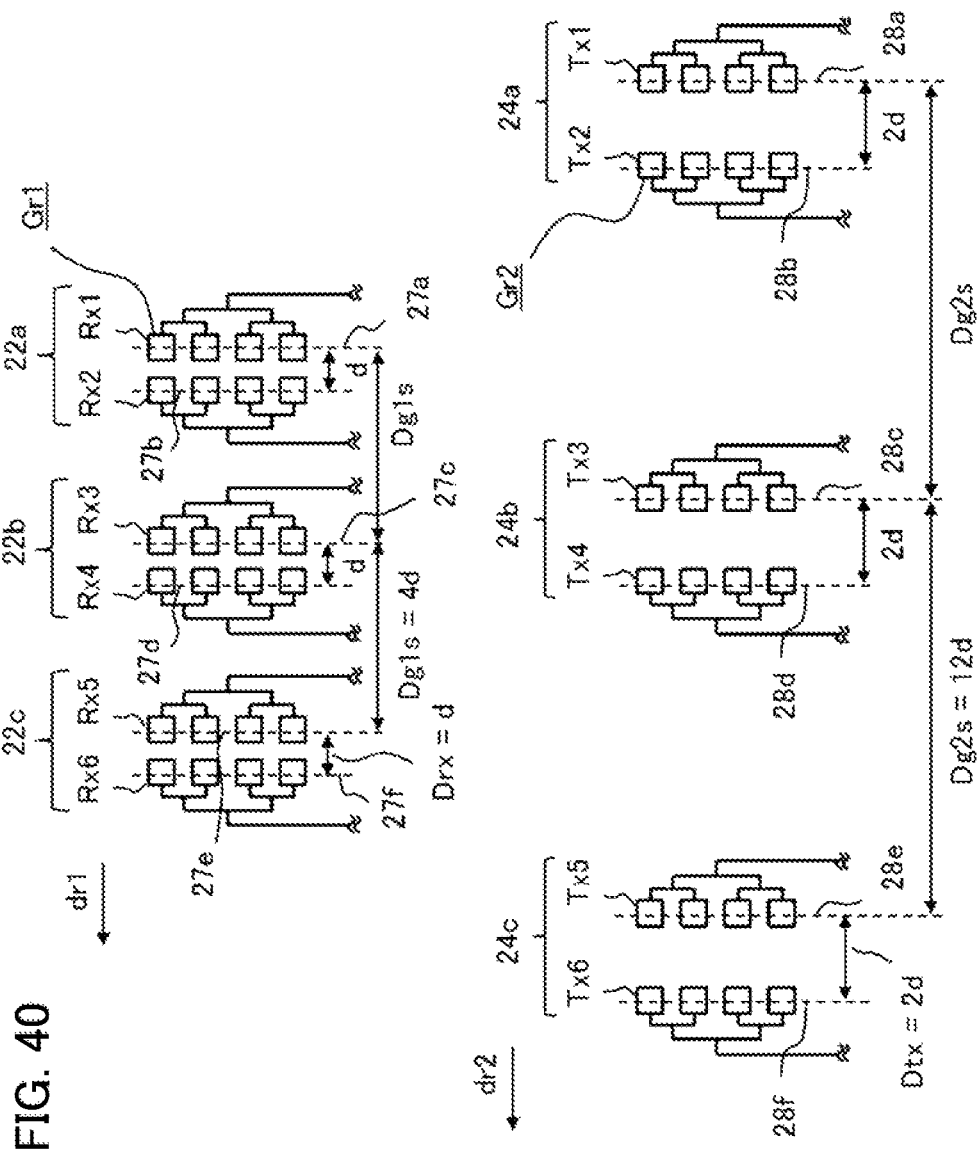
FIG. 40 illustrates an antenna arrangement in a radar device according to embodiment 6.
Figure 41:
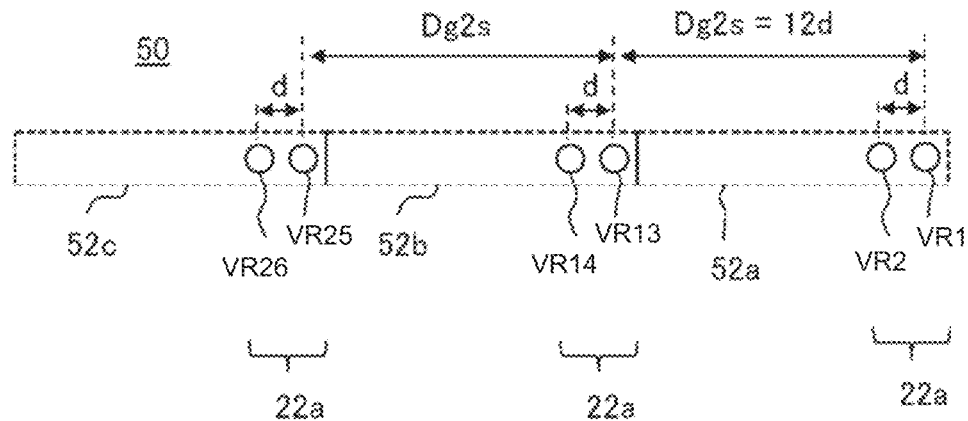
FIG. 41 illustrates a virtual reception antenna group corresponding to the antenna arrangement in FIG. 40.
Figure 42:
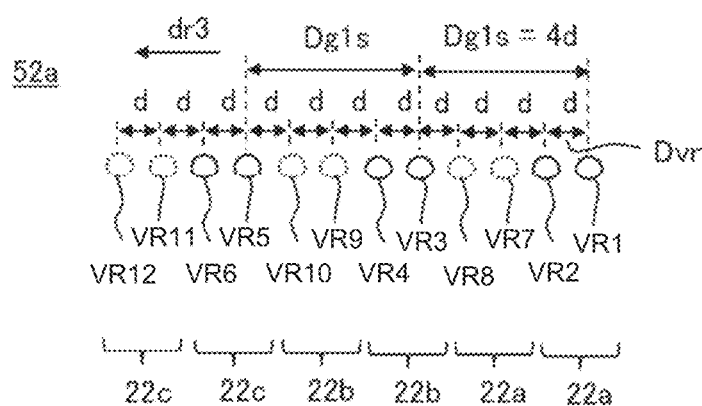
FIG. 42 illustrates a first virtual reception antenna group in FIG. 41.
Figure 43:
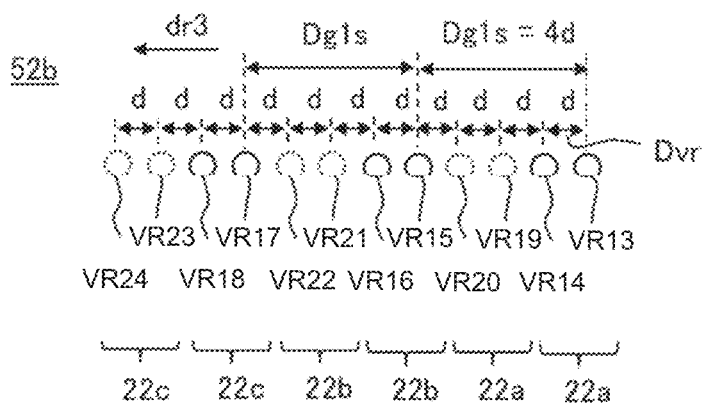
FIG. 43 illustrates a second virtual reception antenna group in FIG. 41.
Figure 44:
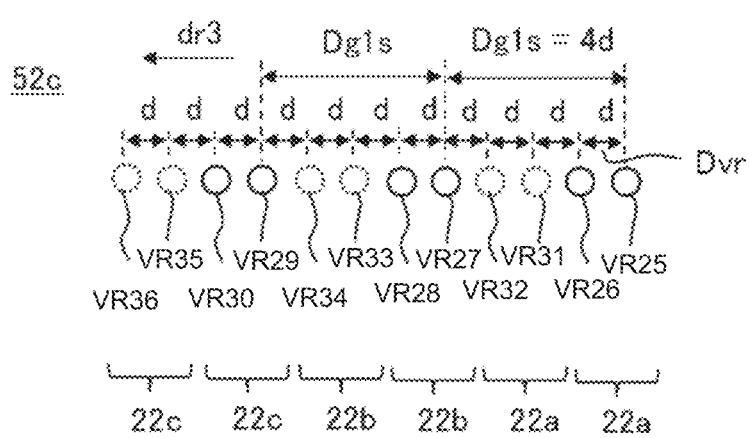
FIG. 44 illustrates a third virtual reception antenna group in FIG. 41.

FIG. 40 illustrates an antenna arrangement in a radar device according to embodiment 6, and FIG. 41 illustrates a virtual reception antenna group corresponding to the antenna arrangement in FIG. 40. FIG. 42, FIG. 43, and FIG. 44 respectively illustrate a first virtual reception antenna group in FIG. 41, a second virtual reception antenna group in FIG. 41, and a third virtual reception antenna group in FIG. 41. A radar device 1 according to embodiment 6 is of an example in which the in-set antenna number β in each second antenna set in the second antenna group Gr2 is 2 as compared to the radar device 1 according to embodiment 5. Differences from the radar device 1 according to embodiment 5 will be mainly described. The radar device 1 according to embodiment 6 including antennas in the antenna arrangement in FIG. 40 is different from the radar device 1 according to embodiment 5 including the antennas in the antenna arrangement in FIG. 37 in that the second antenna group Gr2 includes three second antenna sets each having two transmission antennas Tx which are second antennas At2. With use of the set number α and the in-set antenna number β regarding the second antennas At2 in the second antenna group Gr2, the radar device 1 according to embodiment 5 including the antennas in the antenna arrangement in FIG. 37 is expressed as being of an example in which each of the set number α and the in-set antenna number β is 3, and the radar device 1 according to embodiment 6 including the antennas in the antenna arrangement in FIG. 40 is expressed as being of an example in which the set number α and the in-set antenna number β are respectively 3 and 2.

Specifically, the radar device 1 according to embodiment 6 including the antennas in the antenna arrangement in FIG. 40 includes: the six transmission antennas Tx1, Tx2, Tx3, Tx4, Tx5, and Tx6; the six reception antennas Rx1, Rx2, Rx3, Rx4, Rx5, and Rx6; the transmission circuit 12; the reception circuit 13; and the processing unit 11. The transmission circuit 12 is configured such that the transmission switch 124 performs switching between the six transmission antennas Tx1 to Tx6. The reception circuit 13 has a configuration corresponding to the six reception antennas Rx1 to Rx6. The radar device 1 including the antennas in the antenna arrangement in FIG. 40 transmits a transmission signal having the modulation pattern 61 in which Tx1, Tx2, Tx3, Tx4, Tx5, and Tx6 are repeated in this order.

The transmission antennas Tx and the reception antennas Rx will be described. In the antenna arrangement shown in FIG. 40, the reception antennas Rx are antennas in the first antenna group Gr1, i.e., first antennas At1, and the transmission antennas Tx are antennas in the second antenna group Gr2, i.e., second antennas At2. The reception antennas Rx1 to Rx6 are arranged sequentially toward the positive side in the first array direction dr1, and the transmission antennas Tx1 to Tx6 are arranged sequentially toward the positive side in the second array direction dr2. The reception antennas Rx1 and Rx2 compose the first antenna set 22a, the reception antennas Rx3 and Rx4 compose the first antenna set 22b, and the reception antennas Rx5 and Rx6 compose the first antenna set 22c. The first antenna group Gr1 shown in FIG. 40 is the same as the first antenna group Gr1 shown in FIG. 37, and thus the descriptions thereof will not be repeated.

The transmission antennas Tx1 and Tx2 compose a second antenna set 24a, the transmission antennas Tx3 and Tx4 compose a second antenna set 24b, and the transmission antennas Tx5 and Tx6 compose a second antenna set 24c. With use of the set number α and the in-set antenna number β regarding the second antennas At2 in the second antenna group Gr2, the second antenna group Gr2 in the antenna arrangement shown in FIG. 40 is expressed as including second antennas At2, the number of which is calculated as 6 according to α×β where the set number α is 3 and the in-set antenna number β is 2. The transmission antennas Tx1 and Tx2 in the second antenna set 24a are such that the interval between the adjacent transmission antennas Tx, i.e., the transmission antenna interval Dtx, is 2 times the distance d, i.e., 2d. The interval between the transmission antenna Tx1 and the transmission antenna Tx2 is the interval between the phase center line 28a and the phase center line 28b. The transmission antenna interval Dtx is the antenna interval D2 (see FIG. 12), between the second antennas At2, which is 2 times the distance d. Each of the second antenna sets 24b and 24c also has the same configuration as that of the second antenna set 24a. The transmission antennas Tx3 and Tx4 in the second antenna set 24b are such that the interval between the adjacent transmission antennas Tx, i.e., the transmission antenna interval Dtx, is 2 times the distance d, i.e., 2d. The interval between the transmission antenna Tx3 and the transmission antenna Tx4 is the interval between the phase center line 28c and the phase center line 28d. The transmission antennas Tx5 and Tx6 in the second antenna set 24c are such that the interval between the adjacent transmission antennas Tx, i.e., the transmission antenna interval Dtx, is 2 times the distance d, i.e., 2d. The interval between the transmission antenna Tx5 and the transmission antenna Tx6 is the interval between the phase center line 28e and the phase center line 28f.

As the power supply circuit 25 of each of the transmission antennas Tx and the reception antennas Rx, a power supply circuit of the parallel power supply type formed so as to have equal wire lengths to the respective element antennas 19 is shown. Although the transmission antennas Tx are second antennas At2 in the second antenna group Gr2, an example is shown in which the element antennas 19 of the two transmission antennas Tx are arranged so as to face each other such that the power supply circuit 25 of one of the transmission antennas Tx is not located in a region adjacent to the other transmission antenna. Since the reception antennas Rx are first antennas At1 in the first antenna group Gr1, the element antennas 19 of the two reception antennas Rx in each of the first antenna sets 22a, 22b, and 22c are arranged so as to face each other such that the power supply circuit 25 of one of the reception antennas is not located in a region adjacent to the other reception antenna.

FIG. 41, FIG. 42, FIG. 43, and FIG. 44 show a virtual reception antenna group 50 formed by the transmission antennas Tx and the reception antennas Rx in the antenna arrangement in FIG. 40. The virtual reception antenna group 50 includes a plurality of virtual reception antennas. Thirty-six virtual reception antennas VR1 to VR36 are formed by: the six transmission antennas Tx1 to Tx6 which are second antennas At2; and the six reception antennas Rx1 to Rx6 which are first antennas At1. The thirty-six virtual reception antennas VR are arranged at regular intervals such that the virtual reception antenna interval Dvr as the interval between adjacent ones of the virtual reception antennas VR is the distance d. The virtual reception antennas VR in the virtual reception antenna group 50 are arrayed in the third array direction dr3 at regular intervals each of which is the distance d. The third array direction dr3 is a direction parallel to the first array direction dr1 and the second array direction dr2.

Since the second antenna group Gr2 includes the three second antenna sets 24a, 24b, and 24c, the virtual reception antenna group 50 is composed of: a virtual reception antenna group 52a having the virtual reception antennas VR1 to VR12 formed with signals that result from transmission by the transmission antennas Tx in the second antenna set 24a and that are received by the reception antennas Rx1 to Rx6; a virtual reception antenna group 52b having the virtual reception antennas VR13 to VR24 formed with signals that result from transmission by the transmission antennas Tx in the second antenna set 24b and that are received by the reception antennas Rx1 to Rx6; and a virtual reception antenna group 52c having the virtual reception antennas VR25 to VR36 formed with signals that result from transmission by the transmission antennas Tx in the second antenna set 24c and that are received by the reception antennas Rx1 to Rx6.

In the example of the virtual reception antenna group 52a shown in FIG. 42, the virtual reception antennas VR1 to VR12 are arranged in the order of VR1, VR2, VR7, VR8, VR3, VR4, VR9, VR10, VR5, VR6, VR11, and VR12 toward the positive side in the third array direction dr3. Out of the virtual reception antenna group 52a, VR1, VR2, VR3, VR4, VR5, and VR6 each indicated by a solid-line circle the inside of which is white are virtual reception antennas formed with signals that result from transmission by the transmission antenna Tx1 and that are received by the reception antennas Rx1 to Rx6, and VR7, VR8, VR9, VR10, VR11, and VR12 each indicated by a dash-line circle the inside of which is white are virtual reception antennas formed with signals that result from transmission by the transmission antenna Tx2 and that are received by the reception antennas Rx1 to Rx6.

The virtual reception antennas VR1 and VR2 are virtual reception antennas formed with signals received by the reception antennas Rx1 and Rx2 in the first antenna set 22a, the virtual reception antennas VR3 and VR4 are virtual reception antennas formed with signals received by the reception antennas Rx3 and Rx4 in the first antenna set 22b, and the virtual reception antennas VR5 and VR6 are virtual reception antennas formed with signals received by the reception antennas Rx5 and Rx6 in the first antenna set 22c. Therefore, the interval between adjacent ones of the virtual reception antennas VR1, VR3, and VR5 respectively formed by the reception antenna Rx1 in the first antenna set 22a, the reception antenna Rx3 in the first antenna set 22b, and the reception antenna Rx5 in the first antenna set 22c, is the first antenna set interval Dg1s which is 4d. With the reception antennas Rx1, Rx3, and Rx5 being reception antennas Rx on the negative side in the third array direction dr3 in the first antenna sets 22a, 22b, and 22c, the interval between the virtual reception antennas VR2, VR4, and VR6 respectively formed by the reception antennas Rx2, Rx4, and Rx6 which are reception antennas Rx on the positive side in the third array direction dr3 in the first antenna sets 22a, 22b, and 22c, is also the first antenna set interval Dg1s which is 4d.

VR7, VR8, VR9, VR10, VR11, and VR12 each indicated by a dash-line circle the inside of which is white are also such that, in the same manner as VR1 to VR6 each indicated by a solid-line circle the inside of which is white, the interval between adjacent ones of the virtual reception antennas VR7, VR9, and VR11 respectively formed by the reception antenna Rx1 in the first antenna set 22a, the reception antenna Rx3 in the first antenna set 22b, and the reception antenna Rx5 in the first antenna set 22c, is the first antenna set interval Dg1s which is 4d. The interval between the virtual reception antennas VR8, VR10, and VR12 respectively formed by the reception antennas Rx2, Rx4, and Rx6 which are reception antennas Rx on the positive side in the third array direction dr3 in the first antenna sets 22a, 22b, and 22c, is also the first antenna set interval Dg1s which is 4d.

The virtual reception antenna group 52b has the same configuration as that of the virtual reception antenna group 52a. In the example in FIG. 43, the virtual reception antennas VR13 to VR24 are arranged in the order of VR13, VR14, VR19, VR20, VR15, VR16, VR21, VR22, VR17, VR18, VR23, and VR24 toward the positive side in the third array direction dr3. Out of the virtual reception antenna group 52b, VR13, VR14, VR15, VR16, VR17, and VR18 each indicated by a solid-line circle the inside of which is white are virtual reception antennas formed with signals that result from transmission by the transmission antenna Tx3 and that are received by the reception antennas Rx1 to Rx6, and VR19, VR20, VR21, VR22, VR23, and VR24 each indicated by a dash-line circle the inside of which is white are virtual reception antennas formed with signals that result from transmission by the transmission antenna Tx4 and that are received by the reception antennas Rx1 to Rx6.

The virtual reception antennas VR13 and VR14 are virtual reception antennas formed with signals received by the reception antennas Rx1 and Rx2 in the first antenna set 22a, the virtual reception antennas VR15 and VR16 are virtual reception antennas formed with signals received by the reception antennas Rx3 and Rx4 in the first antenna set 22b, and the virtual reception antennas VR17 and VR18 are virtual reception antennas formed with signals received by the reception antennas Rx5 and Rx6 in the first antenna set 22c. Therefore, the interval between adjacent ones of the virtual reception antennas VR13, VR15, and VR17 respectively formed by the reception antenna Rx1 in the first antenna set 22a, the reception antenna Rx3 in the first antenna set 22b, and the reception antenna Rx5 in the first antenna set 22c, is the first antenna set interval Dg1s which is 4d. The interval between the virtual reception antennas VR14, VR16, and VR18 respectively formed by the reception antennas Rx2, Rx4, and Rx6 which are reception antennas Rx on the positive side in the third array direction dr3 in the first antenna sets 22a, 22b, and 22c, is also the first antenna set interval Dg1s which is 4d.

VR19, VR20, VR21, VR22, VR23, and VR24 each indicated by a dash-line circle the inside of which is white are also such that, in the same manner as VR13 to VR18 each indicated by a solid-line circle the inside of which is white, the interval between adjacent ones of the virtual reception antennas VR19, VR21, and VR23 respectively formed by the reception antenna Rx1 in the first antenna set 22a, the reception antenna Rx3 in the first antenna set 22b, and the reception antenna Rx5 in the first antenna set 22c, is the first antenna set interval Dg1s which is 4d. The interval between the virtual reception antennas VR20, VR22, and VR24 respectively formed by the reception antennas Rx2, Rx4, and Rx6 which are reception antennas Rx on the positive side in the third array direction dr3 in the first antenna sets 22a, 22b, and 22c, is also the first antenna set interval Dg1s which is 4d.

The virtual reception antenna group 52c has the same configuration as those of the virtual reception antenna groups 52a and 52b. In the example in FIG. 44, the virtual reception antennas VR25 to VR36 are arranged in the order of VR25, VR26, VR31, VR32, VR27, VR28, VR33, VR34, VR29, VR30, VR35, and VR36 toward the positive side in the third array direction dr3. Out of the virtual reception antenna group 52c, VR25, VR26, VR27, VR28, VR29, and VR30 each indicated by a solid-line circle the inside of which is white are virtual reception antennas formed with signals that result from transmission by the transmission antenna Tx5 and that are received by the reception antennas Rx1 to Rx6, and VR31, VR32, VR33, VR34, VR35, and VR36 each indicated by a dash-line circle the inside of which is white are virtual reception antennas formed with signals that result from transmission by the transmission antenna Tx6 and that are received by the reception antennas Rx1 to Rx6.

The virtual reception antennas VR25 and VR26 are virtual reception antennas formed with signals received by the reception antennas Rx1 and Rx2 in the first antenna set 22a, the virtual reception antennas VR27 and VR28 are virtual reception antennas formed with signals received by the reception antennas Rx3 and Rx4 in the first antenna set 22b, and the virtual reception antennas VR29 and VR30 are virtual reception antennas formed with signals received by the reception antennas Rx5 and Rx6 in the first antenna set 22c. Therefore, the interval between adjacent ones of the virtual reception antennas VR25, VR27, and VR29 respectively formed by the reception antenna Rx1 in the first antenna set 22a, the reception antenna Rx3 in the first antenna set 22b, and the reception antenna Rx5 in the first antenna set 22c, is the first antenna set interval Dg1s which is 4d. The interval between the virtual reception antennas VR26, VR28, and VR30 respectively formed by the reception antennas Rx2, Rx4, and Rx6 which are reception antennas Rx on the positive side in the third array direction dr3 in the first antenna sets 22a, 22b, and 22c, is also the first antenna set interval Dg1s which is 4d.

VR31, VR32, VR33, VR34, VR35, and VR36 each indicated by a dash-line circle the inside of which is white are also such that, in the same manner as VR25 to VR30 each indicated by a solid-line circle the inside of which is white, the interval between adjacent ones of the virtual reception antennas VR31, VR33, and VR35 respectively formed by the reception antenna Rx1 in the first antenna set 22a, the reception antenna Rx3 in the first antenna set 22b, and the reception antenna Rx5 in the first antenna set 22c, is the first antenna set interval Dg1s which is 4d. The interval between the virtual reception antennas VR32, VR34, and VR36 respectively formed by the reception antennas Rx2, Rx4, and Rx6 which are reception antennas Rx on the positive side in the third array direction dr3 in the first antenna sets 22a, 22b, and 22c, is also the first antenna set interval Dg1s which is 4d.

The first antenna set interval Dg1s which is the interval between adjacent first antenna sets among the first antenna sets 22a, 22b, and 22c each having two reception antennas Rx arranged at the reception antenna interval Drx which is the distance d in the first antenna group Gr1, i.e., the antenna interval D1, is determined according to expression (4). The second antenna set interval Dg2s between the second antenna sets 24a, 24b, and 24c each having two transmission antennas Tx arranged at the transmission antenna interval Dtx which is 2 times the distance d in the second antenna group Gr2, i.e., the antenna interval D2, is determined according to expression (5).

In the case of the antenna arrangement in FIG. 40, the in-set antenna number β in each second antenna set is 2, the second antennas At2 in the second antenna group Gr2 are transmission antennas Tx, and the antenna interval D2 between the adjacent second antennas At2 in each of the second antenna sets 24a, 24b, and 24c in the second antenna group Gr2 is the transmission antenna interval Dtx which is 2 times the distance d. In the case of the antenna arrangement in FIG. 40, the first antenna set interval Dg1s is 2×D2 which equals 4d. Since the first antenna set interval Dg1s is 4d and the first antenna number Ng1 is 6, the second antenna set interval Dg2s is calculated as 12d according to 4d×6/2.

As described above, the plurality of first antennas At1 arranged at the antenna interval D1 which is the predetermined distance d may be transmission antennas Tx or reception antennas Rx. The second antennas At2 are antennas for operations opposite to those of the first antennas At1. The antenna arrangement in FIG. 40 is of an example in which the number of the first antennas At1 is 6, and the number of the second antennas At2 is 6. However, antennas in the radar device 1 according to embodiment 6 are not limited thereto, as described in embodiments 4 and 5. The number of the first antennas At1, i.e., the first antenna number Ng1, only has to be an even number equal to or larger than 4, two or more first antenna sets only have to be provided, and the number of the second antennas At2, i.e., the second antenna number Ng2, only has to be α×β.

In the radar device 1 according to embodiment 6, the number of the first antennas At1 included in the first antenna group Gr1 is an even number equal to or larger than 4, the number of the second antennas At2 included in the second antenna group Gr2 is α×β, and the transmission circuit 12 and the reception circuit 13 have configurations respectively corresponding to the number of the transmission antennas Tx which are either the first antennas At1 or the second antennas At2 and the number of the reception antennas Rx which are the others out of the first antennas At1 and the second antennas At2. In the radar device 1 according to embodiment 6, the first antennas At1 are arranged such that the first antenna set interval Dg1s as the interval between adjacent ones of the first antenna sets each having two first antennas At1 arranged at an interval which is the predetermined distance d, has a value obtained by multiplying the in-set antenna number β as the number of the second antennas At2 in each of the second antenna sets 24a, 24b, and 24c and the antenna interval D2 as the interval between the adjacent second antennas At2 in each of the second antenna sets 24a, 24b, and 24c. Further, in the radar device 1 according to embodiment 6, the second antennas At2 are arranged such that the second antenna set interval Dg2s as the interval between adjacent ones of the second antenna sets 24a, 24b, and 24c having a set number of a and each having second antennas At2 which have an in-set antenna number of β and which are arranged at the antenna interval D2, has a value obtained by dividing, by 2, the product of the first antenna set interval Dg1s and the first antenna number Ng1 as the number of the first antennas At1. The radar device 1 according to embodiment 6 corresponds to the case where three or more channels of first antennas At1 cannot be physically arranged at an interval which is the predetermined distance d. However, in the radar device 1, the plurality of virtual reception antennas VR formed through transmission and reception by the first antennas At1 and the second antennas At2 can be arranged at regular intervals each of which is the distance d, and thus it is possible to reduce side lobe and inhibit erroneous detection.

The radar device 1 according to embodiment 6 corresponds to the case where the in-set antenna number β in each second antenna set in the second antenna group Gr2 is 2 as compared to the radar device 1 according to embodiment 5.

The radar device 1 according to embodiment 6 exhibits the same advantageous effects as those of the radar device 1 according to embodiment 5.

The radar device 1 according to embodiment 5 including the antennas in the antenna arrangement shown in FIG. 37 is of an example in which, in the second antenna group Gr2, the power supply circuit 25 of one of the transmission antennas Tx which are second antennas At2 is located in a region adjacent to another one of the transmission antennas, and the respective element antennas 19 are arranged so as not to face each other. In this case, a case where the power supply circuits 25 are located close to the antennas is also conceivable depending on the wavelength λ of the transmission signal transmitted by the radar device 1. In this case, the power supply circuits 25 inflict influence as parts of the antennas, whereby the antenna arrangement pattern might be disarrayed. An antenna arrangement pattern that is not disarrayed refers to an antenna arrangement pattern in which parameters for determining the antenna arrangement pattern, i.e., values of the antenna intervals D1 and D2, the first antenna set interval Dg1$s$, and the second antenna set interval Dg2$s$, fall within allowable ranges and are regarded as fixed values at any of locations of the antennas. An antenna arrangement pattern that is disarrayed refers to an antenna arrangement pattern in which the values of the antenna intervals D1 and D2, the first antenna set interval Dg1$s$, and the second antenna set interval Dg2$s$, fall outside the allowable ranges and are not regarded as fixed values depending on the locations. When the antenna arrangement pattern is disarrayed, the distance, the relative speed, and the angle of the target object 33 cannot be accurately measured. However, the radar device 1 according to embodiment 6 including the antennas in the antenna arrangement shown in FIG. 40 is such that: the element antennas 19 of the first antennas At1, i.e., the reception antennas Rx, are arranged so as to face each other such that the power supply circuit 25 of one of the first antennas At1 is not located in a region adjacent to the other first antenna At1; and the element antennas 19 of the second antennas At2, i.e., the transmission antennas Tx, are arranged so as to face each other such that the power supply circuit 25 of one of the second antennas At2 is not located in a region adjacent to the other second antenna At2. Consequently, in this radar device 1, no disarray occurs regarding the parameters for determining the antenna arrangement pattern, whereby the distance, the relative speed, and the angle of the target object 33 can be accurately measured.

If the in-set antenna number β in each second antenna set in the second antenna group Gr2 is 2, the element antennas 19 can be arranged so as to face each other such that the power supply circuit 25 of one of the antennas shown in FIG. 40 is not located in a region adjacent to the other antenna. Thus, this arrangement is effective as a countermeasure to inhibit disarray of the antenna arrangement pattern. In addition, the arrangement of the transmission antennas Tx which are second antennas At2 in the second antenna group Gr2 shown in FIG. 40 is effective in accurately measuring the distance, the relative speed, and the angle of the target object 33 also if the width of each power supply circuit 25 is large, i.e., the width in the second array direction dr2 is large.

The antenna sizes of the first antenna group Gr1 and the second antenna group Gr2 will be contemplated. The antenna size of the first antenna group Gr1, i.e., a first antenna group size Dg1$t$, is defined as a length from the phase center line at the farthest location on the negative side in the first array direction dr1 to the phase center line at the farthest location on the positive side in the first array direction dr1. In the same manner as the antenna size of the first antenna group Gr1, the antenna size of the second antenna group Gr2, i.e., a second antenna group size Dg2$t$, is defined as a length from the phase center line at the farthest location on the negative side in the second array direction dr2 to the phase center line at the farthest location on the positive side in the second array direction dr2. The radar device 1 according to embodiment 6 including the antennas in the antenna arrangement shown in FIG. 40 is of an example in which: the first antenna number Ng1 is 6; the second antenna number Ng2 is 6; and the set number α and the in-set antenna number β in the second antenna group Gr2 are respectively 3 and 2. For comparison, descriptions will also be given regarding the radar device 1 according to embodiment 4 including the antennas in the antenna arrangement shown in FIG. 32 and FIG. 33, in which the first antenna number Ng1 and the second antenna number Ng2 are equal to those in the radar device 1 according to embodiment 6 including the antennas in the antenna arrangement shown in FIG. 40. The radar device 1 according to embodiment 4 including the antennas in the antenna arrangement shown in FIG. 32 and FIG. 33 is of an example in which: the first antenna number Ng1 is 6; the second antenna number Ng2 is 6; and the set number α and the in-set antenna number β in the second antenna group Gr2 are respectively 2 and 3. As is obvious from FIG. 32, FIG. 33, and FIG. 40, the first antenna group size Dg1$t$ is expressed with expression (6), and the second antenna group size Dg2$t$ is expressed with expression (7).

$$Dg1t = Dg1s \times (Ng1/2 - 1) + D1 \qquad (6)$$
$$= D2 \times \beta \times (Ng1/2 - 1) + D1$$
$$Dg2t = Dg2s \times (\alpha - 1) + D2 \times (\beta - 1) \qquad (7)$$
$$= Dg1s \times Ng1/2 \times (\alpha - 1) + D2 \times (\beta - 1)$$
$$= \beta \times D2 \times Ng1/2 \times (\alpha - 1) + D2 \times (\beta - 1)$$

It is noted that FIG. 32, FIG. 33, and FIG. 40 each show an example in which the antenna intervals D1 and D2 are respectively d and 2d.

In the radar device 1 according to embodiment 6 including the antennas in the antenna arrangement shown in FIG. 40, the set number α and the in-set antenna number β in the second antenna group Gr2 are respectively 3 and 2, and the first antenna group size Dg1$t$ and the second antenna group size Dg2$t$ are respectively 9$d$ and 26$d$ according to expression (6) and expression (7). In the radar device 1 according to embodiment 4 including the antennas in the antenna arrangement shown in FIG. 32 and FIG. 33, the set number α and the in-set antenna number β in the second antenna group Gr2 are respectively 2 and 3, and the first antenna group size Dg1$t$ and the second antenna group size Dg2$t$ are respectively 13$d$ and 22$d$ according to expression (6) and expression (7). In both cases, the second antenna group size Dg2$t$ is larger than the first antenna group size Dg1$t$. Thus, in the case of reducing the width of the radar device 1 in the longitudinal direction, i.e., the width thereof in the second array direction dr2, 2 is preferably selected as the set number α in the second antenna group Gr2. Therefore, in the case where no disarray occurs regarding the parameters for determining the antenna arrangement pattern, 2 is selected as the set number α in the second antenna group Gr2, whereby the width of the radar device 1 in the longitudinal direction can be reduced. Meanwhile, in the case where selection of 2 as the set number α in the second antenna group Gr2 leads to occurrence, depending on the wavelength A to be used, of disarray regarding the parameters for determining the antenna arrangement pattern, 3 is selected as the set number α in the second antenna group Gr2, whereby the distance, the relative speed, and the angle of the target object 33 can be accurately measured.

The width of the radar device 1 in the longitudinal direction that is long-side width might be restricted depending on the position at which the radar device 1 is mounted. For example, if the radar device 1 is mounted near a bumper of a vehicle, the width in the longitudinal direction might be required to be reduced in consideration of, for example, restrictions based on a nearby structure and the shape of the bumper. In the case of considering a design that allows reduction of the width of the radar device 1 in the longitudinal direction, a configuration in which the transmission antennas Tx and the reception antennas Rx are arranged in the vertical direction, i.e., the extension direction of the phase center lines, is conceivable. In this case, the width of the radar device 1 in the longitudinal direction is larger than either of the width in the longitudinal direction across all the transmission antennas Tx and the width in the longitudinal direction across all the reception antennas Rx. Thus, a radar device 1 in which the width in the longitudinal direction across all the transmission antennas Tx or the width in the longitudinal direction across all the reception antennas Rx is set as small as possible, is required. In such a case, 2 only has to be selected as the set number α in the second antenna group Gr2.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure. It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 radar device
11 processing unit
19 element antenna
22a, 22b, 22c first antenna set
24a, 24b, 24c second antenna set
25, 25a, 25b, 25c, 25d, 25e, 25f power supply circuit
33 target object
50 virtual reception antenna group
51a, 51b, 51c virtual reception antenna group
52a, 52b, 52c virtual reception antenna group
At1, At1a, At1b first antenna
At2, At2a, At2b, At2c, At2d second antenna
d distance (basic distance)
D1 antenna interval
D2 antenna interval (second antenna interval)
dr1 first array direction
dr2 second array direction
dr3 third array direction
dr4 fourth array direction
dr5 fifth array direction
Dg1s first antenna set interval
Dg2s second antenna set interval
Dvr virtual reception antenna interval
Gr1 first antenna group
Gr2 second antenna group
Ng1 first antenna number
Ng2 second antenna number
Rx, Rx1, Rx2, Rx3, Rx4, Rx5, Rx6 reception antenna
Tx, Tx1, Tx2, Tx3, Tx4, Tx5, Tx6, Tx7, Tx8, Tx9 transmission antenna
VR virtual reception antenna
VR1, VR2, VR3, VR4, VR5, VR6, VR7, VR8, VR9, VR10 virtual reception antenna
VR11, VR12, VR13, VR14, VR15, VR16, VR17, VR18, VR19, VR20 virtual reception antenna
VR21, VR22, VR23, VR24, VR25, VR26, VR27, VR28, VR29, VR30 virtual reception antenna
VR31, VR32, VR33, VR34, VR35, VR36, VR37, VR38, VR39, VR40 virtual reception antenna
VR41, VR42, VR43, VR44, VR45, VR46, VR47, VR48, VR49, VR50 virtual reception antenna
VR51, VR52, VR53, VR54 virtual reception antenna
α set number (second antenna set number)
β in-set antenna number (in-second-antenna-set antenna number)

The invention claimed is:

1. A radar device comprising:
a plurality of transmission antennas each of which emits a transmission signal toward a target object;
a plurality of reception antennas which receive reflection signals resulting from reflection of the transmission signal by the target object and output the reflection signals as reception signals; and
a processing circuitry which processes the reception signals outputted from the plurality of respective reception antennas, wherein
an antenna interval, between adjacent ones of the antennas, that is determined on the basis of a field-of-view range required for the radar device is defined as a basic distance,
an antenna group that includes either the plurality of transmission antennas or the plurality of reception antennas and that includes a first antenna set having a plurality of first antennas such that an antenna interval between adjacent ones of the first antennas is the basic distance, is defined as a first antenna group,
an antenna group that includes others, out of the plurality of antennas, different from the first antennas in the first antenna group and that includes a second antenna set having a plurality of second antennas such that an antenna interval between adjacent ones of the second antennas is 2 times the basic distance, is defined as a second antenna group,
each of the first antennas and the second antennas includes a plurality of element antennas and a power supply circuit which supplies power to the element antennas,
the plurality of first antennas are arranged side by side in a first array direction perpendicular to a transmission direction of the transmission signal, and each first antenna has the power supply circuit on a positive side or a negative side thereof in the first array direction, the plurality of second antennas are arranged side by side in a second array direction that is perpendicular to the transmission direction of the transmission signal and that is parallel to the first array direction, and each second antenna has the power supply circuit on a positive side or a negative side thereof in the second array direction, none of the power supply circuits is located between adjacent ones of the antennas in the first antenna set, and in a virtual reception antenna group composed of a plurality of virtual reception antennas formed by the plurality of first antennas in the first antenna group and the plurality of second antennas in the second antenna group, the virtual reception antennas are arranged side by side in a third array direction that is perpendicular to the transmission direction of the transmission signal and that is parallel to the first array direction and the second array direction, and an interval in the third array direction between adjacent ones of the virtual reception antennas is the basic distance.

2. A radar device comprising:

a plurality of transmission antennas each of which emits a transmission signal toward a target object;

a plurality of reception antennas which receive reflection signals resulting from reflection of the transmission signal by the target object and output the reflection signals as reception signals; and a processing circuitry which processes the reception signals outputted from the plurality of respective reception antennas, wherein an antenna interval, between adjacent ones of the antennas, that is determined on the basis of a field-of-view range required for the radar device is defined as a basic distance, an antenna group that includes either the plurality of transmission antennas or the plurality of reception antennas and that includes a first antenna set having a plurality of first antennas such that an antenna interval between adjacent ones of the first antennas is the basic distance, is defined as a first antenna group, an antenna group that includes others, out of the plurality of antennas, different from the first antennas in the first antenna group and that includes a second antenna set having a plurality of second antennas such that an antenna interval between adjacent ones of the second antennas is 2 times the basic distance, is defined as a second antenna group, the plurality of first antennas are arranged side by side in a first array direction perpendicular to a transmission direction of the transmission signal, and each have a fractional bandwidth that is not lower than 2% and not higher than 10%, the plurality of second antennas are arranged side by side in a second array direction that is perpendicular to the transmission direction of the transmission signal and that is parallel to the first array direction, and each have a fractional bandwidth that is not lower than 2% and not higher than 10%, between adjacent ones of the first antennas in the first antenna set, a power supply circuit which supplies power to either of the antennas is not located, and in a virtual reception antenna group composed of a plurality of virtual reception antennas formed by the plurality of first antennas in the first antenna group and the plurality of second antennas in the second antenna group, the virtual reception antennas are arranged side by side in a third array direction that is perpendicular to the transmission direction of the transmission signal and that is parallel to the first array direction and the second array direction, and an interval in the third array direction between adjacent ones of the virtual reception antennas is the basic distance.

3. The radar device according to claim 1, wherein the first antennas are the transmission antennas, and the second antennas are the reception antennas.

4. The radar device according to claim 1, wherein the first antennas are the reception antennas, and the second antennas are the transmission antennas.

5. The radar device according to claim 1, wherein in the first antenna group, the number of the first antennas is 2, and the number of the first antenna sets is 1.

6. The radar device according to claim 1, wherein in the first antenna group, the number of the first antenna sets is equal to or larger than 2, in the second antenna group, a second antenna number which is the number of the second antennas is equal to or larger than 2, the antenna interval, between adjacent ones of the second antennas, which is 2 times the basic distance is defined as a second antenna interval, and a first antenna set interval which is an interval between adjacent ones of the first antenna sets has a value obtained by multiplying the second antenna number and the second antenna interval.

7. The radar device according to claim 6, wherein in the second antenna group, the second antenna number is a prime number equal to or larger than 2.

8. The radar device according to claim 1, wherein in the first antenna group, the number of the first antenna sets is equal to or larger than 2, and a first antenna number which is the number of the first antennas is an even number equal to or larger than 4, the antenna interval, between adjacent ones of the second antennas, which is 2 times the basic distance is defined as a second antenna interval, the number of the second antenna sets is defined as a second antenna set number, the number of the antennas in each second antenna set is defined as an in-second-antenna-set antenna number, in the second antenna group, a second antenna number which is the number of the second antennas has a value obtained by multiplying the second antenna set number and the in-second-antenna-set antenna number, a first antenna set interval which is an interval between adjacent ones of the first antenna sets has a value obtained by multiplying the in-second-antenna-set antenna number and the second antenna interval, and a second antenna set interval which is an interval between adjacent ones of the second antenna sets has a value obtained by dividing, by 2, a product of the first antenna set interval and the first antenna number.

9. The radar device according to claim 8, wherein the second antenna set number is 2.

10. The radar device according to claim 8, wherein the in-second-antenna-set antenna number is 2, and none of the power supply circuits is located between the adjacent antennas in each second antenna set.

11. The radar device according to claim 1, wherein the first antenna group includes the first antennas arranged so as to be shifted in a direction perpendicular to the first array direction.

12. The radar device according to claim 1, wherein
the second antenna group includes the second antennas arranged so as to be shifted in a direction perpendicular to the second array direction.

13. The radar device according to claim 1, wherein
the first antenna group includes
- a group A having the plurality of first antennas arranged in the first array direction, and
- a group B having a same configuration as that of the group A and shifted therefrom in a direction perpendicular to the first array direction.

14. The radar device according to claim 1, wherein
the second antenna group includes
- a group C having the plurality of second antennas arranged in the second array direction, and
- a group D having a same configuration as that of the group C and shifted therefrom in a direction perpendicular to the second array direction.

15. The radar device according to claim 2, wherein
the first antennas are the transmission antennas, and the second antennas are the reception antennas.

16. The radar device according to claim 2, wherein
the first antennas are the reception antennas, and the second antennas are the transmission antennas.

17. The radar device according to claim 2, wherein
in the first antenna group, the number of the first antennas is 2, and the number of the first antenna sets is 1.

18. The radar device according to claim 2, wherein
in the first antenna group, the number of the first antenna sets is equal to or larger than 2,
in the second antenna group, a second antenna number which is the number of the second antennas is equal to or larger than 2,
the antenna interval, between adjacent ones of the second antennas, which is 2 times the basic distance is defined as a second antenna interval, and
a first antenna set interval which is an interval between adjacent ones of the first antenna sets has a value obtained by multiplying the second antenna number and the second antenna interval.

19. The radar device according to claim 2, wherein
in the first antenna group, the number of the first antenna sets is equal to or larger than 2, and a first antenna number which is the number of the first antennas is an even number equal to or larger than 4,
the antenna interval, between adjacent ones of the second antennas, which is 2 times the basic distance is defined as a second antenna interval,
the number of the second antenna sets is defined as a second antenna set number,
the number of the antennas in each second antenna set is defined as an in-second-antenna-set antenna number,
in the second antenna group, a second antenna number which is the number of the second antennas has a value obtained by multiplying the second antenna set number and the in-second-antenna-set antenna number,
a first antenna set interval which is an interval between adjacent ones of the first antenna sets has a value obtained by multiplying the in-second-antenna-set antenna number and the second antenna interval, and
a second antenna set interval which is an interval between adjacent ones of the second antenna sets has a value obtained by dividing, by 2, a product of the first antenna set interval and the first antenna number.

20. The radar device according to claim 2, wherein
the first antenna group includes the first antennas arranged so as to be shifted in a direction perpendicular to the first array direction.

* * * * *